(12) United States Patent
Ashrafi

(10) Patent No.: US 10,148,360 B2
(45) Date of Patent: Dec. 4, 2018

(54) SYSTEM AND METHOD FOR COMMUNICATION USING PROLATE SPHEROIDAL WAVE FUNCTIONS

(71) Applicant: NxGen Partners IP, LLC, Dallas, TX (US)

(72) Inventor: Solyman Ashrafi, Plano, TX (US)

(73) Assignee: NXGEN PARTNERS IP, LLC, Dallas, TX (US)

(*) Notice: Subject to any disclaimer, the term of this patent is extended or adjusted under 35 U.S.C. 154(b) by 0 days.

(21) Appl. No.: 15/624,162

(22) Filed: Jun. 15, 2017

(65) Prior Publication Data

US 2017/0366270 A1   Dec. 21, 2017

Related U.S. Application Data

(60) Provisional application No. 62/351,487, filed on Jun. 17, 2016.

(51) Int. Cl.
*H04B 10/516* (2013.01)
*H04L 27/38* (2006.01)
(Continued)

(52) U.S. Cl.
CPC ...... *H04B 10/5161* (2013.01); *H04J 14/0227* (2013.01); *H04L 27/36* (2013.01); *H04L 27/38* (2013.01)

(58) Field of Classification Search
CPC ... H04B 10/5161; H04L 27/38; H04J 14/0227
See application file for complete search history.

(56) References Cited

U.S. PATENT DOCUMENTS 3,459,466 A   8/1969   Giordmaine
3,614,722 A   10/1971  Jones
(Continued)

OTHER PUBLICATIONS

I. B. Djordjevic and M. Cvijetic, Optical transport exceeding 10 Tb/s based on adaptive LDPC-coded multidimensional spatial-spectral scheme and orthogonal prolate spheroidal wave functions, 2013, pp. 1-5.*

(Continued)

*Primary Examiner* — David C Payne
*Assistant Examiner* — Tanya T Motsinger

(57) ABSTRACT

A method for transmitting a plurality of input streams from a transmitter to a receiver processes each of a plurality of input data streams to generate a plurality of parallel pairs of data streams including an in-phase stream (I) and a quadrature-phase stream (Q) for each of the plurality of input data streams. Each of the plurality of parallel pairs of data streams are modulated with a selected one of at least three prolate spheroidal wave functions, respectively, to generate a plurality of data signals, each of the plurality of data signals associated with one of the plurality of parallel pairs of data streams. A plurality of composite data streams are generated by overlaying at least one data signal of the plurality of data signals in a first data layer with the at least one data signal of the plurality of data signals in a second data layer. The plurality of composite data streams are processed to associate with each of the plurality of composite data streams an orthogonal function to cause each of the plurality of composite data streams to be mutually orthogonal to each other on the link to enable transmission of each of the plurality of the composite data streams on the link at a same time.

21 Claims, 49 Drawing Sheets

(51) Int. Cl.
  *H04J 14/02* (2006.01)
  *H04L 27/36* (2006.01)

(56) References Cited

U.S. PATENT DOCUMENTS

| | | | |
|---|---|---|---|
| 4,379,409 A | 4/1983 | Primbsch et al. | |
| 4,503,336 A | 3/1985 | Hutchin et al. | |
| 4,736,463 A | 4/1988 | Chavez | |
| 4,862,115 A | 8/1989 | Lee et al. | |
| 5,051,754 A | 9/1991 | Newberg | |
| 5,220,163 A | 6/1993 | Toughlian et al. | |
| 5,222,071 A | 6/1993 | Pezeshki et al. | |
| 5,272,484 A | 12/1993 | Labaar | |
| 5,543,805 A | 8/1996 | Thaniyavarn | |
| 5,555,530 A | 9/1996 | Meehan | |
| 6,337,659 B1 | 1/2002 | Kim | |
| 6,570,842 B1* | 5/2003 | Landolsi | H04B 1/7097 370/210 |
| 6,992,829 B1 | 1/2006 | Jennings et al. | |
| 7,577,165 B1 | 8/2009 | Barrett | |
| 7,729,572 B1 | 6/2010 | Pepper et al. | |
| 7,792,431 B2 | 9/2010 | Jennings et al. | |
| 8,432,884 B1 | 4/2013 | Ashrafi | |
| 8,503,546 B1* | 8/2013 | Ashrafi | H04L 27/362 370/208 |
| 8,559,823 B2 | 10/2013 | Izadpanah et al. | |
| 8,811,366 B2 | 8/2014 | Ashrafi | |
| 9,077,577 B1* | 7/2015 | Ashrafi | H04L 27/362 |
| 9,331,875 B2* | 5/2016 | Ashrafi | H04L 27/362 |
| 9,413,448 B2* | 8/2016 | Ashrafi | H04B 7/0697 |
| 9,712,238 B2* | 7/2017 | Ashrafi | H04B 10/2575 |
| 9,859,981 B2* | 1/2018 | Ashrafi | H04B 10/2575 |
| 9,998,187 B2* | 6/2018 | Ashrafi | H04B 7/0456 |
| 2005/0254826 A1 | 11/2005 | Jennings et al. | |
| 2005/0259914 A1 | 11/2005 | Padgett et al. | |
| 2010/0013696 A1 | 1/2010 | Schmitt et al. | |
| 2012/0207470 A1 | 8/2012 | Djordevic et al. | |
| 2013/0027774 A1 | 1/2013 | Bovino et al. | |
| 2013/0235744 A1 | 9/2013 | Chen et al. | |
| 2014/0355624 A1 | 12/2014 | Li et al. | |
| 2015/0098697 A1 | 4/2015 | Marom et al. | |
| 2016/0127073 A1* | 5/2016 | Ashrafi | H04B 10/516 398/44 |
| 2017/0294965 A1* | 10/2017 | Ashrafi | H04B 10/2575 |

OTHER PUBLICATIONS

Solyman Ashrafi, Channeling Radiation of Electrons in Crystal Lattices, Essays on Classical and Quantum Dynamics, Gordon and Breach Science Publishers, 1991.
Solyman Ashrafi, Solar Flux Forecasting Using Mutual Information with an Optimal Delay, Advances in the Astronautical Sciences, American Astronautical Society, vol. 84 Part II, 1993.
Solyman Ashrafi, PCS system design issues in the presence of microwave OFS, Electromagnetic Wave Interactions, Series on Stability, Vibration and Control of Systems, World Scientific, Jan. 1996.
Solyman Ashrafi, Performance Metrics and Design Parameters for an FSO Communications Link Based on Multiplexing of Multiple Orbital-Angular-Momentum Beams, IEEE Globecom 2014, paper 1570005079, Austin, TX, Dec. 2014(IEEE, Piscataway, NJ, 2014).
Solyman Ashrafi, Optical Communications Using Orbital Angular Momentum Beams, Adv. Opt. Photon. 7, 66-106, Advances in Optics and Photonic, 2015.
Solyman Ashrafi, Performance Enhancement of an Orbital-Angular-Momentum based Free-space Optical Communications Link Through Beam Divergence Controlling, IEEE/OSA Conference on Optical Fiber Communications (OFC) and National Fiber Optics Engineers Conference (NFOEC),paper M2F.6, Los Angeles, CA, Mar. 2015 (Optical Society of America, Washington, D.C., 2015).
Solyman Ashrafi, Experimental demonstration of enhanced spectral efficiency of 1.18 symbols/s/Hz using multiple-layer-overlay modulation for QPSK over a 14-km fiber link. OSA Technical Digest (online), paper JTh2A.63. The Optical Society, 2014.
Solyman Ashrafi, Link Analysis of Using Hermite-Gaussian Modes for Transmitting Multiple Channels in a Free-Space Optical Communication System, The Optical Society, vol. 2, No. 4, Apr. 2015.
Solyman Ashrafi, Performance Metrics and Design Considerations for a Free-Space Optical Orbital-Angular-Momentum Multiplexed Communication Link, The Optical Society, vol. 2, No. 4, Apr. 2015.
Solyman Ashrafi, Demonstration of Distance Emulation for an Orbital-Angular-Momentum Beam. OSA Technical Digest (online), paper STh1F.6. The Optical Society, 2015.
Solyman Ashrafi, Free-Space Optical Communications Using Orbital-Angular-Momentum Multiplexing Combined with MIMO-Based Spatial Multiplexing. Optics Letters, vol. 40, No. 18, Sep. 4, 2015.
Solyman Ashrafi, Enhanced Spectral Efficiency of 2.36 bits/s/Hz Using Multiple Layer Overlay Modulation for QPSK over a 14-km Single Mode Fiber Link. OSA Technical Digest (online), paper SW1M.6. The Optical Society, 2015.
Solyman Ashrafi, Experimental Demonstration of a 400-Gbit/s Free Space Optical Link Using Multiple Orbital-Angular-Momentum Beams with Higher Order Radial Indices. OSA Technical Digest (online), paper SW4M.5. The Optical Society, 2015.
Solyman Ashrafi, Experimental Demonstration of 16-Gbit/s Millimeter-Wave Communications Link using Thin Metamaterial Plates to Generate Data-Carrying Orbital-Angular-Momentum Beams, ICC 2015, London, UK, 2014.
Solyman Ashrafi, Experimental Demonstration of Using Multi-Layer-Overlay Technique for Increasing Spectral Efficiency to 1.18 bits/s/Hz in a 3 Gbit/s Signal over 4-km Multimode Fiber. OSA Technical Digest (online), paper JTh2A.63. The Optical Society, 2015.
Solyman Ashrafi, Experimental Measurements of Multipath-Induced Intra- and Inter-Channel Crosstalk Effects in a Millimeter-wave Communications Link using Orbital-Angular-Momentum Multiplexing, IEEE International communication Conference(ICC) 2015, paper1570038347, London, UK, Jun. 2015(IEEE, Piscataway, NJ, 2015).
Solyman Ashrafi, Performance Metrics for a Free-Space Communication Link Based on Multiplexing of Multiple Orbital Angular Momentum Beams with Higher Order Radial Indice. OSA Technical Digest (online), paper JTh2A.62. The Optical Society, 2015.
Solyman Ashrafi, 400-Gbit/s Free Space Optical Communications Link Over 120-meter using Multiplexing of 4 Collocated Orbital-Angular-Momentum Beams, IEEE/OSA Conference on Optical Fiber Communications (OFC) and National Fiber Optics Engineers Conference (NFOEC),paper M2F.1, Los Angeles, CA, Mar. 2015 (Optical Society of America, Washington, D.C., 2015).
Solyman Ashrafi, Experimental Demonstration of Two-Mode 16-Gbit/s Free-Space mm-Wave Communications Link Using Thin Metamaterial Plates to Generate Orbital Angular Momentum Beams, Optica, vol. 1, No. 6, Dec. 2014.
Solyman Ashrafi, Demonstration of an Obstruction-Tolerant Millimeter-Wave Free-Space Communications Link of Two 1-Gbaud 16-QAM Channels using Bessel Beams Containing Orbital Angular Momentum, Third International Conference on Optical Angular Momentum (ICOAM), Aug. 4-7, 2015, New York USA.
Solyman Ashrafi, An Information Theoretic Framework to Increase Spectral Efficiency, IEEE Transactions on Information Theory, vol. XX, No. Y, Oct. 2014, Dallas, Texas.
Solyman Ashrafi, Acoustically induced stresses in elastic cylinders and their visualization, The Journal of the Acoustical Society of America 82(4):1378-1385, Sep. 1987.
Solyman Ashrafi, Splitting of channeling-radiation peaks in strained-layer superlattices, Journal of the Optical Society of America B 8(12), Nov. 1991.
Solyman Ashrafi, Experimental Characterization of a 400 Gbit/s Orbital Angular Momentum Multiplexed Free-space Optical Link over 120-meters, Optics Letters, vol. 41, No. 3, pp. 622-625, 2016.
Solyman Ashrafi, Orbital-Angular-Momentum-Multiplexed Free-Space Optical Communication Link Using Transmitter Lenses, Applied Optics, vol. 55, No. 8, pp. 2098-2103, 2016.
Solyman Ashrafi, 32 Gbit/s 60 GHz Millimeter-Wave Wireless Communications using Orbital-Angular-Momentum and Polariza-

(56) References Cited

OTHER PUBLICATIONS tion Mulitplexing, IEEE International Communication Conference (ICC) 2016, paper 1570226040, Kuala Lumpur, Malaysia, May 2016 (IEEE, Piscataway, NJ, 2016).

Solyman Ashrafi, Tunable Generation and Angular Steering of a Millimeter-Wave Orbital-Angular-Momentum Beam using Differential Time Delays in a Circular Antenna Array, IEEE International Communication Conference (ICC) 2016, paper 1570225424, Kuala Lumpur, Malaysia, May 2016 (IEEE, Piscataway, NJ, 2016).

Solyman Ashrafi, A Dual-Channel 60 GHz Communications Link Using Patch Antenna Arrays to Generate Data-Carrying Orbital-Angular-Momentum Beams, IEEE International Communication Conference (ICC) 2016, paper 1570224643, Kuala Lumpur, Malaysia, May 2016 (IEEE, Piscataway, NJ, 2016).

Solyman Ashrafi, Demonstration of OAM-based MIMO FSO link using spatial diversity and MIMO equalization for turbulence mitigation, IEEE/OSA Conference on Optical Fiber Communications (OFC), paper Th1H.2, Anaheim, CA, Mar. 2016 (Optical Society of America, Washington, D.C., 2016).

Solyman Ashrafi, Exploiting the Unique Intensity Gradient of an Orbital-Angular-Momentum Beam for Accurate Receiver Alignment Monitoring in a Free-Space Communication Link, European Conference on Optical Communications (ECOC), paper We.3.6.2, Valencia, Spain, Sep. 2015.

Solyman Ashrafi, Dividing and Multiplying the Mode Order for Orbital-Angular-Momentum Beams, European Conference on Optical Communications (ECOC), paper Th.4.5.1, Valencia, Spain, Sep. 2015.

Solyman Ashrafi, Experimental Demonstration of a 400-Gbit/s Free Space Optical Link using Multiple Orbital-Angular-Momentum Beams with Higher Order Radial Indices, APS/IEEE/OSA Conference on Lasers and Electro-optics (CLEO), paper SW4M.5, San Jose, CA, May 2015 (OSA, Wash., D.C., 2015).

Solyman Ashrafi, Spurious Resonances and Modelling of Composite Resonators, 37th Annual Symposium on Frequency Control, 1983.

Solyman Ashrafi, Splitting and contrary motion of coherent bremsstrahlung peaks in strained-layer superlattices, Journal of Applied Physics 70:4190-4193, Dec. 1990.

Solyman Ashrafi, Nonlinear Techniques for Forecasting Solar Activity Directly From its Time Series, Proceedings of Flight Mechanics/Estimation Theory Symposium, National Aeronautics and Space Administration, May 1992.

Solyman Ashrafi, Demonstration of using Passive Integrated Phase Masks to Generate Orbital-Angular-Momentum Beams in a Communications Link, APS/IEEE/OSA Conference on Lasers and Electro-Optics (CLEO), Paper 2480002, San Jose, CA, Jun. 2016 (OSA, Wash., D.C., 2016).

Solyman Ashrafi, Combining Schatten's Solar Activity Prediction Model with a Chaotic Prediction Model, National Aeronautics and Space Administration, Nov. 1991.

Solyman Ashrafi, Detecting and Disentangling Nonlinear Structure from Solar Flux Time Series, 43rd Congress of the International Astronautical Federation, Aug. 1992.

Solyman Ashrafi, Physical Phaseplate for the Generation of a Millimeter-Wave Hermite-Gaussian Beam, IEEE Antennas and Wireless Propagation Letters, RWS 2016; pp. 234-237.

Solyman Ashrafi, Future Mission Studies: Forecasting Solar Flux Directly From Its Chaotic Time Series, Computer Sciences Corp., Dec. 1991.

Solyman Ashrafi, CMA Equalization for a 2 Gb/s Orbital Angular Momentum Multiplexed Optical Underwater Link through Thermally Induced Refractive Index Inhomogeneity, APS/IEEE/OSA Conference on Lasers and Electro-Optics (CLEO), paper 2479987, San Jose, Ca, Jun. 2016 (OSA, Wash., D.C., 2016).

Solyman Ashrafi, 4 Gbit/s Underwater Transmission Using OAM Multiplexing and Directly Modulated Green Laser, APS/IEEE/OSA Conference on Lasers and Electro-Optics (CLEO), paper 2477374, San Jose, CA, Jun. 2016 (OSA, Wash., D.C., 2016).

Solyman Ashrafi, Evidence of Chaotic Pattern in Solar Flux Through a Reproducible Sequence of Period-Doubling-Type Bifurcations; Computer Sciences Corporation (CSC); Flight Mechanics/Estimation Theory Symposium; NASA Goddard Space Flight Center; Greenbelt, Maryland; May 21-23, 1991.

Solyman Ashrafi; Future Mission Studies: Preliminary Comparisons of Solar Flux Models; NASA Goddard Space Flight Center Flight Dynamics Division; Flight Dynamics Division Code 550; Greenbelt, Maryland; Dec. 1991.

H. Yao et al.; Patch Antenna Array for the Generation of Millimeter-wave Hermite-Gaussian Beams, IEEE Antennas and Wireless Propagation Letters; 2016.

Yongxiong Ren et al.; Experimental Investigation of Data Transmission Over a Graded-index Multimode Fiber Using the Basis of Orbital Angular Momentum Modes.

Ren, Y. et al.; Experimental Demonstration of 16 Gbit/s millimeter-wave Communications using MIMO Processing of 2 OAM Modes on Each of Two TransmitterlReceiver Antenna Apertures. In Proc. IEEE GLobal TElecom. Conf. 3821-3826 (2014).

Li, X et al.; Investigation of interference in multiple-input multiple-output wireless transmission at W band for an optical wireless integration system. Optics Letters 38, 742-744 (2013).

Padgett, Miles J. et al., Divergence of an orbital-angular-momentum-carrying beam upon propagation. New Journal of Physics 17, 023011 (2015).

Mahmouli, F.E. & Walker, D. 4-Gbps Uncompressed Video Transmission over a 60-GHz Orbital Angular Momentum Wireless Channel. IEEE Wireless Communications Letters, vol. 2, No. 2, 223-226 (Apr. 2013).

Vasnetsov, M. V., Pasko, V.A. & Soskin, M.S.; Analysis of orbital angular momentum of a misaligned optical beam; New Journal of Physics 7, 46 (2005).

Byun, S.H., Haji, G.A. & Young, L.E.; Development and application of GPS signal multipath simulator; Radio Science, vol. 37, No. 6, 1098 (2002).

Tamburini, Fabrizio; Encoding many channels on the same frequency through radio vorticity: first experimental test; New Journal of Physics 14, 033001 (2012).

Gibson, G. et al., Free-space information transfer using light beans carrying orbital angular momentum; Optical Express 12, 5448-5456 (2004).

Yan, Y. et al.; High-capacity millimetre-wave communications with orbital angular momentum multiplexing; Nature Communications; 5, 4876 (2014).

Hur, Sooyoung et at.; Millimeter Wave Beamforming for Wireless Backhaul and Access in Small Cell Networks. IEEE Transactions on Communications, vol. 61, 4391-4402 (2013).

Allen, L., Beijersbergen, M., Spreeuw, R.J.C., and Woerdman, J.P.; Orbital Angular Momentum of Light and the Transformation of Laguerre-Gaussian Laser Modes; Physical Review A, vol. 45, No. 11; 8185-8189 (1992).

Anderson, Jorgen Bach; Rappaport, Theodore S.; Yoshida, Susumu; Propagation Measurements and Models for Wireless Communications Channels; 33 42-49 (1995).

Iskander, Magdy F.; Propagation Prediction Models for Wireless Communication Systems; IEEE Transactions on Microwave Theory and Techniques, vol. 50., No. 3, 662-673 (2002).

Wang, Jian, et al.; Terabit free-space data transmission employing orbital angular momentum multiplexing. Nature Photonics; 6, 488-496 (2012).

Katayama, Y., et al.; Wireless Data Center Networking with Steered-Beam mmWave Links; IEEE Wireless Communication Network Conference; 2011, 2179-2184 (2011).

Molina-Terriza, G., et al.; Management of the Angular Momentum of Light: Preparation of Photons in Multidimensional Vector States of Angular Momentum; Physical Review Letters; vol. 88, No. 1; 77, 013601/1-4 (2002).

Rapport, T.S.; Millimeter Wave Mobile Communications for 5G Cellular: It Will Work!; IEEE Access, 1, 335-349 (2013).

\* cited by examiner

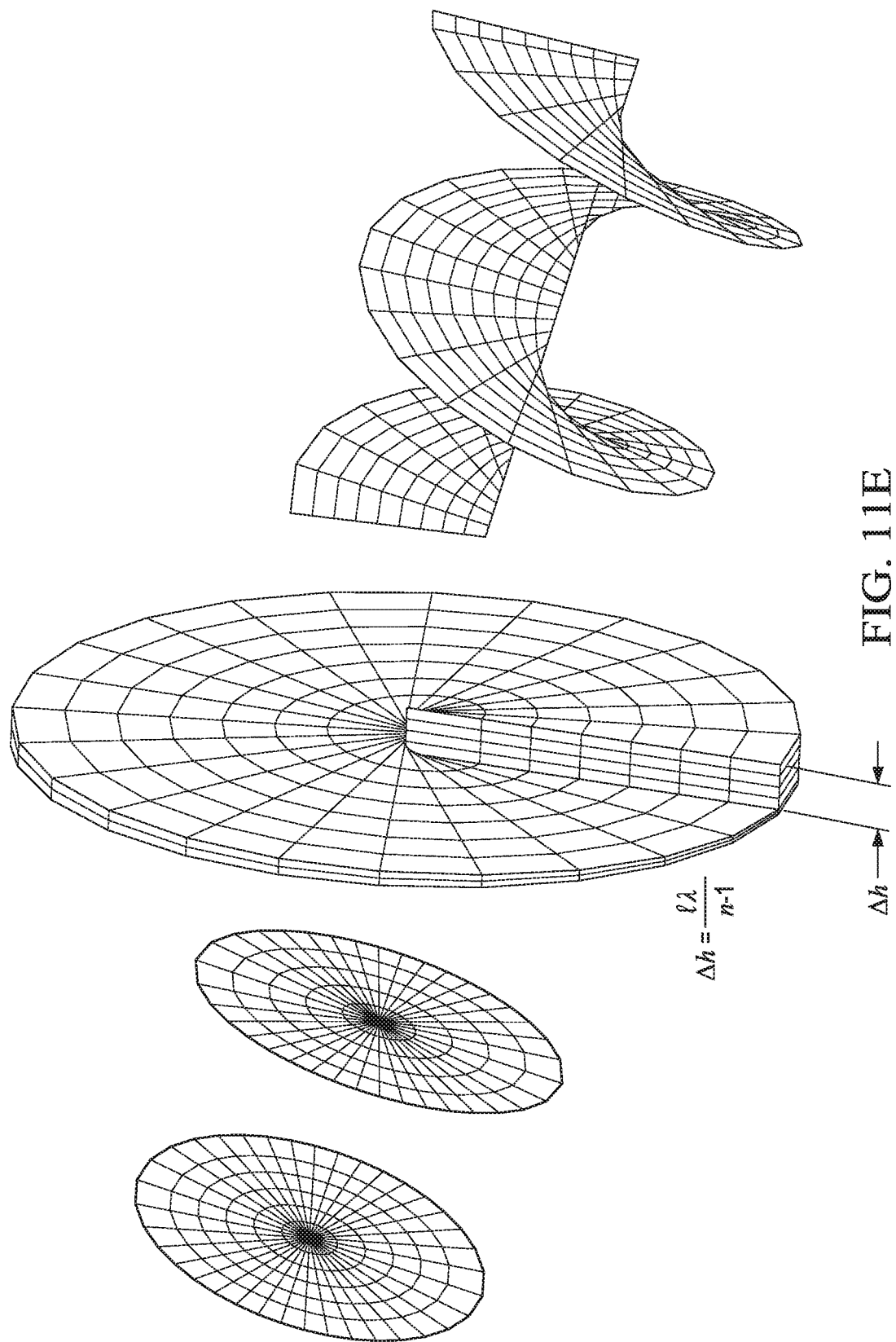

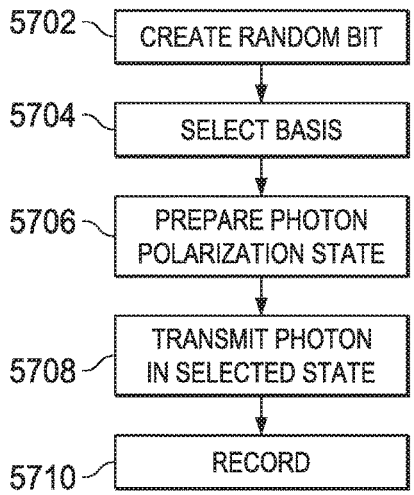
FIG. 57
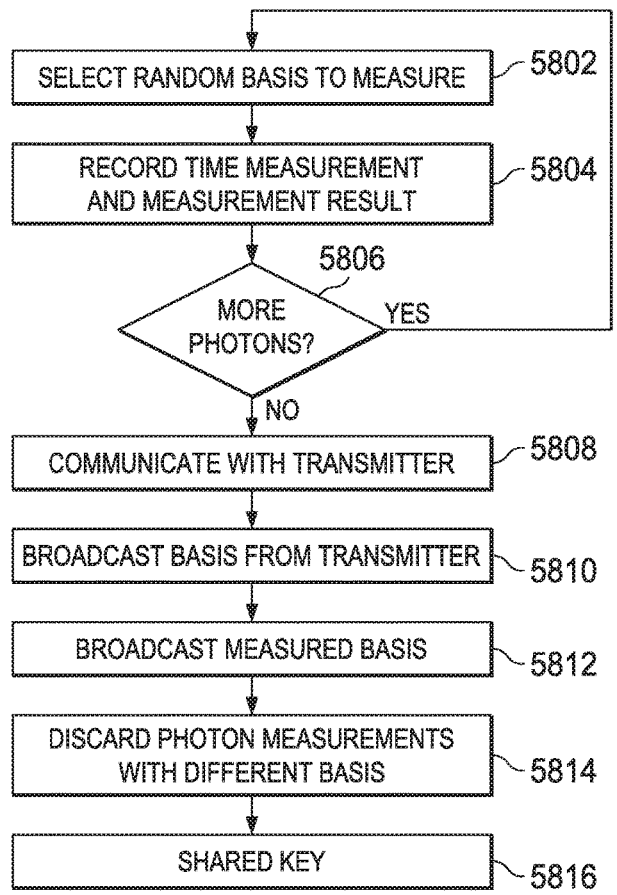
FIG. 58
FIG. 59

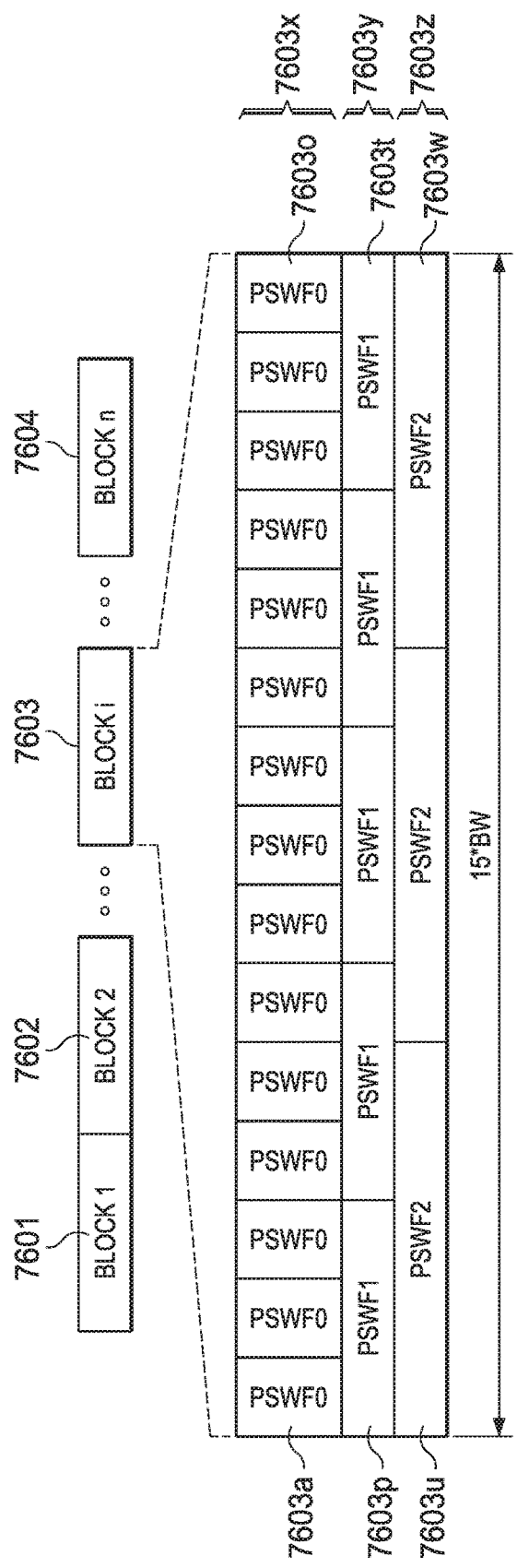
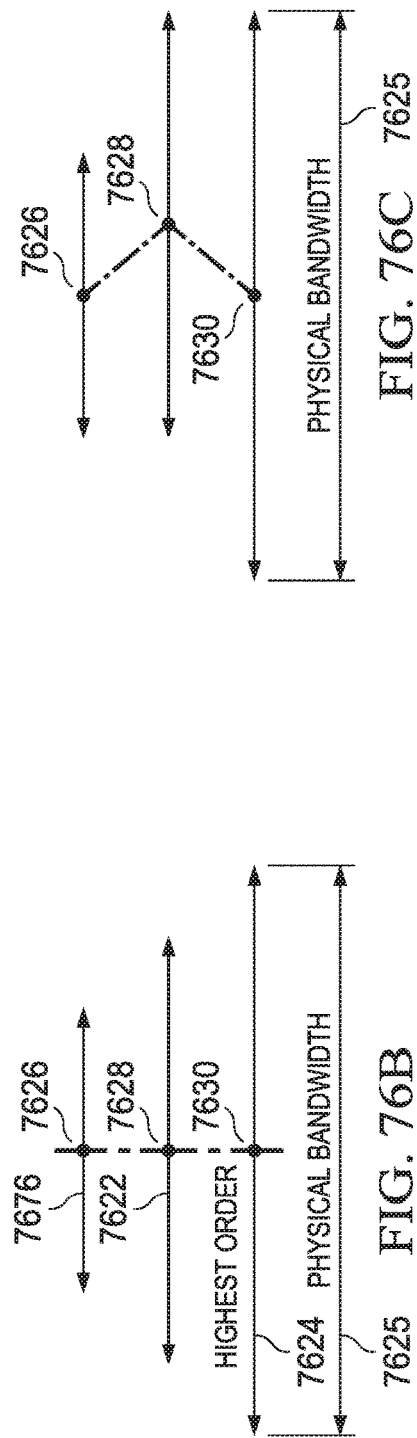
FIG. 76A
FIG. 76B
FIG. 76C

SYSTEM AND METHOD FOR COMMUNICATION USING PROLATE SPHEROIDAL WAVE FUNCTIONS

CROSS-REFERENCE TO RELATED APPLICATIONS

This application claims benefit of U.S. Provisional Patent Application No. 62/351,487, filed Jun. 17, 2016, entitled SYSTEM AND METHOD FOR COMMUNICATION USING PROLATE SPHERODAL WAVE FUNCTIONS, U.S. patent application Ser. No. 15/357,808, filed Nov. 21, 2016, entitled SYSTEM AND METHOD FOR COMMUNICATION USING ORBITAL ANGULAR MOMENTUM WITH MULTIPLE LAYER OVERLAY MODULATION, and U.S. patent application Ser. No. 14/323,082, filed Jul. 3, 2014, entitled SYSTEM AND METHOD FOR COMMUNICATION USING ORBITAL ANGULAR MOMENTUM WITH MULTIPLE OVERLAY MODULATION, now U.S. Pat. No. 9,331,875, issued May 3, 2016, each of the specifications of which are incorporated by reference herein in their entirety.

TECHNICAL FIELD

The following disclosure relates to systems and methods for increasing communication bandwidth, and more particularly to increasing communications bandwidth using prolate spheroidal wave functions.

BACKGROUND

The use of voice and data networks has greatly increased as the number of personal computing and communication devices, such as laptop computers, mobile telephones, Smartphones, tablets, et cetera, has grown. The astronomically increasing number of personal mobile communication devices has concurrently increased the amount of data being transmitted over the networks providing infrastructure for these mobile communication devices. As these mobile communication devices become more ubiquitous in business and personal lifestyles, the abilities of these networks to support all of the new users and user devices has been strained. Thus, a major concern of network infrastructure providers is the ability to increase their bandwidth in order to support the greater load of voice and data communications and particularly video that are occurring. Traditional manners for increasing the bandwidth in such systems have involved increasing the number of channels so that a greater number of communications may be transmitted, or increasing the speed at which information is transmitted over existing channels in order to provide greater throughput levels over the existing channel resources.

However, while each of these techniques have improved system bandwidths, existing technologies have taken the speed of communications to a level such that drastic additional speed increases are not possible, even though bandwidth requirements due to increased usage are continuing to grow exponentially. Additionally, the number of channels assigned for voice and data communications, while increasing somewhat, have not increased to a level to completely support the increasing demands of a voice and data intensive use society. Thus, there is a great need for some manner for increasing the bandwidth throughput within existing voice and data communication that increases the bandwidth on existing voice and data channels.

SUMMARY

The present invention, as disclosed and described herein, in one aspect thereof, comprises a method for transmitting a plurality of input streams from a first signal processing circuitry to a second signal processing circuitry processes each of a plurality of input data streams to generate a plurality of parallel pairs of data streams including an in-phase stream (I) and a quadrature-phase stream (Q) for each of the plurality of input data streams. Each of the plurality of parallel pairs of data streams are modulated with a selected one of at least three prolate spheroidal wave functions, respectively, to generate a plurality of data signals, each of the plurality of data signals associated with one of the plurality of parallel pairs of data streams. A plurality of composite data streams are generated by overlaying at least one data signal of the plurality of data signals in a first data layer with the at least one data signal of the plurality of data signals in a second data layer. The plurality of composite data streams are processed to associate with each of the plurality of composite data streams an orthogonal function to cause each of the plurality of composite data streams to be mutually orthogonal to each other on the link to enable transmission of each of the plurality of the composite data streams on the link at a same time.

BRIEF DESCRIPTION OF THE DRAWINGS

For a more complete understanding, reference is now made to the following description taken in conjunction with the accompanying Drawings in which:

FIG. 11E illustrates a spiral phase plate;

FIG. 57 is a flow diagram illustrating the process for a transmitter transmitting a quantum key;

FIG. 58 illustrates the manner in which the receiver may receive and determine a shared quantum key;

FIG. 59 more particularly illustrates the manner in which a transmitter and receiver may determine a shared quantum key;

FIG. 76A illustrates a spectral alignment of multiple level overlay signals for differing bandwidths of signals;

FIG. 76B-76C illustrate frequency domain envelopes located in separate layers within a same physical bandwidth for a Prolate Spheroidal wave function;

DETAILED DESCRIPTION

Figure 1:
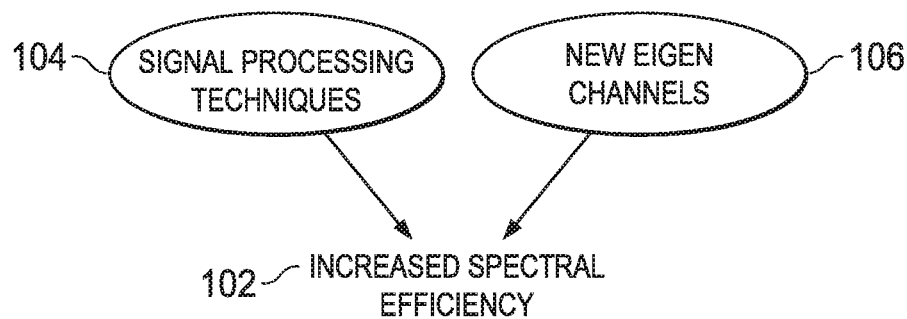
FIG. 1 illustrates various techniques for increasing spectral efficiency within a transmitted signal.

Referring now to the drawings, wherein like reference numbers are used herein to designate like elements throughout, the various views and embodiments of system and method for communication using orbital angular momentum with modulation are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

Referring now to the drawings, and more particularly to FIG. 1, wherein there is illustrated two manners for increasing spectral efficiency of a communications system. In general, there are basically two ways to increase spectral efficiency 102 of a communications system. The increase may be brought about by signal processing techniques 104 in the modulation scheme or using multiple access technique. Additionally, the spectral efficiency can be increase by creating new Eigen channels 106 within the electromagnetic propagation. These two techniques are completely independent of one another and innovations from one class can be added to innovations from the second class. Therefore, the combination of this technique introduced a further innovation.

Spectral efficiency 102 is the key driver of the business model of a communications system. The spectral efficiency is defined in units of bit/sec/Hz and the higher the spectral efficiency, the better the business model. This is because spectral efficiency can translate to a greater number of users, higher throughput, higher quality or some of each within a communications system.

Regarding techniques using signal processing techniques or multiple access techniques. These techniques include innovations such as TDMA, FDMA, CDMA, EVDO, GSM, WCDMA, HSPA and the most recent OFDM techniques used in 4G WIMAX and LTE. Almost all of these techniques use decades-old modulation techniques based on sinusoidal Eigen functions called QAM modulation. Within the second class of techniques involving the creation of new Eigen channels 106, the innovations include diversity techniques including space and polarization diversity as well as multiple input/multiple output (MIMO) where uncorrelated radio paths create independent Eigen channels and propagation of electromagnetic waves.

Figure 2:
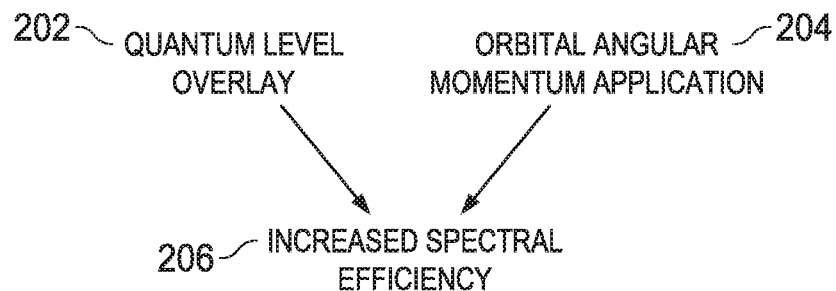
FIG. 2 illustrates a particular technique for increasing spectral efficiency within a transmitted signal.

Referring now to FIG. 2, the present communication system configuration introduces two techniques, one from the signal processing techniques 104 category and one from the creation of new eigen channels 106 category that are entirely independent from each other. Their combination provides a unique manner to disrupt the access part of an end to end communications system from twisted pair and cable to fiber optics, to free space optics, to RF used in cellular, backhaul and satellite. The first technique involves the use of a new signal processing technique using new orthogonal signals to upgrade QAM modulation using non sinusoidal functions. This is referred to as quantum level overlay (QLO) 202. The second technique involves the application of new electromagnetic wavefronts using a property of electromagnetic waves or photon, called orbital angular momentum (QAM) 104. Application of each of the quantum level overlay techniques 202 and orbital angular momentum application 204 uniquely offers orders of magnitude higher spectral efficiency 206 within communication systems in their combination.

With respect to the quantum level overlay technique 202, new eigen functions are introduced that when overlapped (on top of one another within a symbol) significantly increases the spectral efficiency of the system. The quantum level overlay technique 302 borrows from quantum mechanics, special orthogonal signals that reduce the time bandwidth product and thereby increase the spectral efficiency of the channel. Each orthogonal signal is overlaid within the symbol acts as an independent channel. These independent channels differentiate the technique from existing modulation techniques.

With respect to the application of orbital angular momentum 204, this technique introduces twisted electromagnetic waves, or light beams, having helical wave fronts that carry orbital angular momentum (OAM). Different OAM carrying waves/beams can be mutually orthogonal to each other within the spatial domain, allowing the waves/beams to be efficiently multiplexed and demultiplexed within a communications link. OAM beams are interesting in communications due to their potential ability in special multiplexing multiple independent data carrying channels.

With respect to the combination of quantum level overlay techniques 202 and orbital angular momentum application 204, the combination is unique as the OAM multiplexing technique is compatible with other electromagnetic techniques such as wave length and polarization division multiplexing. This suggests the possibility of further increasing system performance. The application of these techniques together in high capacity data transmission disrupts the access part of an end to end communications system from twisted pair and cable to fiber optics, to free space optics, to RF used in cellular/backhaul and satellites.

Each of these techniques can be applied independent of one another, but the combination provides a unique opportunity to not only increase spectral efficiency, but to increase spectral efficiency without sacrificing distance or signal to noise ratios.

Using the Shannon Capacity Equation, a determination may be made if spectral efficiency is increased. This can be mathematically translated to more bandwidth. Since bandwidth has a value, one can easily convert spectral efficiency gains to financial gains for the business impact of using higher spectral efficiency. Also, when sophisticated forward error correction (FEC) techniques are used, the net impact is higher quality but with the sacrifice of some bandwidth. However, if one can achieve higher spectral efficiency (or more virtual bandwidth), one can sacrifice some of the gained bandwidth for FEC and therefore higher spectral efficiency can also translate to higher quality.

Telecom operators and vendors are interested in increasing spectral efficiency. However, the issue with respect to this increase is the cost. Each technique at different layers of the protocol has a different price tag associated therewith. Techniques that are implemented at a physical layer have the most impact as other techniques can be superimposed on top of the lower layer techniques and thus increase the spectral efficiency further. The price tag for some of the techniques can be drastic when one considers other associated costs. For example, the multiple input multiple output (MIMO) technique uses additional antennas to create additional paths where each RF path can be treated as an independent channel and thus increase the aggregate spectral efficiency. In the MIMO scenario, the operator has other associated soft costs dealing with structural issues such as antenna installations, etc. These techniques not only have tremendous cost, but they have huge timing issues as the structural activities take time and the achieving of higher spectral efficiency comes with significant delays which can also be translated to financial losses.

The quantum level overlay technique 202 has an advantage that the independent channels are created within the symbols without needing new antennas. This will have a tremendous cost and time benefit compared to other techniques. Also, the quantum layer overlay technique 202 is a physical layer technique, which means there are other techniques at higher layers of the protocol that can all ride on top of the QLO techniques 202 and thus increase the spectral efficiency even further. QLO technique 202 uses standard QAM modulation used in OFDM based multiple access technologies such as WIMAX or LTE. QLO technique 202 basically enhances the QAM modulation at the transceiver by injecting new signals to the I & Q components of the baseband and overlaying them before QAM modulation as will be more fully described herein below. At the receiver, the reverse procedure is used to separate the overlaid signal and the net effect is a pulse shaping that allows better localization of the spectrum compared to standard QAM or even the root raised cosine. The impact of this technique is a significantly higher spectral efficiency.

Figure 3:
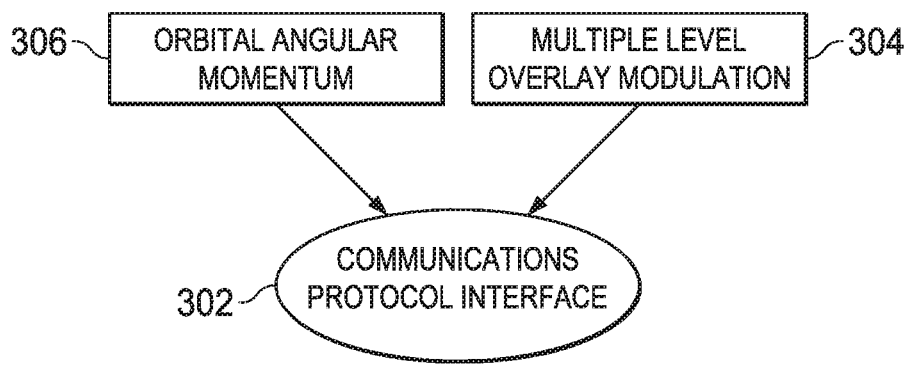
FIG. 3 illustrates a general overview of the manner for providing communication bandwidth between various communication protocol interfaces.

Referring now more particularly to FIG. 3, there is illustrated a general overview of the manner for providing improved communication bandwidth within various communication protocol interfaces 302, using a combination of multiple level overlay modulation 304 and the application of orbital angular momentum 306 to increase the number of communications channels.

The various communication protocol interfaces 302 may comprise a variety of communication links, such as RF communication, wireline communication such as cable or twisted pair connections, or optical communications making use of light wavelengths such as fiber-optic communications or free-space optics. Various types of RF communications may include a combination of RF microwave or RF satellite communication, as well as multiplexing between RF and free-space optics in real time.

By combining a multiple layer overlay modulation technique 304 with orbital angular momentum (OAM) technique 306, a higher throughput over various types of communication links 302 may be achieved. The use of multiple level overlay modulation alone without OAM increases the spectral efficiency of communication links 302, whether wired, optical, or wireless. However, with OAM, the increase in spectral efficiency is even more significant.

Multiple overlay modulation techniques 304 provide a new degree of freedom beyond the conventional 2 degrees of freedom, with time T and frequency F being independent variables in a two-dimensional notational space defining orthogonal axes in an information diagram. This comprises a more general approach rather than modeling signals as fixed in either the frequency or time domain. Previous modeling methods using fixed time or fixed frequency are considered to be more limiting cases of the general approach of using multiple level overlay modulation 304. Within the multiple level overlay modulation technique 304, signals may be differentiated in two-dimensional space rather than along a single axis. Thus, the information-carrying capacity of a communications channel may be determined by a number of signals which occupy different time and frequency coordinates and may be differentiated in a notational two-dimensional space.

Within the notational two-dimensional space, minimization of the time bandwidth product, i.e., the area occupied by a signal in that space, enables denser packing, and thus, the use of more signals, with higher resulting information-carrying capacity, within an allocated channel. Given the frequency channel delta ($\Delta f$), a given signal transmitted through it in minimum time $\Delta t$ will have an envelope described by certain time-bandwidth minimizing signals. The time-bandwidth products for these signals take the form;

$$\Delta t \Delta f = \tfrac{1}{2}(2n+1)$$

where n is an integer ranging from 0 to infinity, denoting the order of the signal.

These signals form an orthogonal set of infinite elements, where each has a finite amount of energy. They are finite in both the time domain and the frequency domain, and can be detected from a mix of other signals and noise through correlation, for example, by match filtering. Unlike other wavelets, these orthogonal signals have similar time and frequency forms.

The orbital angular momentum process 306 provides a twist to wave fronts of the electromagnetic fields carrying the data stream that may enable the transmission of multiple data streams on the same frequency, wavelength, or other signal-supporting mechanism. This will increase the bandwidth over a communications link by allowing a single frequency or wavelength to support multiple eigen channels, each of the individual channels having a different orthogonal and independent orbital angular momentum associated therewith.

Figure 4:
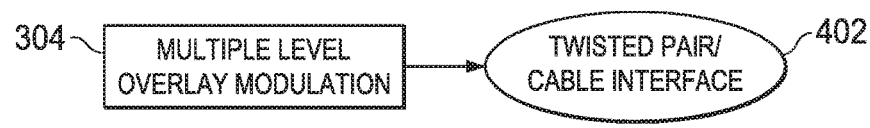
FIG. 4 illustrates the manner for utilizing multiple level overlay modulation with twisted pair/cable interfaces.

Referring now to FIG. 4, there is illustrated a further communication implementation technique using the above described techniques as twisted pairs or cables carry electrons (not photons). Rather than using each of the multiple level overlay modulation 304 and orbital angular momentum techniques 306, only the multiple level overlay modulation 304 can be used in conjunction with a single wireline interface and, more particularly, a twisted pair communication link or a cable communication link 402. The operation of the multiple level overlay modulation 404, is similar to that discussed previously with respect to FIG. 3, but is used by itself without the use of orbital angular momentum techniques 306, and is used with either a twisted pair communication link or cable interface communication link 402.

Figure 5:
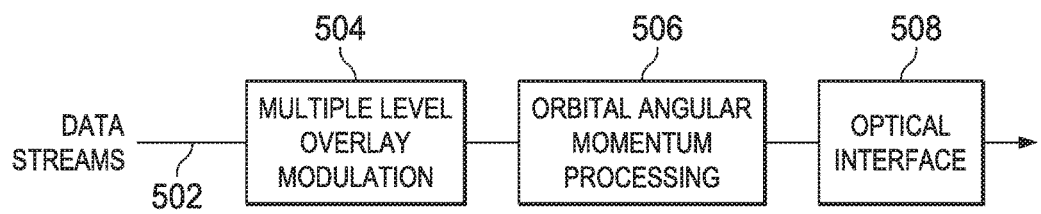
FIG. 5 illustrates a general block diagram for processing a plurality of data streams within an optical communication system.

Referring now to FIG. 5, there is illustrated a general block diagram for processing a plurality of data streams 502 for transmission in an optical communication system. The multiple data streams 502 are provided to the multi-layer overlay modulation circuitry 504 wherein the signals are modulated using the multi-layer overlay modulation technique. The modulated signals are provided to orbital angular momentum processing circuitry 506 which applies a twist to each of the wave fronts being transmitted on the wavelengths of the optical communication channel. The twisted waves are transmitted through the optical interface 508 over an optical communications link such as an optical fiber or free space optics communication system. FIG. 5 may also illustrate an RF mechanism wherein the interface 508 would comprise and RF interface rather than an optical interface.

Figure 6:
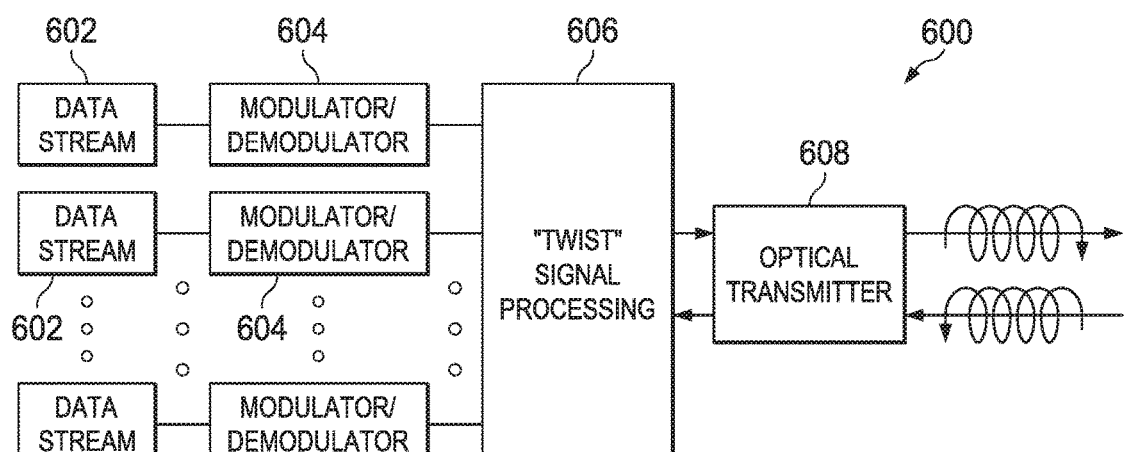
FIG. 6 is a functional block diagram of a system for generating orbital angular momentum within a communication system.

Referring now more particularly to FIG. 6, there is illustrated a functional block diagram of a system for generating the orbital angular momentum "twist" within a communication system, such as that illustrated with respect to FIG. 3, to provide a data stream that may be combined with multiple other data streams for transmission upon a same wavelength or frequency. While the following descriptions is made with respect to applying and orbital angular momentum, the system may also be configured to apply a prolate spheroidal wave function to received data streams instead as described more fully with respect to attachment A. Multiple data streams 602 are provided to the transmission processing circuitry 600. Each of the data streams 602 comprises, for example, an end to end link connection carrying a voice call or a packet connection transmitting non-circuit switch packed data over a data connection. The multiple data streams 602 are processed by modulator/demodulator circuitry 604. The modulator/demodulator circuitry 604 modulates the received data stream 602 onto a wavelength or frequency channel using a multiple level overlay modulation technique, as will be more fully described herein below. The communications link may comprise an optical fiber link, free-space optics link, RF microwave link, RF satellite link, wired link (without the twist), etc.

The modulated data stream is provided to the orbital angular momentum (OAM) signal processing block 606. Each of the modulated data streams from the modulator/demodulator 604 are provided a different orbital angular momentum by the orbital angular momentum electromagnetic block 606 such that each of the modulated data streams have a unique and different orbital angular momentum associated therewith. Each of the modulated signals having an associated orbital angular momentum are provided to an optical transmitter 608 that transmits each of the modulated data streams having a unique orbital angular momentum on a same wavelength. Each wavelength has a selected number of bandwidth slots B and may have its data transmission capability increase by a factor of the number of degrees of orbital angular momentum l that are provided from the OAM electromagnetic block 606. The optical transmitter 608 transmitting signals at a single wavelength could transmit B groups of information. The optical transmitter 608 and OAM electromagnetic block 606 may transmit l×B groups of information according to the configuration described herein.

In a receiving mode, the optical transmitter 608 will have a wavelength including multiple signals transmitted therein having different orbital angular momentum signals embedded therein. The optical transmitter 608 forwards these signals to the OAM signal processing block 606, which separates each of the signals having different orbital angular momentum and provides the separated signals to the demodulator circuitry 604. The demodulation process extracts the data streams 602 from the modulated signals and provides it at the receiving end using the multiple layer overlay demodulation technique.

Figure 7:
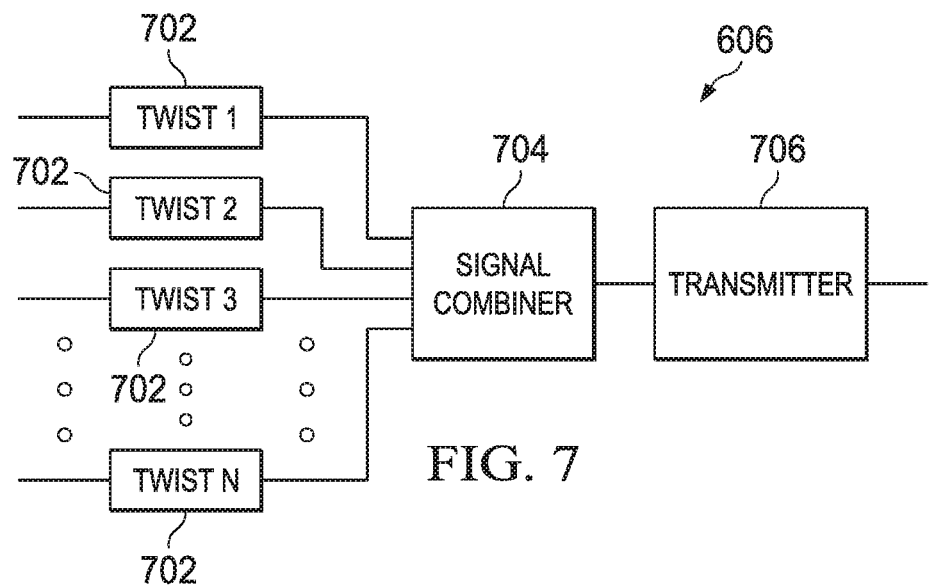
FIG. 7 is a functional block diagram of the orbital angular momentum signal processing block of FIG. 6.

Referring now to FIG. 7, there is provided a more detailed functional description of the OAM signal processing block 606. Each of the input data streams are provided to OAM circuitry 702. Each of the OAM circuitry 702 provides a different orbital angular momentum to the received data stream. The different orbital angular momentums are achieved by applying different currents for the generation of the signals that are being transmitted to create a particular orbital angular momentum associated therewith. The orbital angular momentum provided by each of the OAM circuitries 702 are unique to the data stream that is provided thereto. An infinite number of orbital angular momentums may be applied to different input data streams using many different currents. Each of the separately generated data streams are provided to a signal combiner 704, which combines the signals onto a wavelength for transmission from the transmitter 706.

Figure 8:
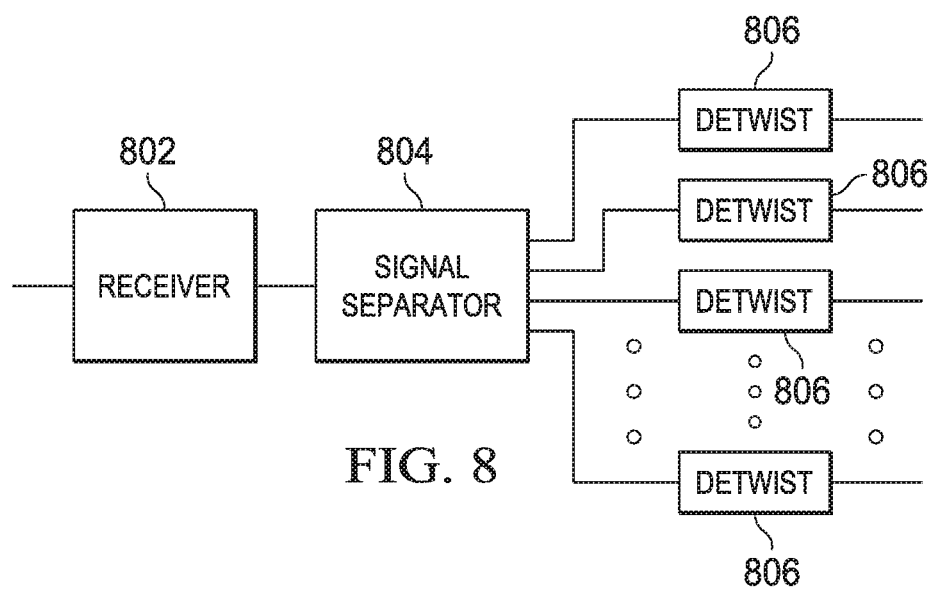
FIG. 8 is a functional block diagram illustrating the manner for removing orbital angular momentum from a received signal including a plurality of data streams.

Referring now to FIG. 8, there is illustrated the manner in which the OAM processing circuitry 606 may separate a received signal into multiple data streams. The receiver 802 receives the combined OAM signals on a single wavelength and provides this information to a signal separator 804. The signal separator 804 separates each of the signals having different orbital angular momentums from the received wavelength and provides the separated signals to OAM de-twisting circuitry 806. The OAM de-twisting circuitry 806 removes the associated OAM twist from each of the associated signals and provides the received modulated data stream for further processing. The signal separator 804 separates each of the received signals that have had the orbital angular momentum removed therefrom into individual received signals. The individually received signals are provided to the receiver 802 for demodulation using, for example, multiple level overlay demodulation as will be more fully described herein below.

Figure 9:
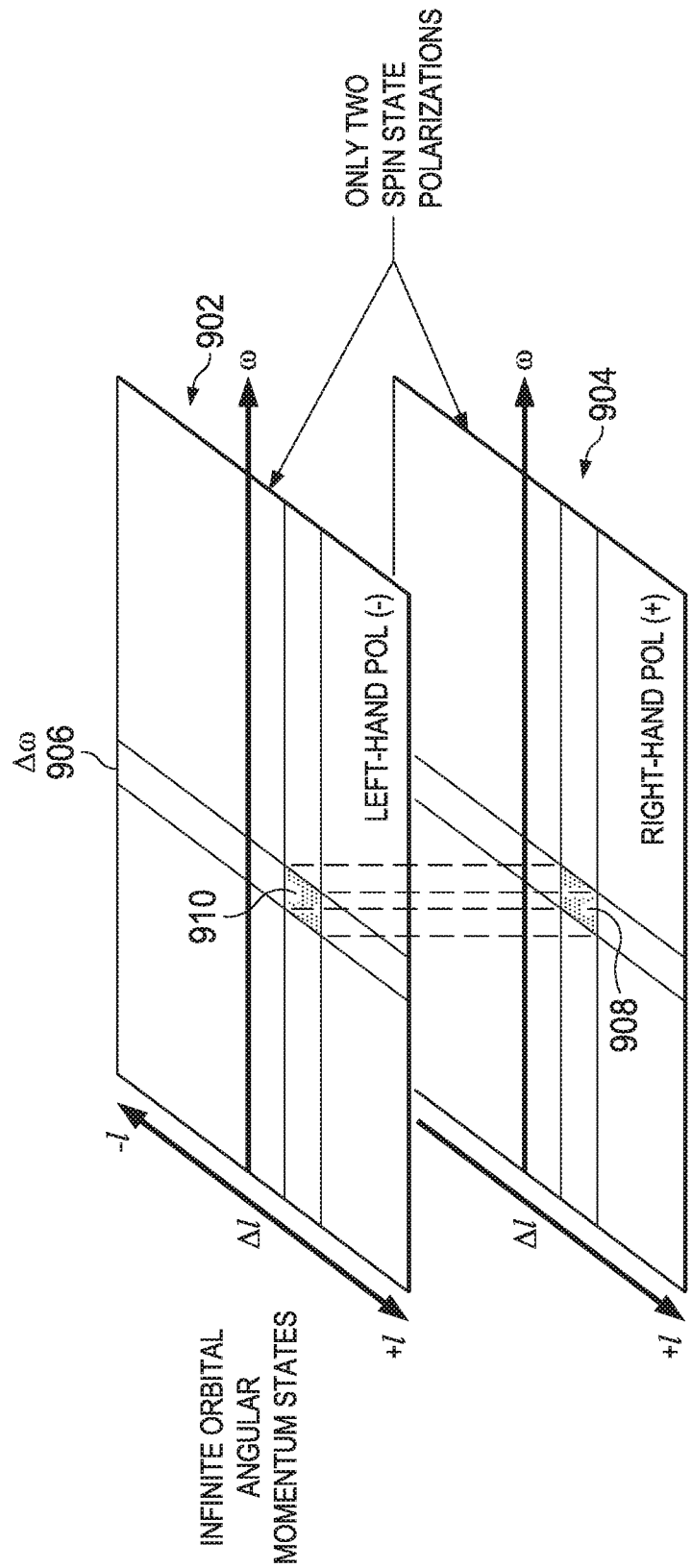
FIG. 9 illustrates a single wavelength having two quanti-spin polarizations providing an infinite number of signals having various orbital angular momentums associated therewith.

FIG. 9 illustrates in a manner in which a single wavelength or frequency, having two quanti-spin polarizations may provide an infinite number of twists having various orbital angular momentums associated therewith. The l axis represents the various quantized orbital angular momentum states which may be applied to a particular signal at a selected frequency or wavelength. The symbol omega (ω) represents the various frequencies to which the signals of differing orbital angular momentum may be applied. The top grid 902 represents the potentially available signals for a left handed signal polarization, while the bottom grid 904 is for potentially available signals having right handed polarization.

By applying different orbital angular momentum states to a signal at a particular frequency or wavelength, a potentially infinite number of states may be provided at the frequency or wavelength. Thus, the state at the frequency $\Delta\omega$ or wavelength 906 in both the left handed polarization plane 902 and the right handed polarization plane 904 can provide an infinite number of signals at different orbital angular momentum states $\Delta l$. Blocks 908 and 910 represent a particular signal having an orbital angular momentum $\Delta l$ at a frequency $\Delta\omega$ or wavelength in both the right handed polarization plane 904 and left handed polarization plane 910, respectively. By changing to a different orbital angular momentum within the same frequency $\Delta\omega$ or wavelength 906, different signals may also be transmitted. Each angular momentum state corresponds to a different determined current level for transmission from the optical transmitter. By estimating the equivalent current for generating a particular orbital angular momentum within the optical domain and applying this current for transmission of the signals, the transmission of the signal may be achieved at a desired orbital angular momentum state.

Thus, the illustration of FIG. 9, illustrates two possible angular momentums, the spin angular momentum, and the orbital angular momentum. The spin version is manifested within the polarizations of macroscopic electromagnetism, and has only left and right hand polarizations due to up and down spin directions. However, the orbital angular momentum indicates an infinite number of states that are quantized. The paths are more than two and can theoretically be infinite through the quantized orbital angular momentum levels.

Using the orbital angular momentum state of the transmitted energy signals, physical information can be embedded within the radiation transmitted by the signals. The Maxwell-Heaviside equations can be represented as:

$$\nabla \cdot E = \frac{\rho}{\varepsilon_0}$$

$$\nabla \times E = -\frac{\partial B}{\partial t}$$

$$\nabla \cdot B = 0$$

$$\nabla \times B = \varepsilon_0 \mu_0 \frac{\partial E}{\partial t} + \mu_0 j(t, x)$$

where $\nabla$ is the del operator, E is the electric field intensity and B is the magnetic flux density. Using these equations, one can derive 23 symmetries/conserved quantities from Maxwell's original equations. However, there are only ten well-known conserved quantities and only a few of these are commercially used. Historically if Maxwell's equations where kept in their original quaternion forms, it would have been easier to see the symmetries/conserved quantities, but when they were modified to their present vectorial form by Heaviside, it became more difficult to see such inherent symmetries in Maxwell's equations.

Maxwell's linear theory is of U(1) symmetry with Abelian commutation relations. They can be extended to higher symmetry group SU(2) form with non-Abelian commutation relations that address global (non-local in space) properties. The Wu-Yang and Harmuth interpretation of Maxwell's theory implicates the existence of magnetic monopoles and magnetic charges. As far as the classical fields are concerned, these theoretical constructs are pseudo-particle, or instanton. The interpretation of Maxwell's work actually departs in a significant ways from Maxwell's original intention. In Maxwell's original formulation, Faraday's electrotonic states (the A$\mu$ field) was central making them compatible with Yang-Mills theory (prior to Heaviside). The mathematical dynamic entities called solitons can be either classical or quantum, linear or non-linear and describe EM waves. However, solitons are of SU(2) symmetry forms. In order for conventional interpreted classical Maxwell's theory of U(1) symmetry to describe such entities, the theory must be extended to SU(2) forms.

Besides the half dozen physical phenomena (that cannot be explained with conventional Maxwell's theory), the recently formulated Harmuth Ansatz also address the incompleteness of Maxwell's theory. Harmuth amended Maxwell's equations can be used to calculate EM signal velocities provided that a magnetic current density and magnetic charge are added which is consistent to Yang-Mills filed equations. Therefore, with the correct geometry and topology, the A$\mu$ potentials always have physical meaning The conserved quantities and the electromagnetic field can be represented according to the conservation of system energy and the conservation of system linear momentum. Time symmetry, i.e. the conservation of system energy can be represented using Poynting's theorem according to the equations:

$$H = \sum_i m_i \gamma_i c^2 + \frac{\varepsilon_0}{2} \int d^3x (|E|^2 + c^2|B|^2) \quad \textit{Hamiltonian (total energy)}$$

$$\frac{dU^{mech}}{dt} + \frac{dU^{em}}{dt} + \oint_{s'} d^2x' \hat{n}' \cdot S = 0 \text{ conservation of energy}$$

The space symmetry, i.e., the conservation of system linear momentum representing the electromagnetic Doppler shift can be represented by the equations:

$$p = \sum_i m_i \gamma_i v_i + \varepsilon_0 \int d^3 \times (E \times B) \qquad \text{linear momentum}$$

$$\frac{dp^{mech}}{dt} + \frac{dp^{em}}{dt} + \oint_{s'} d^2x' n' \cdot T = 0 \qquad \text{conservation of linear momentum}$$

The conservation of system center of energy is represented by the equation:

$$R = \frac{1}{H}\sum_i (x_i - x_0)m_i \gamma_i c^2 + \frac{\varepsilon_0}{2H}\int d^3x (x - x_0)(|E^2| + c^2|B^2|)$$

Similarly, the conservation of system angular momentum, which gives rise to the azimuthal Doppler shift is represented by the equation:

$$\frac{dJ^{mech}}{dt} + \frac{dJ^{em}}{dt} + \oint_{s'} d^2x' n' \cdot M = 0 \qquad \text{conservation of angular momentum}$$

For radiation beams in free space, the EM field angular momentum $J^{em}$ can be separated into two parts:

$$J^{em} = \varepsilon_0 \int_V d^3x'(E \times A) + \varepsilon_0 \int_V d^3x' E_i[(x' - x_0) \times \nabla]A_i$$

For each singular Fourier mode in real valued representation:

$$J^{em} = -i\frac{\varepsilon_0}{2\omega}\int_{V'} d^3x'(E^* \times E) - i\frac{\varepsilon_0}{2\omega}\int_{V'} d^3x' E_i[(x'-x_0)\times\nabla]E_i$$

The first part is the EM spin angular momentum $S^{em}$, its classical manifestation is wave polarization. And the second part is the EM orbital angular momentum $L^{em}$ its classical manifestation is wave helicity. In general, both EM linear momentum $P^{em}$, and EM angular momentum $J^{em}=L^{em}+S^{em}$ are radiated all the way to the far field.

By using Poynting theorem, the optical vorticity of the signals may be determined according to the optical velocity equation:

$$\frac{\partial U}{\partial t} + \nabla \cdot S = 0, \qquad \text{continuity equation}$$

where S is the Poynting vector $$S = \frac{1}{4}(E\times H^* + E^* \times H),$$

and U is the energy density $$U = \frac{1}{4}(\varepsilon|E|^2 + \mu_0|H|^2),$$

with E and H comprising the electric field and the magnetic field, respectively, and $\varepsilon$ and $\mu_0$ being the permittivity and the permeability of the medium, respectively. The optical vorticity V may then be determined by the curl of the optical velocity according to the equation:

$$V = \nabla \times v_{opt} = \nabla \times \left(\frac{E\times H^* + E^* \times H}{\varepsilon|E|^2 + \mu_0|H|^2}\right)$$

Figure 10A:
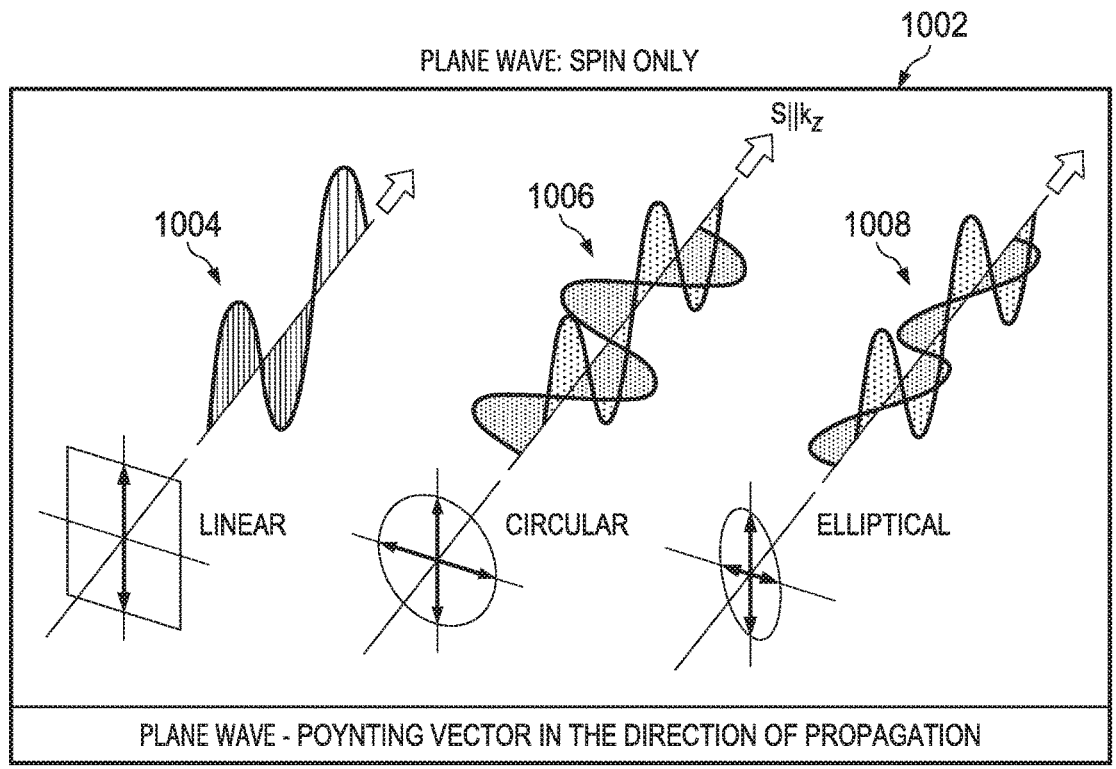
FIG. 10A illustrates a plane wave having only variations in the spin angular momentum.
Figure 10B:
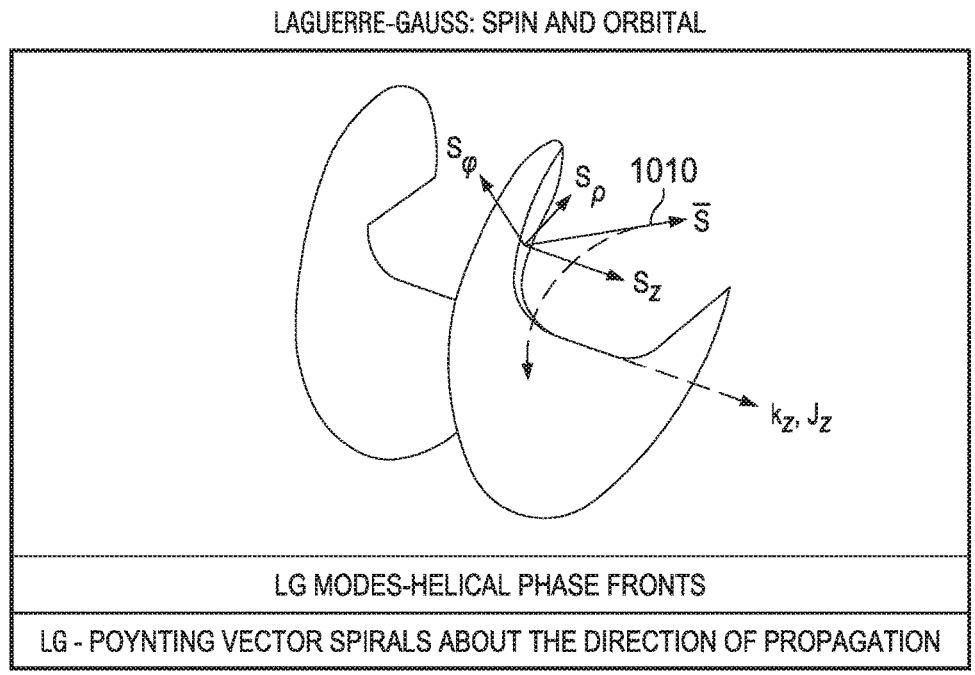
FIG. 10B illustrates a signal having both spin and orbital angular momentum applied thereto.

Referring now to FIGS. 10A and 10B, there is illustrated the manner in which a signal and its associated Poynting vector in a plane wave situation. In the plane wave situation illustrated generally at 1002, the transmitted signal may take one of three configurations. When the electric field vectors are in the same direction, a linear signal is provided, as illustrated generally at 1004. Within a circular polarization 1006, the electric field vectors rotate with the same magnitude. Within the elliptical polarization 1008, the electric field vectors rotate but have differing magnitudes. The Poynting vector remains in a constant direction for the signal configuration to FIG. 10A and always perpendicular to the electric and magnetic fields. Referring now to FIG. 10B, when a unique orbital angular momentum is applied to a signal as described here and above, the Poynting vector S 1010 will spiral about the direction of propagation of the signal. This spiral may be varied in order to enable signals to be transmitted on the same frequency as described herein.

Figure 11A:
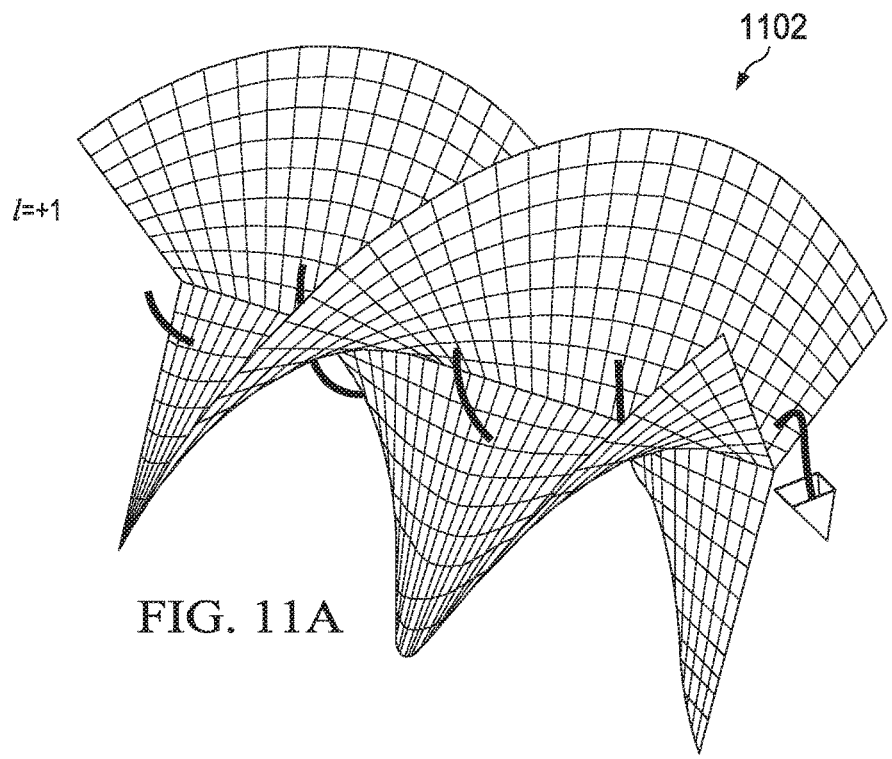
FIGS. 11A-11C illustrate various signals having different orbital angular momentum applied thereto.
Figure 11B:
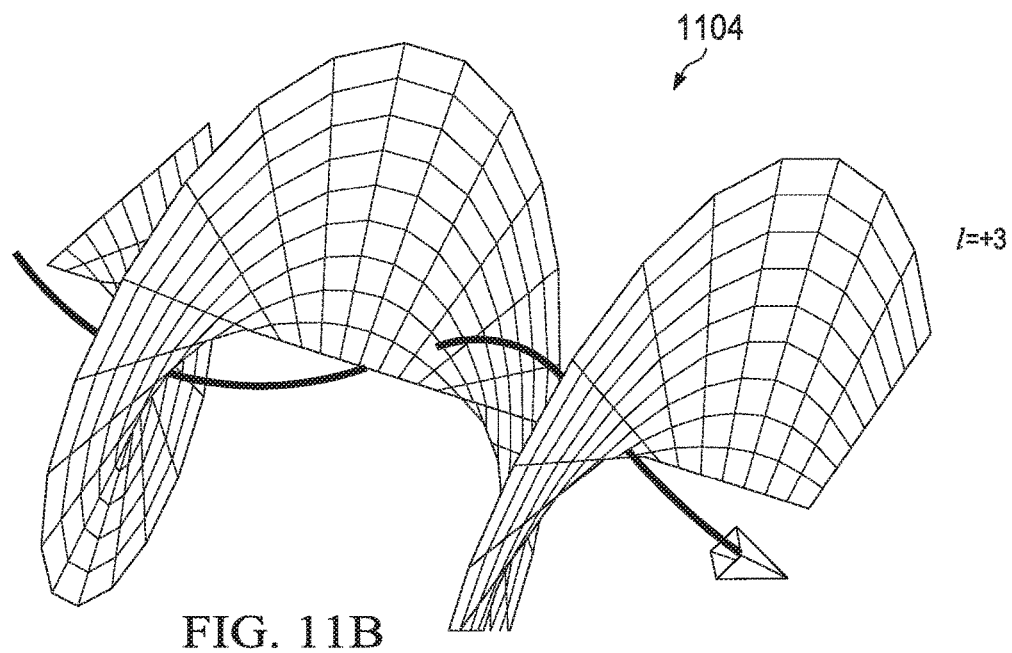
Figure 11C:
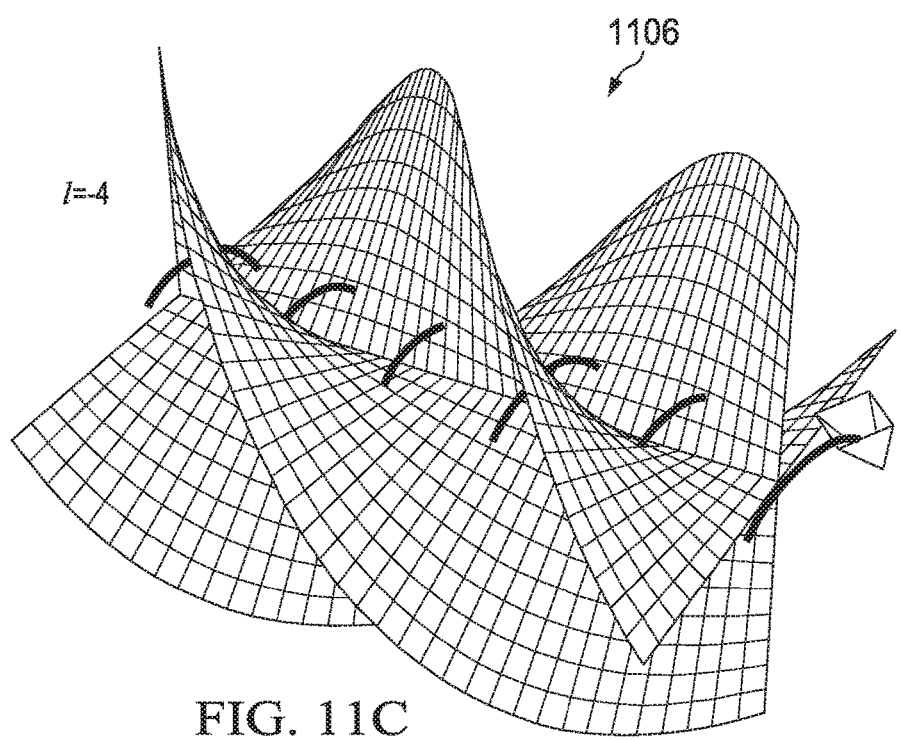

FIGS. 11A through 11C illustrate the differences in signals having different helicity (i.e., orbital angular momentums). Each of the spiraling Poynting vectors associated with the signals 1102, 1104, and 1106 provide a different shaped signal. Signal 1102 has an orbital angular momentum of +1, signal 1104 has an orbital angular momentum of +3, and signal 1106 has an orbital angular momentum of −4. Each signal has a distinct angular momentum and associated Poynting vector enabling the signal to be distinguished from other signals within a same frequency. This allows differing type of information to be transmitted on the same frequency, since these signals are separately detectable and do not interfere with each other (Eigen channels).

Figure 11D:
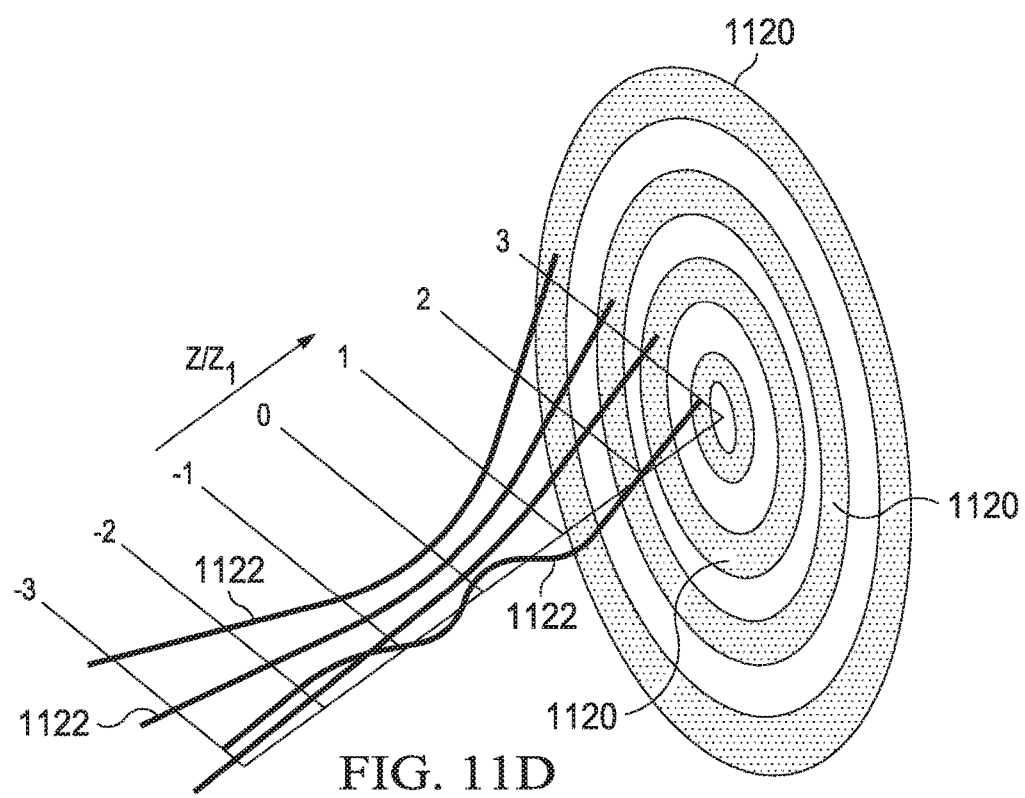
FIG. 11D illustrates a propagation of Poynting vectors for various Eigen modes.

FIG. 11D illustrates the propagation of Poynting vectors for various Eigen modes. Each of the rings 1120 represents a different Eigen mode or twist representing a different orbital angular momentum within the same frequency. Each of these rings 1120 represents a different orthogonal channel. Each of the Eigen modes has a Poynting vector 1122 associated therewith.

Topological charge may be multiplexed to the frequency for either linear or circular polarization. In case of linear polarizations, topological charge would be multiplexed on vertical and horizontal polarization. In case of circular polarization, topological charge would multiplex on left hand and right hand circular polarizations. The topological charge is another name for the helicity index "l" or the amount of twist or OAM applied to the signal. The helicity index may be positive or negative. In RF, different topological charges can be created and muxed together and de-muxed to separate the topological charges.

The topological charges s can be created using Spiral Phase Plates (SPPs) as shown in FIG. 11E using a proper material with specific index of refraction and ability to machine shop or phase mask, holograms created of new materials or a new technique to create an RF version of Spatial Light Modulator (SLM) that does the twist of the RF waves (as opposed to optical beams) by adjusting voltages on the device resulting in twisting of the RF waves with a specific topological charge. Spiral Phase plates can transform a RF plane wave (l=0) to a twisted RF wave of a specific helicity (i.e. l=+1).

Cross talk and multipath interference can be corrected using RF Multiple-Input-Multiple-Output (MIMO). Most of the channel impairments can be detected using a control or pilot channel and be corrected using algorithmic techniques (closed loop control system).

As described previously with respect to FIG. 5, each of the multiple data streams applied within the processing circuitry has a multiple layer overlay modulation scheme applied thereto.

Figure 12:
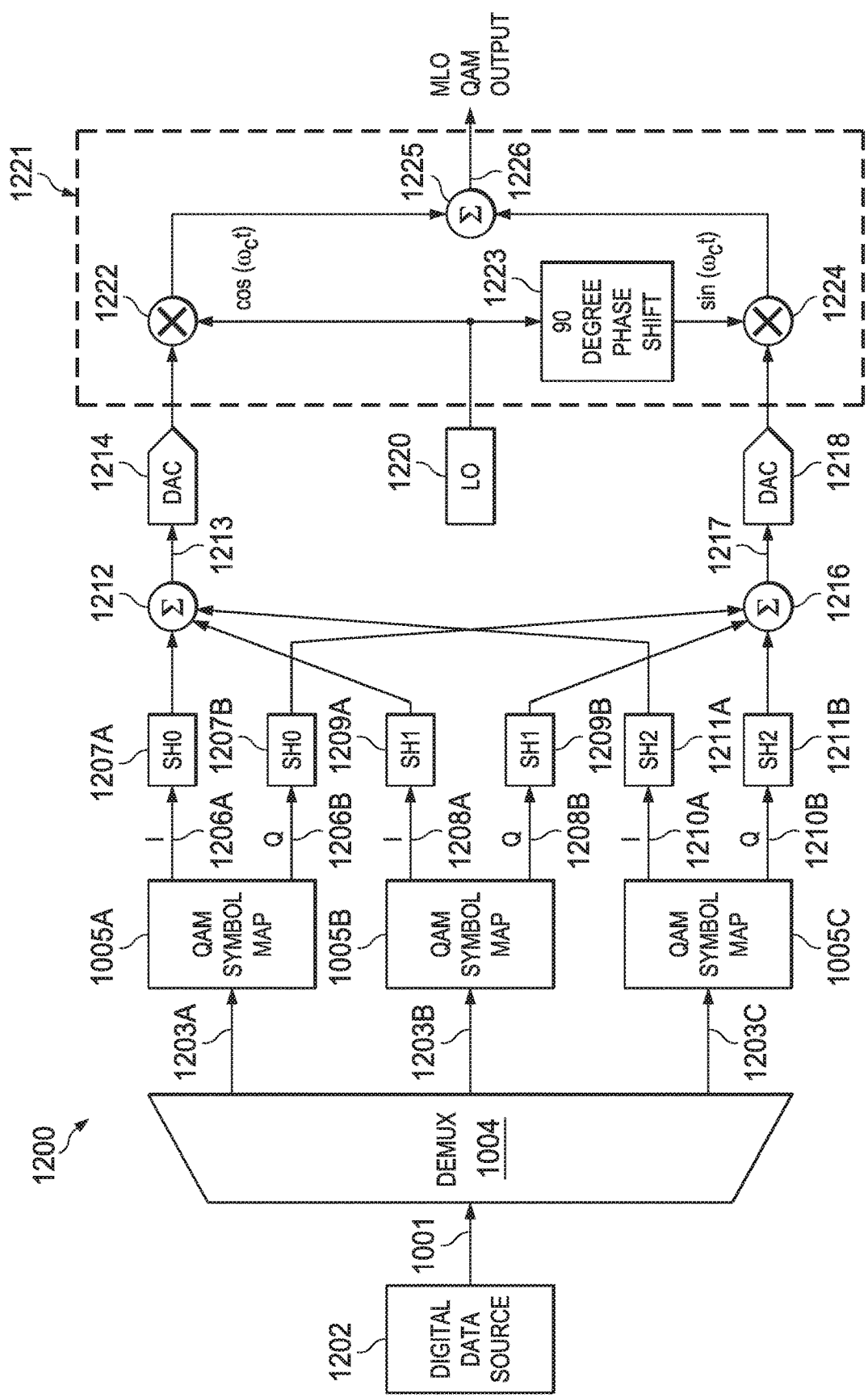
FIG. 12 illustrates a multiple level overlay modulation system.

Referring now to FIG. 12, the reference number 1200 generally indicates an embodiment of a multiple level overlay (MLO) modulation system, although it should be understood that the term MLO and the illustrated system 1200 are examples of embodiments. The MLO system may comprise one such as that disclosed in U.S. Pat. No. 8,503,546 entitled Multiple Layer Overlay Modulation which is incorporated herein by reference. In one example, the modulation system 1200 would be implemented within the multiple level overlay modulation box 504 of FIG. 5. System 1200 takes as input an input data stream 1201 from a digital source 1202, which is separated into three parallel, separate data streams, 1203A-1203C, of logical 1s and 0s by input stage demultiplexer (DEMUX) 1004. Data stream 1001 may represent a data file to be transferred, or an audio or video data stream. It should be understood that a greater or lesser number of separated data streams may be used. In some of the embodiments, each of the separated data streams 1203A-1203C has a data rate of 1/N of the original rate, where N is the number of parallel data streams. In the embodiment illustrated in FIG. 12, N is 3.

Each of the separated data streams 1203A-1203C is mapped to a quadrature amplitude modulation (QAM) symbol in an M-QAM constellation, for example, 16 QAM or 64 QAM, by one of the QAM symbol mappers 1205A-C. The QAM symbol mappers 1205A-C are coupled to respective outputs of DEMUX 1204, and produced parallel in phase (I) 1206A, 1208A, and 1210A and quadrature phase (Q) 1206B, 1208B, and 1210B data streams at discrete levels. For example, in 64 QAM, each I and Q channel uses 8 discrete levels to transmit 3 bits per symbol. Each of the three I and Q pairs, 1206A-1206B, 1208A-1208B, and 1210A-1210B, is used to weight the output of the corresponding pair of function generators 1207A-1207B, 1209A-1209B, and 1211A-1211B, which in some embodiments generate signals such as the modified Hermite polynomials described above and weights them based on the amplitude value of the input symbols. The function generators 1207A-1207B, 1209A-1209B, and 1211A-1211B may also generate and apply Prolate Spheroidal Wave Functions (PSWFs) which are more fully described herein below. PFWFs are orthogonal functions that maintain their orthogonality even when truncated. This provides 2N weighted or modulated signals, each carrying a portion of the data originally from income data stream 1201, and is in place of modulating each symbol in the I and Q pairs, 1206A-1206B, 1208A-1208B, and 1210A-1210B with a raised cosine filter, as would be done for a prior art QAM system. In the illustrated embodiment, three signals are used, SH0, SH1, and SH2, which correspond to modifications of H0, H1, and H2, respectively, although it should be understood that different signals may be used in other embodiments.

The weighted signals are not subcarriers, but rather are sublayers of a modulated carrier, and are combined, superimposed in both frequency and time, using summers 1212 and 1216, without mutual interference in each of the I and Q dimensions, due to the signal orthogonality. Summers 1212 and 1216 act as signal combiners to produce composite signals 1213 and 1217. The weighted orthogonal signals are used for both I and Q channels, which have been processed equivalently by system 1200, and are summed before the QAM signal is transmitted. Therefore, although new orthogonal functions are used, some embodiments additionally use QAM for transmission. Because of the tapering of the signals in the time domain, as will be shown in FIGS. 16A through 16K, the time domain waveform of the weighted signals will be confined to the duration of the symbols. Further, because of the tapering of the special signals and frequency domain, the signal will also be confined to frequency domain, minimizing interface with signals and adjacent channels.

The composite signals 1213 and 1217 are converted to analogue signals 1215 and 1219 using digital to analogue converters 1214 and 1218, and are then used to modulate a carrier signal at the frequency of local oscillator (LO) 1220, using modulator 1221. Modulator 1221 comprises mixers 1222 and 1224 coupled to DACs 1214 and 1218, respectively. Ninety degree phase shifter 1223 converts the signals from LO 1220 into a Q component of the carrier signal. The output of mixers 1222 and 1224 are summed in summer 1225 to produce output signals 1226.

MLO can be used with a variety of transport mediums, such as wire, optical, and wireless, and may be used in conjunction with QAM. This is because MLO uses spectral overlay of various signals, rather than spectral overlap. Bandwidth utilization efficiency may be increased by an order of magnitude, through extensions of available spectral resources into multiple layers. The number of orthogonal signals is increased from 2, cosine and sine, in the prior art, to a number limited by the accuracy and jitter limits of generators used to produce the orthogonal polynomials. In this manner, MLO extends each of the I and Q dimensions of QAM to any multiple access techniques such as GSM, code division multiple access (CDMA), wide band CDMA (WCDMA), high speed downlink packet access (HSPDA), evolution-data optimized (EV-DO), orthogonal frequency division multiplexing (OFDM), world-wide interoperability for microwave access (WIMAX), and long term evolution (LTE) systems. MLO may be further used in conjunction with other multiple access (MA) schemes such as frequency division duplexing (FDD), time division duplexing (TDD), frequency division multiple access (FDMA), and time division multiple access (TDMA). Overlaying individual orthogonal signals over the same frequency band allows creation of a virtual bandwidth wider than the physical bandwidth, thus adding a new dimension to signal processing. This modulation is applicable to twisted pair, cable, fiber optic, satellite, broadcast, free-space optics, and all types of wireless access. The method and system are compatible with many current and future multiple access systems, including EV-DO, UMB, WIMAX, WCDMA (with or without), multimedia broadcast multicast service (MBMS)/multiple input multiple output (MIMO), HSPA evolution, and LTE.

Figure 13:
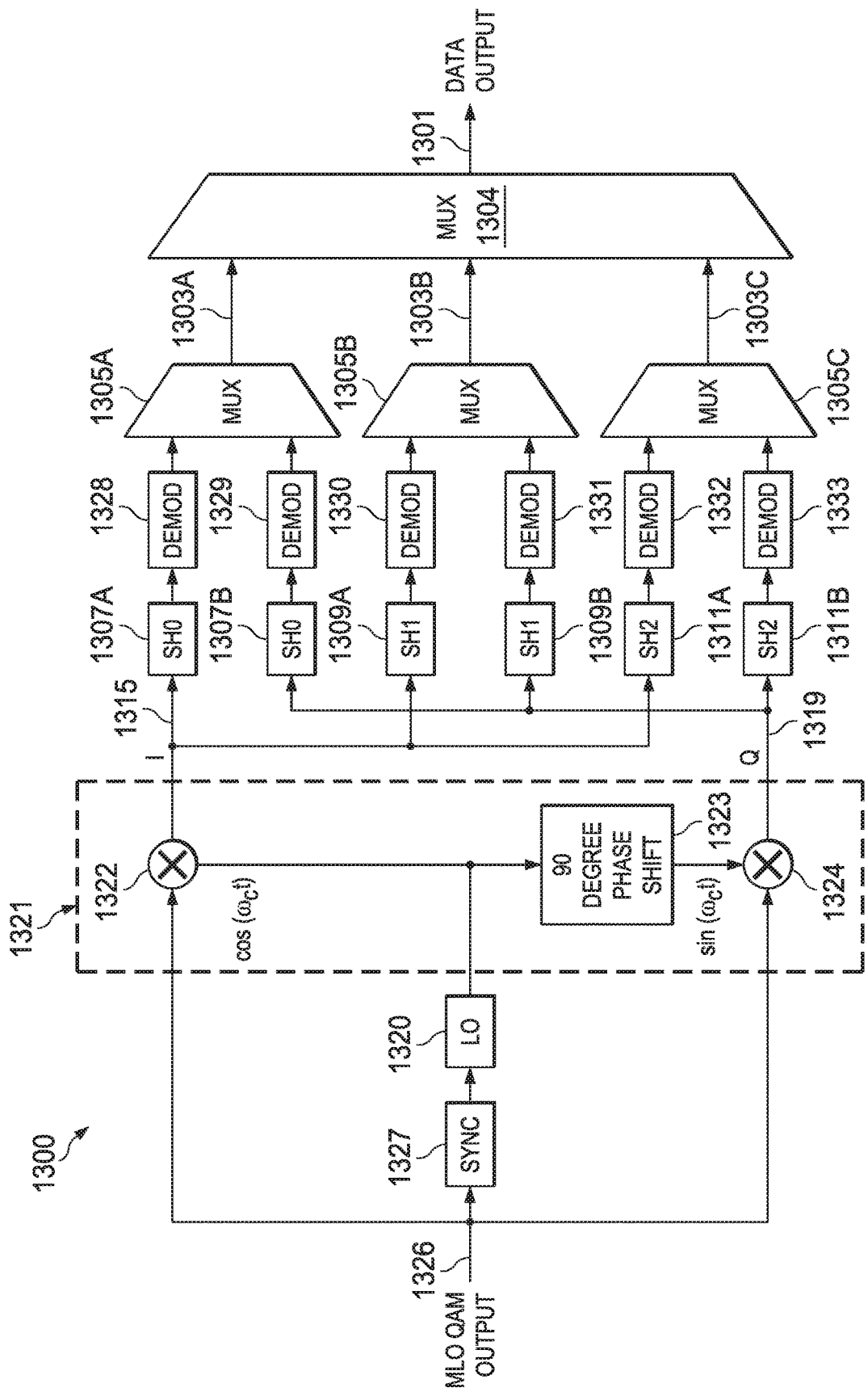
FIG. 13 illustrates a multiple level overlay demodulator.

Referring now to FIG. 13, an MLO demodulator 1300 is illustrated, although it should be understood that the term MLO and the illustrated system 1300 are examples of embodiments. The modulator 1300 takes as input an MLO signal 1126 which may be similar to output signal 1226 from system 1200. Synchronizer 1327 extracts phase information, which is input to local oscillator 1320 to maintain coherence so that the modulator 1321 can produce base band to analogue I signal 1315 and Q signal 1319. The modulator 1321 comprises mixers 1322 and 1324, which, coupled to OL 1320 through 90 degree phase shifter 1323. I signal 1315 is input to each of signal filters 1307A, 1309A, and 1311A, and Q signal 1319 is input to each of signal filters 1307B, 1309B, and 1311B. The filters 1307A, 1307B, 1309A, 1309B, 1311A and 1311B may implement either Hermite Functions, Prolate Spheroidal Wave Functions or other types of orthogonal functions depending upon what was used in the modulator. Since the orthogonal functions are known, they can be separated using correlation or other techniques to recover the modulated data. Information in each of the I and Q signals 1315 and 1319 can be extracted from the overlapped functions which have been summed within each of the symbols because the functions are orthogonal in a correlative sense.

In some embodiments, signal filters 1307A-1307B, 1309A-1309B, and 1311A-1311B use locally generated replicas of the polynomials as known signals in match filters. The outputs of the match filters are the recovered data bits, for example, equivalence of the QAM symbols 1306A-1306B, 1308A-1308B, and 1310A-1310B of system 1300. Signal filters 1307A-1307B, 1309A-1309B, and 1311A-1311B produce 2n streams of n, I, and Q signal pairs, which are input into demodulators 1328-1333. Demodulators 1328-1333 integrate the energy in their respective input signals to determine the value of the QAM symbol, and hence the logical 1s and 0s data bit stream segment represented by the determined symbol. The outputs of the modulators 1328-1333 are then input into multiplexers (MUXs)

1305A-1305C to generate data streams 1303A-1303C. If system 1300 is demodulating a signal from system 1200, data streams 1303A-1303C correspond to data streams 1203A-1203C. Data streams 1303A-1303C are multiplexed by MUX 1304 to generate data output stream 1301. In summary, MLO signals are overlayed (stacked) on top of one another on transmitter and separated on receiver.

MLO may be differentiated from CDMA or OFDM by the manner in which orthogonality among signals is achieved. MLO signals are mutually orthogonal in both time and frequency domains, and can be overlaid in the same symbol time bandwidth product. Orthogonality is attained by the correlation properties, for example, by least sum of squares, of the overlaid signals. In comparison, CDMA uses orthogonal interleaving or displacement of signals in the time domain, whereas OFDM uses orthogonal displacement of signals in the frequency domain.

Bandwidth efficiency may be increased for a channel by assigning the same channel to multiple users. This is feasible if individual user information is mapped to special orthogonal functions. CDMA systems overlap multiple user information and views time intersymbol orthogonal code sequences to distinguish individual users, and OFDM assigns unique signals to each user, but which are not overlaid, are only orthogonal in the frequency domain. Neither CDMA nor OFDM increases bandwidth efficiency. CDMA uses more bandwidth than is necessary to transmit data when the signal has a low signal to noise ratio (SNR). OFDM spreads data over many subcarriers to achieve superior performance in multipath radiofrequency environments. OFDM uses a cyclic prefix OFDM to mitigate multipath effects and a guard time to minimize intersymbol interference (ISI), and each channel is mechanistically made to behave as if the transmitted waveform is orthogonal. (Sync function for each subcarrier in frequency domain.)

In contrast, MLO uses a set of functions which effectively form an alphabet that provides more usable channels in the same bandwidth, thereby enabling high bandwidth efficiency. Some embodiments of MLO do not require the use of cyclic prefixes or guard times, and therefore, outperforms OFDM in spectral efficiency, peak to average power ratio, power consumption, and requires fewer operations per bit. In addition, embodiments of MLO are more tolerant of amplifier nonlinearities than are CDMA and OFDM systems.

Figure 14:
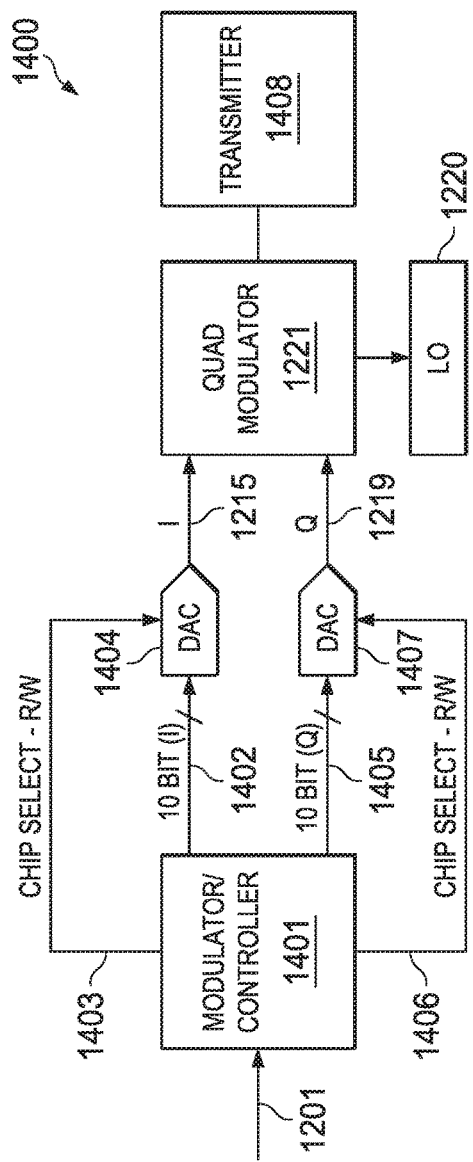
FIG. 14 illustrates a multiple level overlay transmitter system.

FIG. 14 illustrates an embodiment of an MLO transmitter system 1400, which receives input data stream 1401. System 1400 represents a modulator/controller 1401, which incorporates equivalent functionality of DEMUX 1204, QAM symbol mappers 1205A-C, function generators 1207A-1207B, 1209A-1209B, and 1211A-1211B, and summers 1212 and 1216 of system 1200, shown in FIG. 12. However, it should be understood that modulator/controller 1401 may use a greater or lesser quantity of signals than the three illustrated in system 1200. Modulator/controller 1401 may comprise an application specific integrated circuit (ASIC), a field programmable gate array (FPGA), and/or other components, whether discrete circuit elements or integrated into a single integrated circuit (IC) chip.

Modulator/controller 1401 is coupled to DACs 1404 and 1407, communicating a 10 bit I signal 1402 and a 10 bit Q signal 1405, respectively. In some embodiments, I signal 1402 and Q signal 1405 correspond to composite signals 1213 and 1217 of system 1200. It should be understood, however, that the 10 bit capacity of I signal 1402 and Q signal 1405 is merely representative of an embodiment. As illustrated, modulator/controller 1401 also controls DACs 1404 and 1407 using control signals 1403 and 1406, respectively. In some embodiments, DACs 1404 and 1407 each comprise an AD5433, complementary metal oxide semiconductor (CMOS) 10 bit current output DAC. In some embodiments, multiple control signals are sent to each of DACs 1404 and 1407.

DACs 1404 and 1407 output analogue signals 1215 and 1219 to quadrature modulator 1221, which is coupled to LO 1220. The output of modulator 1220 is illustrated as coupled to a transmitter 1408 to transmit data wirelessly, although in some embodiments, modulator 1221 may be coupled to a fiber-optic modem, a twisted pair, a coaxial cable, or other suitable transmission media.

Figure 15:
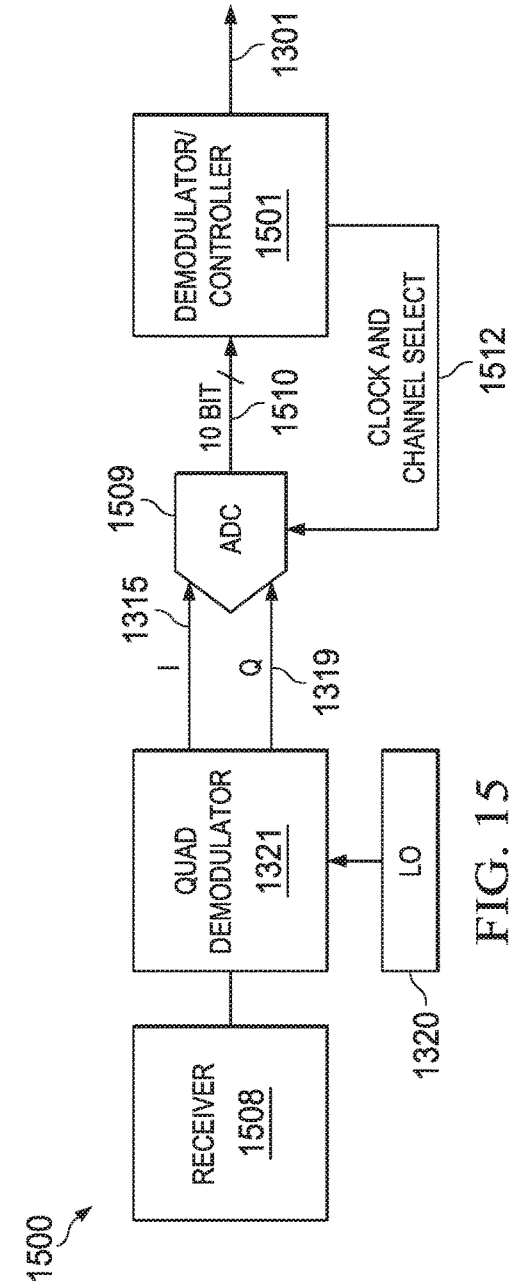
FIG. 15 illustrates a multiple level overlay receiver system.

FIG. 15 illustrates an embodiment of an MLO receiver system 1500 capable of receiving and demodulating signals from system 1400. System 1500 receives an input signal from a receiver 1508 that may comprise input medium, such as RF, wired or optical. The modulator 1321 driven by LO 1320 converts the input to baseband I signal 1315 and Q signal 1319. I signal 1315 and Q signal 1319 are input to analogue to digital converter (ADC) 1509.

ADC 1509 outputs 10 bit signal 1510 to demodulator/controller 1501 and receives a control signal 1512 from demodulator/controller 1501. Demodulator/controller 1501 may comprise an application specific integrated circuit (ASIC), a field programmable gate array (FPGA), and/or other components, whether discrete circuit elements or integrated into a single integrated circuit (IC) chip. Demodulator/controller 1501 correlates received signals with locally generated replicas of the signal set used, in order to perform demodulation and identify the symbols sent. Demodulator/controller 1501 also estimates frequency errors and recovers the data clock, which is used to read data from the ADC 1509. The clock timing is sent back to ADC 1509 using control signal 1512, enabling ADC 1509 to segment the digital I and Q signals 1315 and 1319. In some embodiments, multiple control signals are sent by demodulator/controller 1501 to ADC 1509. Demodulator/controller 1501 also outputs data signal 1301.

Hermite polynomials are a classical orthogonal polynomial sequence, which are the Eigenstates of a quantum harmonic oscillator. Signals based on Hermite polynomials possess the minimal time-bandwidth product property described above, and may be used for embodiments of MLO systems. The Prolate Spheroidal Wave Functions described herein below are another orthogonal functions that may be utilized. However, it should be understood that other signals may also be used, for example orthogonal polynomials such as Jacobi polynomials, Gegenbauer polynomials, Legendre polynomials, Chebyshev polynomials, and Laguerre polynomials. Q-functions are another class of functions that can be employed as a basis for MLO signals.

In quantum mechanics, a coherent state is a state of a quantum harmonic oscillator whose dynamics most closely resemble the oscillating behavior of a classical harmonic oscillator system. A squeezed coherent state is any state of the quantum mechanical Hilbert space, such that the uncertainty principle is saturated. That is, the product of the corresponding two operators takes on its minimum value. In embodiments of an MLO system, operators correspond to time and frequency domains wherein the time-bandwidth product of the signals is minimized. The squeezing property of the signals allows scaling in time and frequency domain simultaneously, without losing mutual orthogonality among the signals in each layer. This property enables flexible implementations of MLO systems in various communications systems.

Because signals with different orders are mutually orthogonal, they can be overlaid to increase the spectral efficiency of a communication channel. For example, when n=0, the optimal baseband signal will have a time-bandwidth product of 1/2, which is the Nyquist Inter-Symbol Interference (ISI) criteria for avoiding ISI. However, signals with time-bandwidth products of 3/2, 5/2, 7/2, and higher, can be overlaid to increase spectral efficiency.

An embodiment of an MLO system uses functions based on modified Hermite polynomials, 4n, and are defined by:

$$\psi_n(t, \xi) = \frac{(\tanh\xi)^{n/2}}{2^{n/2}(n!\cosh\xi)^{1/2}} e^{\frac{1}{2}t^2[1-\tanh\xi]} H_n\left(\frac{t}{\sqrt{2\cosh\xi\sinh\xi}}\right)$$

where t is time, and ξ is a bandwidth utilization parameter. Plots of $\Psi_n$ for n ranging from 0 to 9, along with their Fourier transforms (amplitude squared), are shown in FIGS. 5A-5K. The orthogonality of different orders of the functions may be verified by integrating:

$$\iint \psi_n(t,\xi)\psi_m(t,\xi)dtd\xi$$

The Hermite polynomial is defined by the contour integral:

$$H_n(z) = \frac{n!}{2\pi i} \oint e^{-t^2+2tz} t^{-n-1} dt,$$

where the contour encloses the origin and is traversed in a counterclockwise direction. Hermite polynomials are described in Mathematical Methods for Physicists, by George Arfken, for example on page 416, the disclosure of which is incorporated by reference.

Figure 16A:
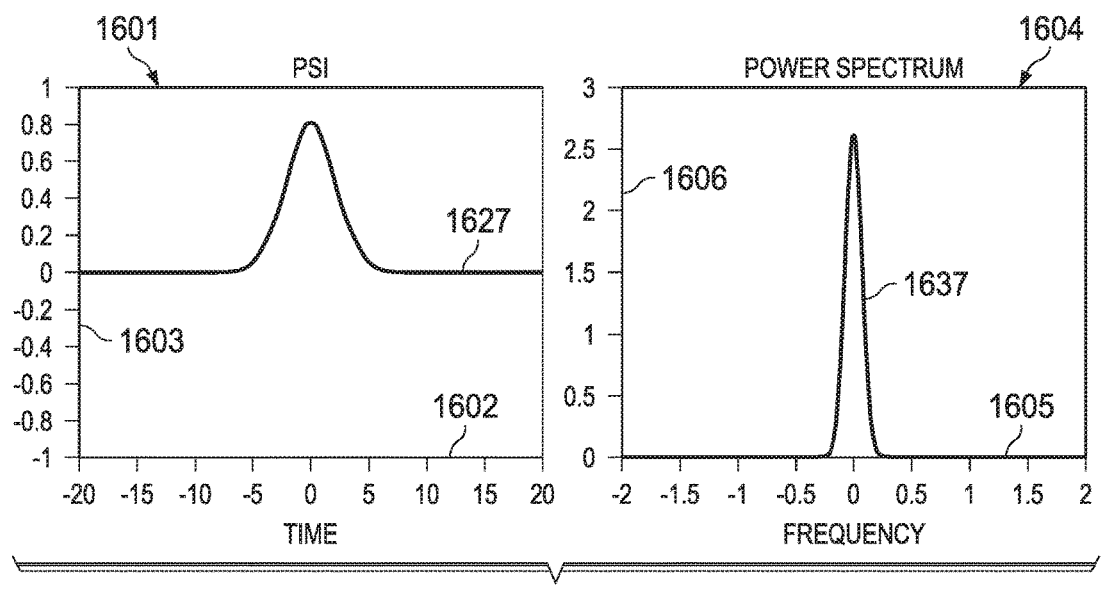
FIGS. 16A-16K illustrate representative multiple level overlay signals and their respective spectral power densities.
Figure 16B:
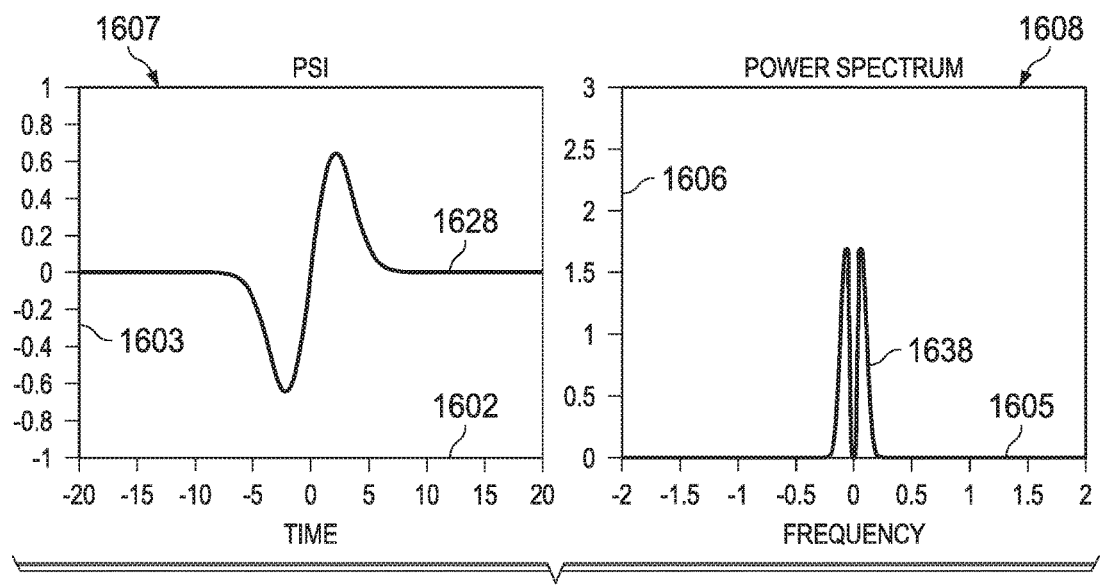
Figure 16C:
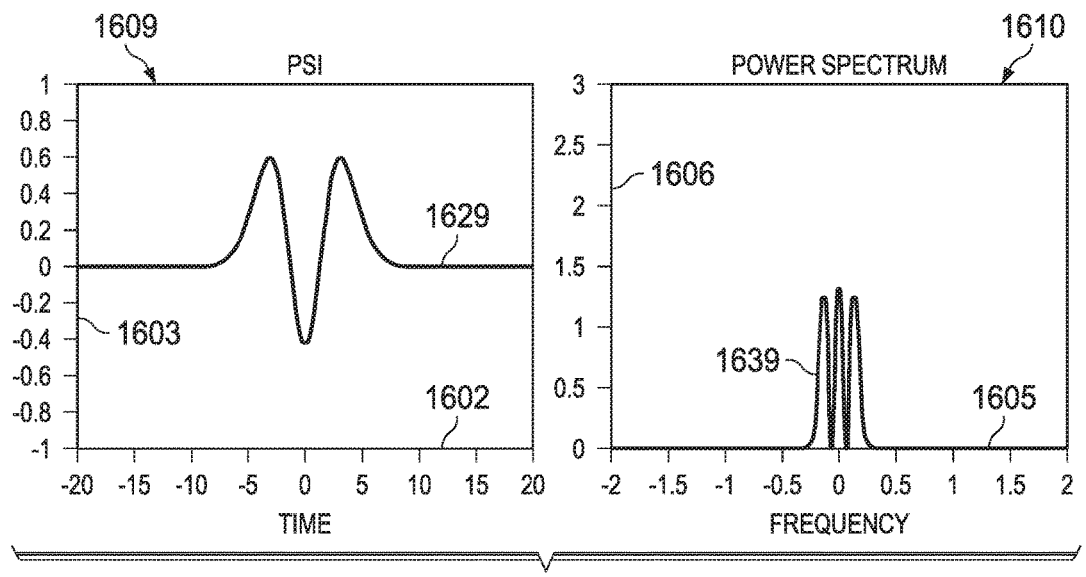
Figure 16D:
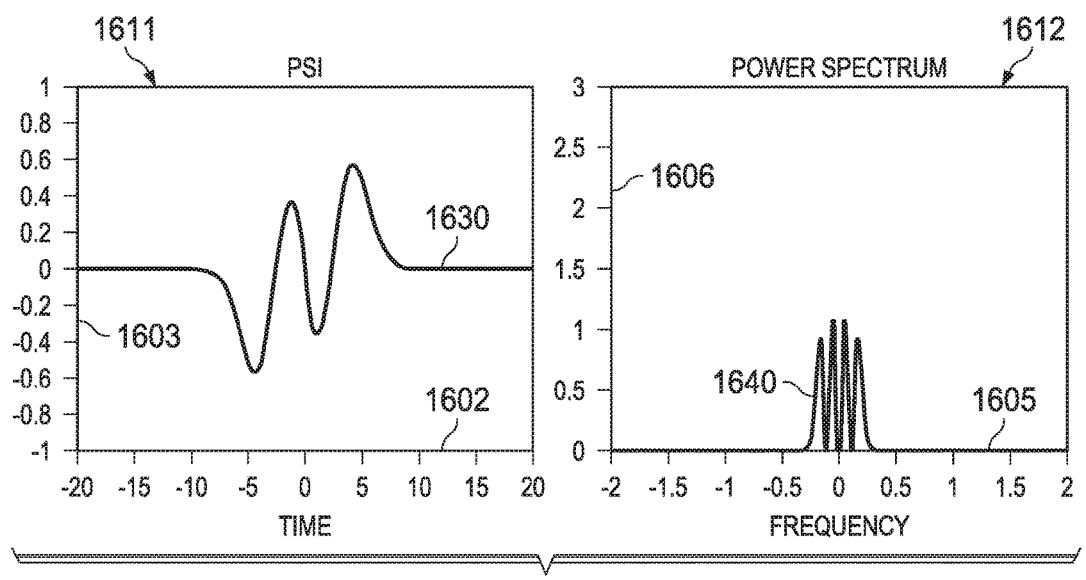
Figure 16E:
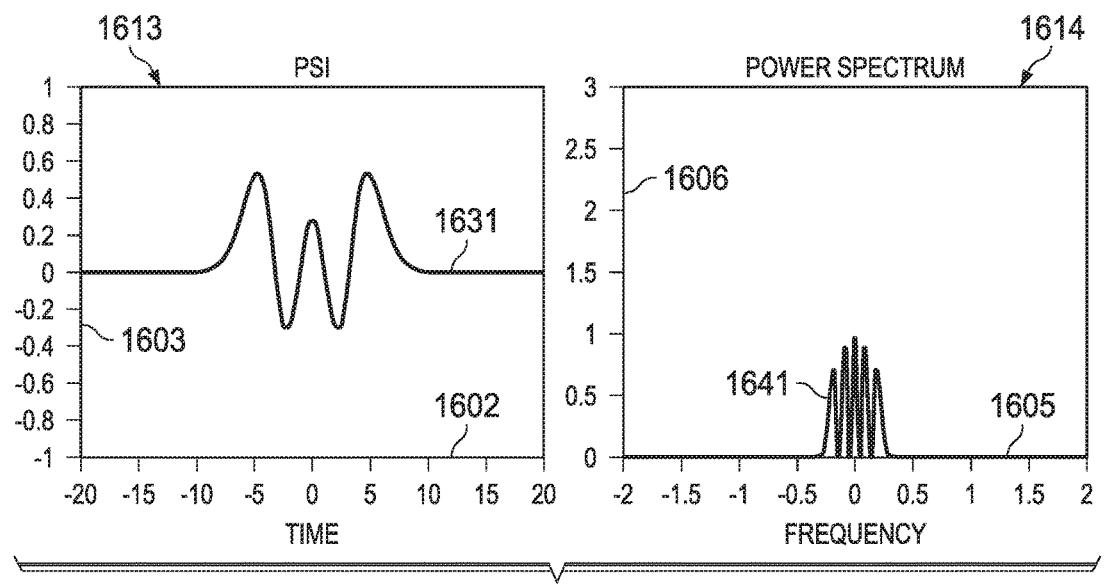
Figure 16F:
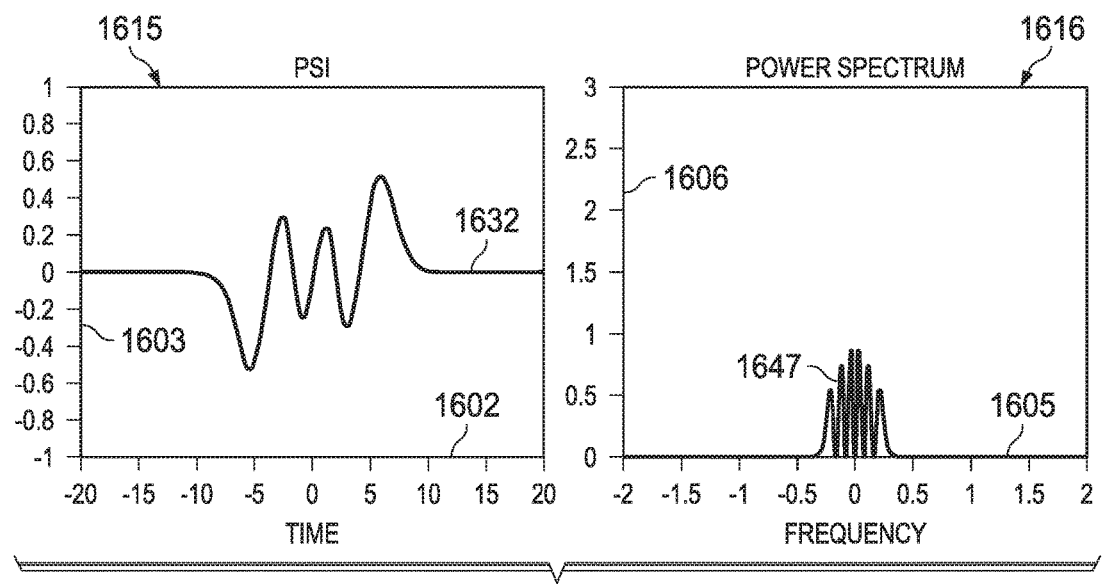
Figure 16G:
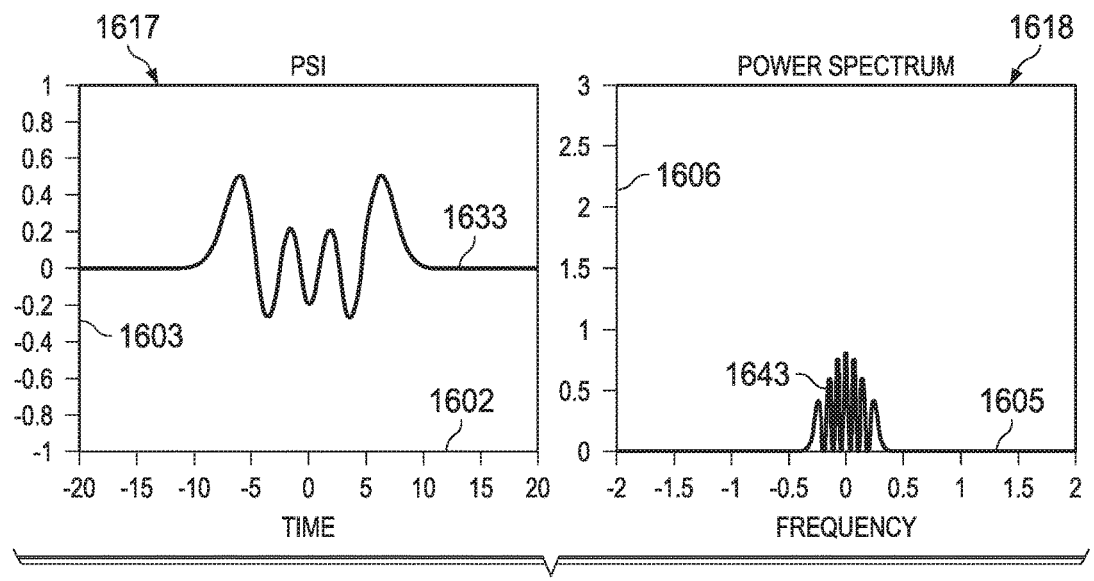
Figure 16H:
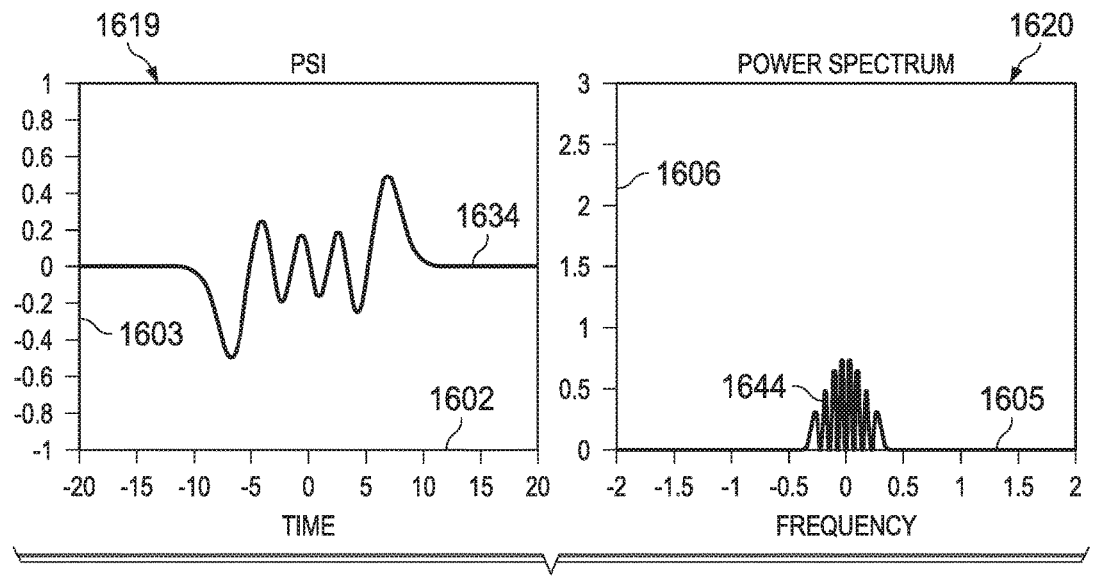
Figure 16I:
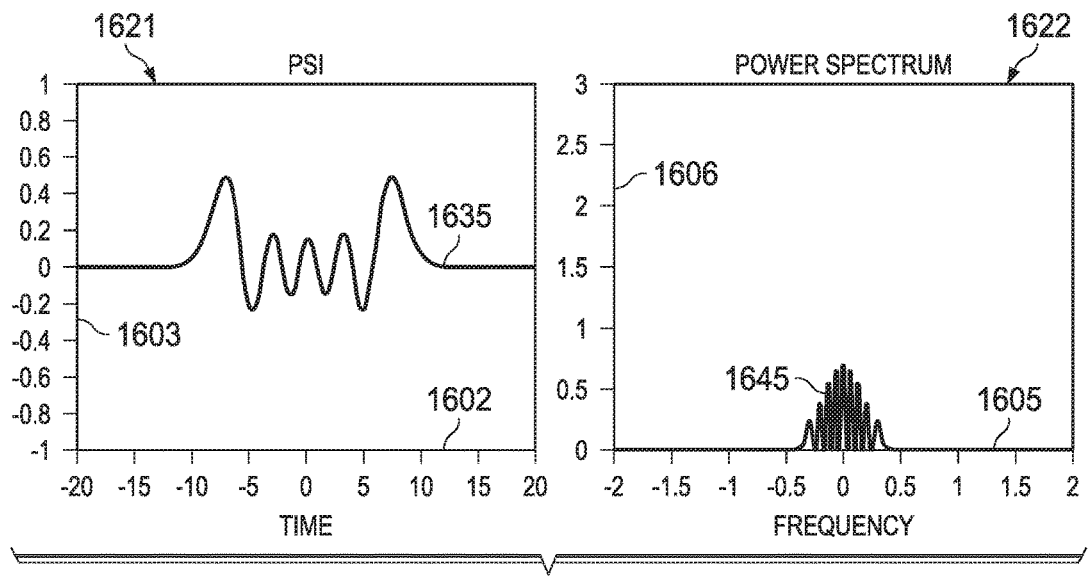
Figure 16J:
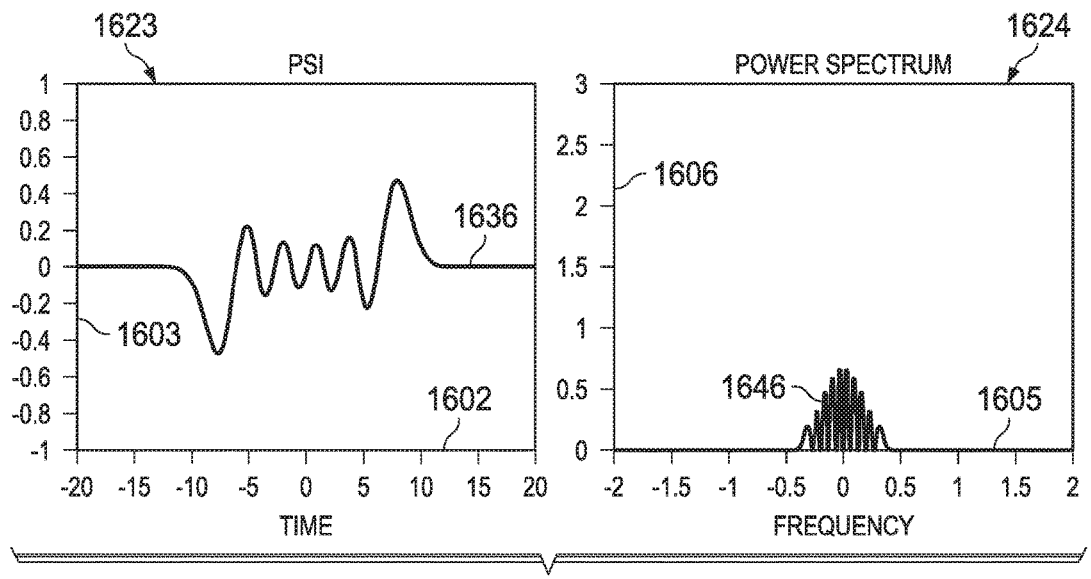

FIGS. 16A-16K illustrate representative MLO signals and their respective spectral power densities based on the modified Hermite polynomials $\Psi_n$ for n ranging from 0 to 9. FIG. 16A shows plots 1601 and 1604. Plot 1601 comprises a curve 1627 representing $\Psi_0$ plotted against a time axis 1602 and an amplitude axis 1603. As can be seen in plot 1601, curve 1627 approximates a Gaussian curve. Plot 1604 comprises a curve 1637 representing the power spectrum of $\Psi_0$ plotted against a frequency axis 1605 and a power axis 1606. As can be seen in plot 1604, curve 1637 also approximates a Gaussian curve. Frequency domain curve 1607 is generated using a Fourier transform of time domain curve 1627. The units of time and frequency on axis 1602 and 1605 are normalized for baseband analysis, although it should be understood that since the time and frequency units are related by the Fourier transform, a desired time or frequency span in one domain dictates the units of the corresponding curve in the other domain. For example, various embodiments of MLO systems may communicate using symbol rates in the megahertz (MHz) or gigahertz (GHz) ranges and the non-0 duration of a symbol represented by curve 1627, i.e., the time period at which curve 1627 is above 0 would be compressed to the appropriate length calculated using the inverse of the desired symbol rate. For an available bandwidth in the megahertz range, the non-0 duration of a time domain signal will be in the microsecond range.

FIGS. 16B-16J show plots 1607-1624, with time domain curves 1628-1636 representing $\Psi_1$ through $\Psi_9$, respectively, and their corresponding frequency domain curves 1638-1646. As can be seen in FIGS. 16A-16J, the number of peaks in the time domain plots, whether positive or negative, corresponds to the number of peaks in the corresponding frequency domain plot. For example, in plot 1623 of FIG. 16J, time domain curve 1636 has five positive and five negative peaks. In corresponding plot 1624 therefore, frequency domain curve 1646 has ten peaks.

Figure 16K:
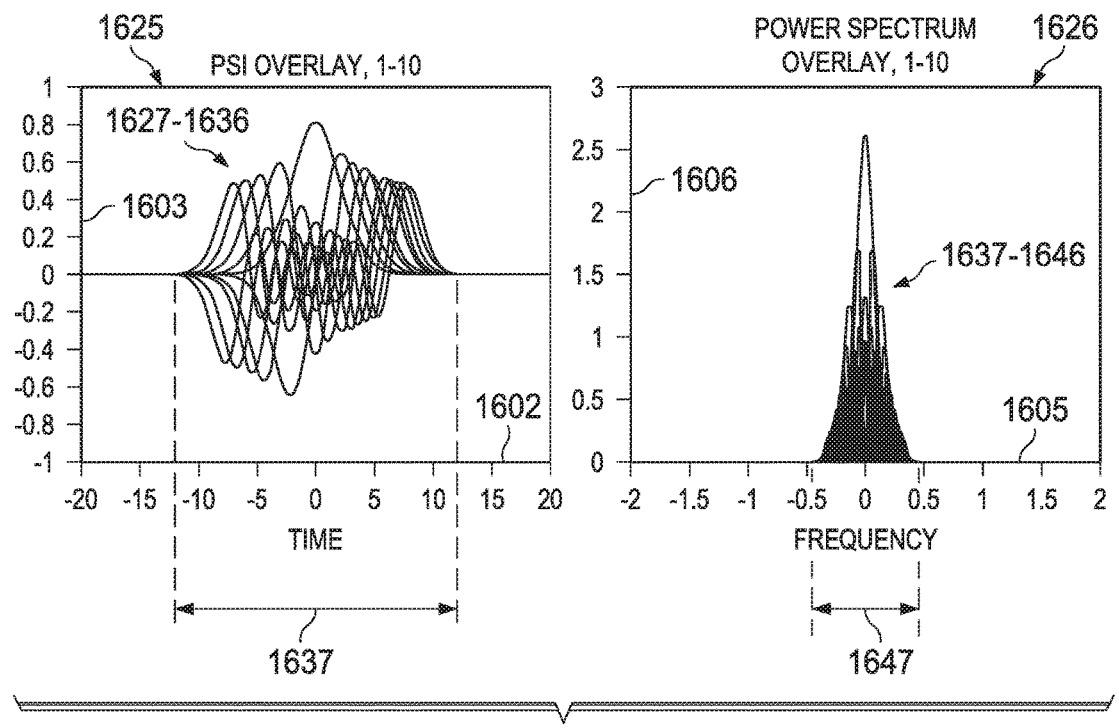

FIG. 16K shows overlay plots 1625 and 1626, which overlay curves 1627-1636 and 1637-1646, respectively. As indicated in plot 1625, the various time domain curves have different durations. However, in some embodiments, the non-zero durations of the time domain curves are of similar lengths. For an MLO system, the number of signals used represents the number of overlays and the improvement in spectral efficiency. It should be understood that, while ten signals are disclosed in FIGS. 16A-16K, a greater or lesser quantity of signals may be used, and that further, a different set of signals, rather than the $\Psi_n$ signals plotted, may be used.

MLO signals used in a modulation layer have minimum time-bandwidth products, which enable improvements in spectral efficiency, and are quadratically integrable. This is accomplished by overlaying multiple demultiplexed parallel data streams, transmitting them simultaneously within the same bandwidth. The key to successful separation of the overlaid data streams at the receiver is that the signals used within each symbols period are mutually orthogonal. MLO overlays orthogonal signals within a single symbol period. This orthogonality prevents ISI and inter-carrier interference (ICI).

Because MLO works in the baseband layer of signal processing, and some embodiments use QAM architecture, conventional wireless techniques for optimizing air interface, or wireless segments, to other layers of the protocol stack will also work with MLO. Techniques such as channel diversity, equalization, error correction coding, spread spectrum, interleaving and space-time encoding are applicable to MLO. For example, time diversity using a multipath-mitigating rake receiver can also be used with MLO. MLO provides an alternative for higher order QAM, when channel conditions are only suitable for low order QAM, such as in fading channels. MLO can also be used with CDMA to extend the number of orthogonal channels by overcoming the Walsh code limitation of CDMA. MLO can also be applied to each tone in an OFDM signal to increase the spectral efficiency of the OFDM systems.

Embodiments of MLO systems amplitude modulate a symbol envelope to create sub-envelopes, rather than sub-carriers. For data encoding, each sub-envelope is independently modulated according to N-QAM, resulting in each sub-envelope independently carrying information, unlike OFDM. Rather than spreading information over many sub-carriers, as is done in OFDM, for MLO, each sub-envelope of the carrier carries separate information. This information can be recovered due to the orthogonality of the sub-envelopes defined with respect to the sum of squares over their duration and/or spectrum. Pulse train synchronization or temporal code synchronization, as needed for CDMA, is not an issue, because MLO is transparent beyond the symbol level. MLO addresses modification of the symbol, but since CDMA and TDMA are spreading techniques of multiple symbol sequences over time. MLO can be used along with CDMA and TDMA.

Figure 17:
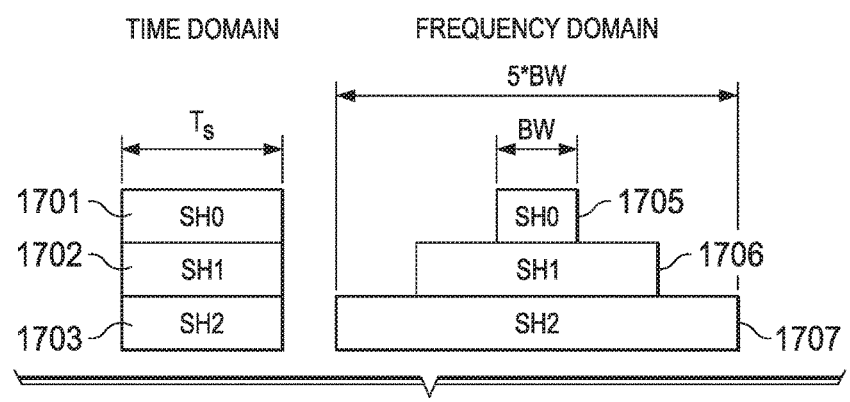
FIG. 17 illustrates comparisons of multiple level overlay signals within the time and frequency domain.

FIG. 17 illustrates a comparison of MLO signal widths in the time and frequency domains. Time domain envelope representations 1701-1703 of signals SH0-SH3 are illustrated as all having a duration $T_S$. SH0-SH3 may represent $PSI_0$-$PSI_2$, or may be other signals. The corresponding frequency domain envelope representations are 1705-1707, respectively. SH0 has a bandwidth BW, SH1 has a bandwidth three times BW, and SH2 has a bandwidth of 5BW, which is five times as great as that of SH0. The bandwidth used by an MLO system will be determined, at least in part, by the widest bandwidth of any of the signals used. If each layer uses only a single signal type within identical time windows, the spectrum will not be fully utilized, because the lower order signals will use less of the available bandwidth than is used by the higher order signals.

Figure 18:
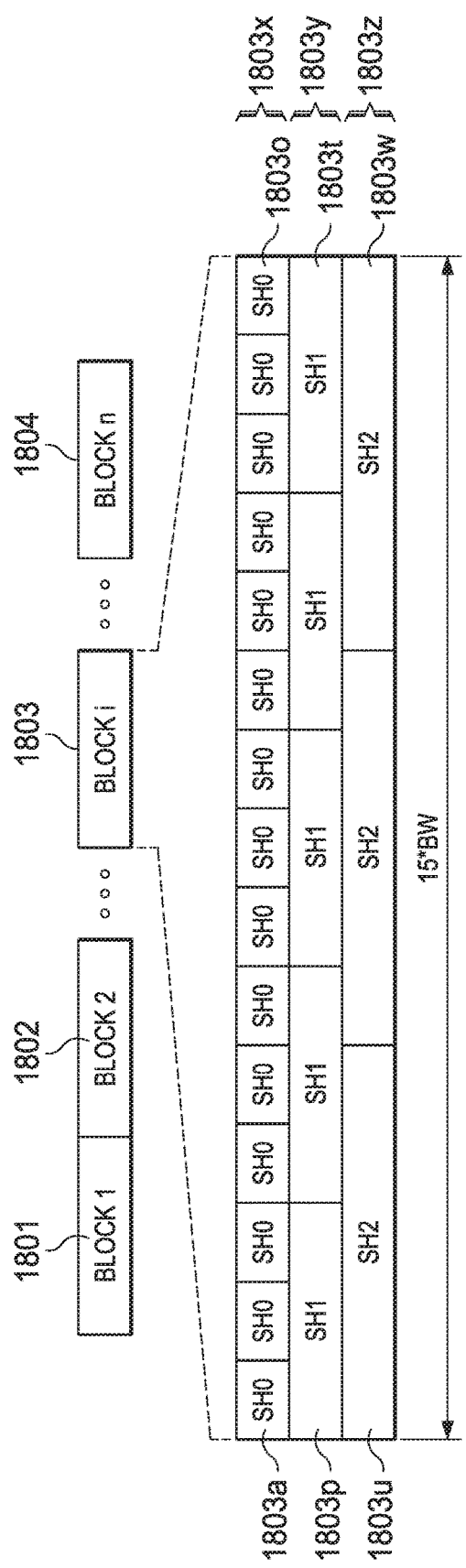
FIG. 18 illustrates a spectral alignment of multiple level overlay signals for differing bandwidths of signals.

FIG. 18 illustrates a spectral alignment of MLO signals that accounts for the differing bandwidths of the signals, and makes spectral usage more uniform, using SH0-SH3. Blocks 1801-1804 are frequency domain blocks of an OFDM signal with multiple subcarriers. Block 1803 is expanded to show further detail. Block 1803 comprises a first layer 1803$x$ comprised of multiple SH0 envelopes 1803$a$-1803$o$. A second layer 1803$y$ of SH1 envelopes 1803$p$-1803$t$ has one third the number of envelopes as the first layer. In the illustrated example, first layer 1803$x$ has 15 SH0 envelopes, and second layer 1803$y$ has five SH1 envelopes. This is because, since the SH1 bandwidth envelope is three times as wide as that of SH0, 15 SH0 envelopes occupy the same spectral width as five SH1 envelopes. The third layer 1803$z$ of block 1803 comprises three SH2 envelopes 1803$u$-1803$w$, because the SH2 envelope is five times the width of the SH0 envelope.

The total required bandwidth for such an implementation is a multiple of the least common multiple of the bandwidths of the MLO signals. In the illustrated example, the least common multiple of the bandwidth required for SH0, SH1, and SH2 is 15BW, which is a block in the frequency domain. The OFDM-MLO signal can have multiple blocks, and the spectral efficiency of this illustrated implementation is proportional to (15+5+3)/15.

Figure 19:
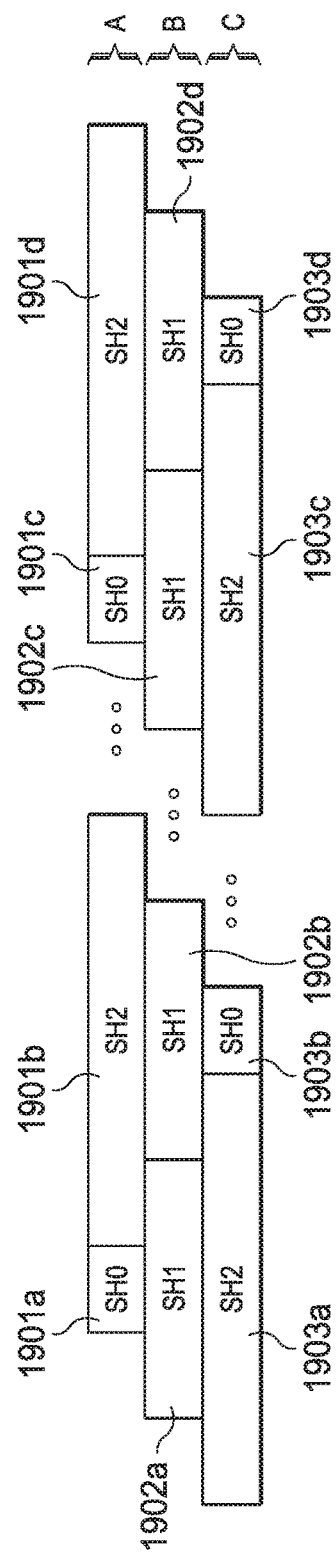
FIG. 19 illustrates an alternative spectral alignment of multiple level overlay signals.

FIG. 19 illustrates another spectral alignment of MLO signals, which may be used alternatively to alignment scheme shown in FIG. 18. In the embodiment illustrated in FIG. 19, the OFDM-MLO implementation stacks the spectrum of SH0, SH1, and SH2 in such a way that the spectrum in each layer is utilized uniformly. Layer 1900A comprises envelopes 1901A-1901D, which includes both SH0 and SH2 envelopes. Similarly, layer 1900C, comprising envelopes 1903A-1903D, includes both SH0 and SH2 envelopes. Layer 1900B, however, comprising envelopes 1902A-1902D, includes only SH1 envelopes. Using the ratio of envelope sizes described above, it can be easily seen that BW+5BW=3BW+3BW. Thus, for each SH0 envelope in layer 1900A, there is one SH2 envelope also in layer 1900C and two SH1 envelopes in layer 1900B.

Three Scenarios Compared:
1) MLO with 3 Layers defined by:

$$f_0(t) = W_0 e^{-\frac{t^2}{4}}, W_0 = 0.6316$$

$$f_1(t) = W_1 t e^{-\frac{t^2}{4}}, W_1 \approx 0.6316$$

$$f_2(t) = W_2(t^2 - 1)e^{-\frac{t^2}{4}}, W_2 \approx 0.4466$$

(The current FPGA implementation uses the truncation interval of [−6, 6].)
2) Conventional scheme using rectangular pulse
3) Conventional scheme using a square-root raised cosine (SRRC) pulse with a roll-off factor of 0.5

For MLO pulses and SRRC pulse, the truncation interval is denoted by [−t1, t1] in the following figures. For simplicity, we used the MLO pulses defined above, which can be easily scaled in time to get the desired time interval (say micro-seconds or nano-seconds). For the SRRC pulse, we fix the truncation interval of [−3T, 3T] where T is the symbol duration for all results presented in this document.

Bandwidth Efficiency

The X-dB bounded power spectral density bandwidth is defined as the smallest frequency interval outside which the power spectral density (PSD) is X dB below the maximum value of the PSD. The X-dB can be considered as the out-of-band attenuation.

The bandwidth efficiency is expressed in Symbols per second per Hertz. The bit per second per Hertz can be obtained by multiplying the symbols per second per Hertz with the number of bits per symbol (i.e., multiplying with log 2 M for M-ary QAM).

Truncation of MLO pulses introduces inter-layer interferences (ILI). However, the truncation interval of [−6, 6] yields negligible ILI while [−4, 4] causes slight tolerable ILI.

The bandwidth efficiency of MLO may be enhanced by allowing inter-symbol interference (ISI). To realize this enhancement, designing transmitter side parameters as well as developing receiver side detection algorithms and error performance evaluation can be performed.

Figure 20:
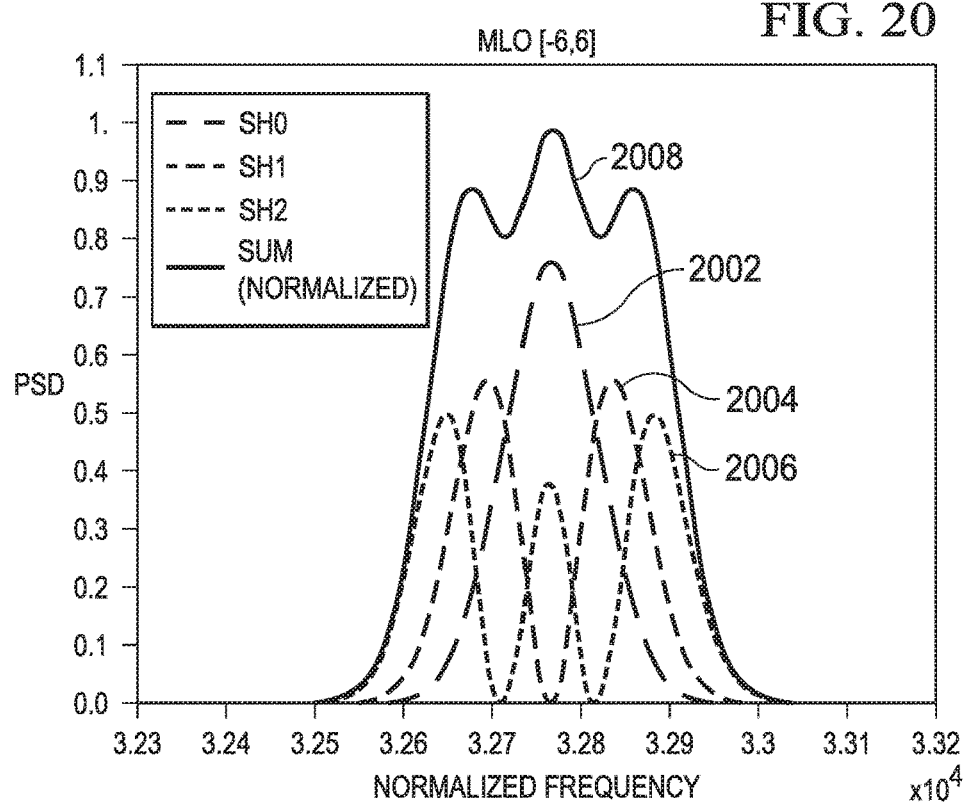
FIG. 20 illustrates power spectral density for various signal layers using a combined three layer multiple level overlay technique.

Referring now to FIG. 20, there is illustrated the power spectral density of each layer SH0-SH2 within MLO and also for the combined three layer MLO. 2002 illustrates the power spectral density of the SH0 layer; 2004 illustrates the power spectral density of the SH1 layer; 2006 illustrates the power spectral density of the SH2 layer, and 2008 illustrates the combined power spectral density of each layer.

Figure 21:
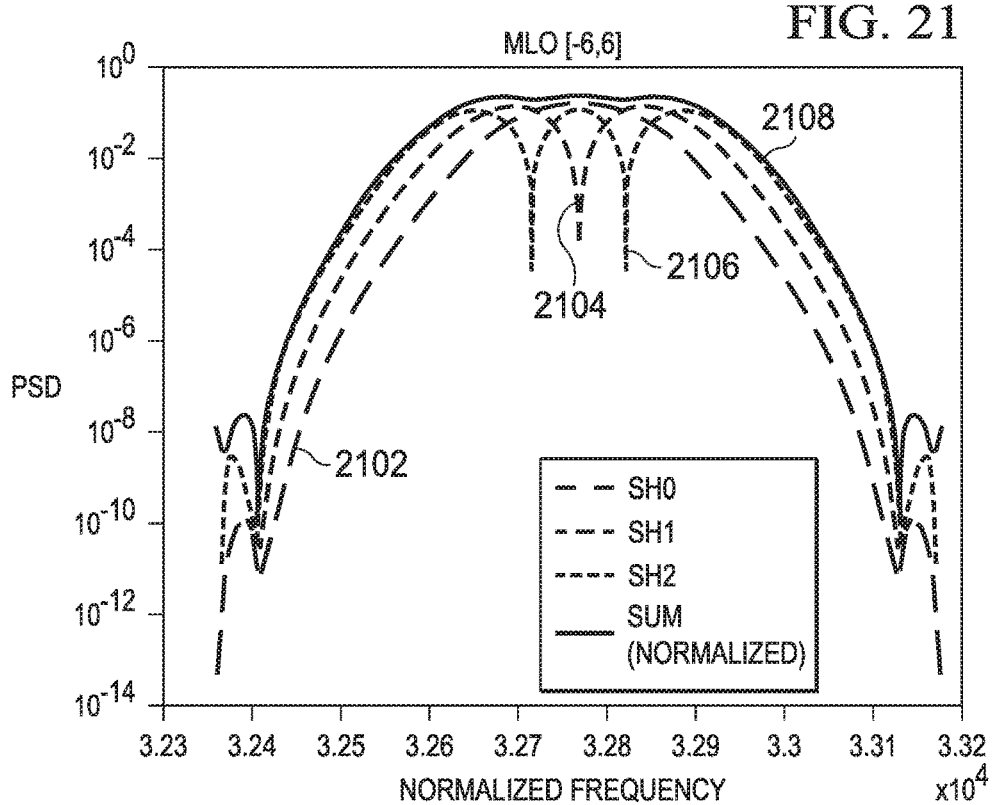
FIG. 21 illustrates power spectral density on a log scale for layers using a combined three layer multiple level overlay modulation.

Referring now to FIG. 21, there is illustrated the power spectral density of each layer as well as the power spectral density of the combined three layer in a log scale. 2102 represents the SH0 layer. 2104 represents the SH1 layer. 2106 represents the SH2 layer. 2108 represents the combined layers.

Figure 22:
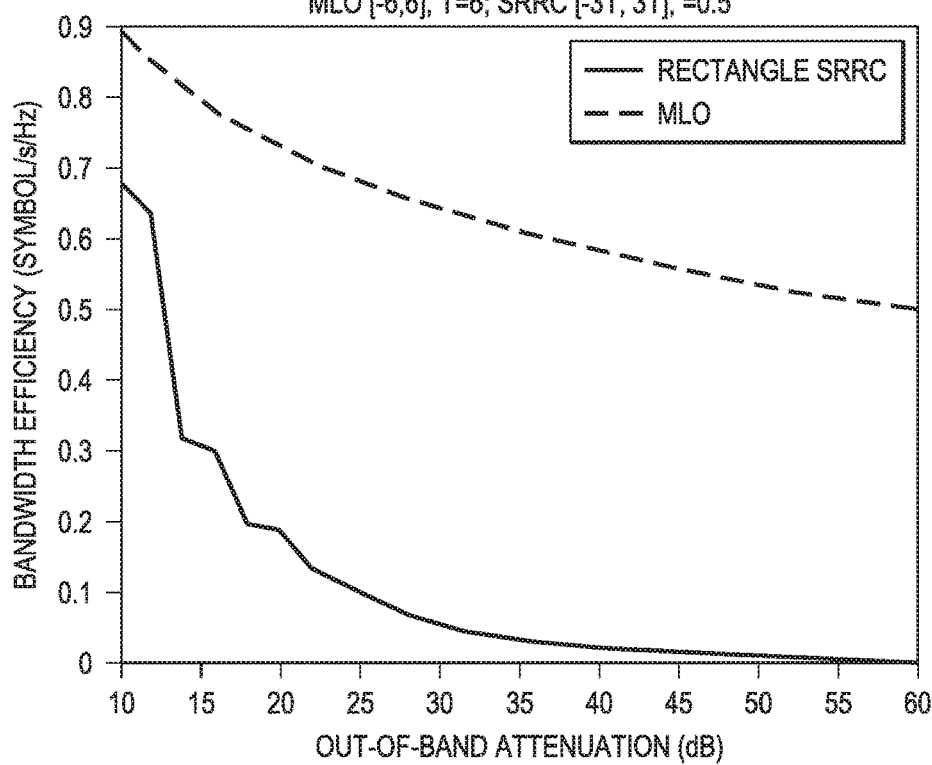
FIG. 22 illustrates a bandwidth efficiency comparison for square root raised cosine versus multiple layer overlay for a symbol rate of 1/6.
Figure 23:
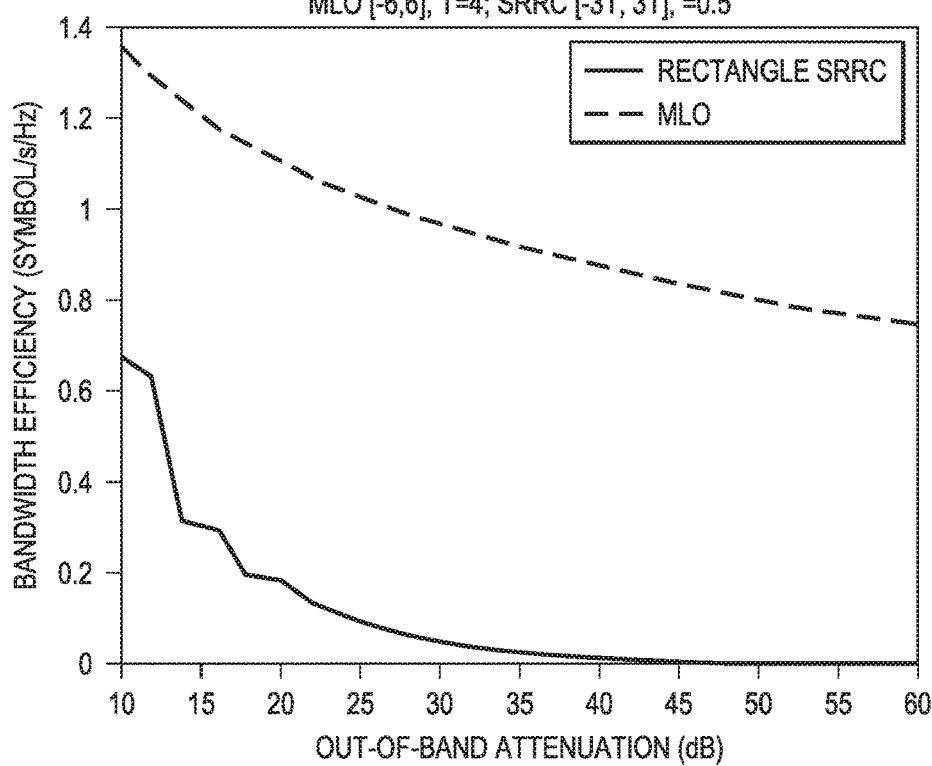
FIG. 23 illustrates a bandwidth efficiency comparison between square root raised cosine and multiple layer overlay for a symbol rate of 1/4.

Referring now to FIG. 22, there is a bandwidth efficiency comparison versus out of band attenuation (X-dB) where quantum level overlay pulse truncation interval is [−6,6] and the symbol rate is 1/6. Referring also to FIG. 23, there is illustrated the bandwidth efficiency comparison versus out of band attenuation (X-dB) where quantum level overlay pulse truncation interval is [−6,6] and the symbol rate is 1/4.

The QLO signals are generated from the Physicist's special Hermite functions:

$$f_n(t, \alpha) = \sqrt{\frac{\alpha}{\sqrt{\pi} n! 2^n}} H_n(\alpha t) e^{-\frac{\alpha^2 t^2}{2}}, \alpha > 0$$

Note that the initial hardware implementation is using $$\alpha = \frac{1}{\sqrt{2}}$$

and for consistency with his part, $$\alpha = \frac{1}{\sqrt{2}}$$

is used in all figures related to the spectral efficiency.

Let the low-pass-equivalent power spectral density (PSD) of the combined QLO signals be X(f) and its bandwidth be B. Here the bandwidth is defined by one of the following criteria.

ACLR1 (First Adjacent Channel Leakage Ratio) in dBc equals:

$$ACLR1 = \frac{\int_{B/2}^{3B/2} X(f)df}{\int_{-\infty}^{\infty} X(f)df}$$

ACLR2 (Second Adjacent Channel Leakage Ratio) in dBc equals:

$$ACLR2 = \frac{\int_{3B/2}^{5B/2} X(f)df}{\int_{-\infty}^{\infty} X(f)df}$$

Out-of-Band Power to Total Power Ratio is:

$$\frac{2\int_{B/2}^{\infty} X(f)df}{\int_{-\infty}^{\infty} X(f)df}$$

The Band-Edge PSD in dBc/100 kHz equals:

$$\frac{\int_{B/2}^{\frac{B}{2}+10^5} X(f)df}{\int_{-\infty}^{\infty} X(f)df}$$

Figure 24:
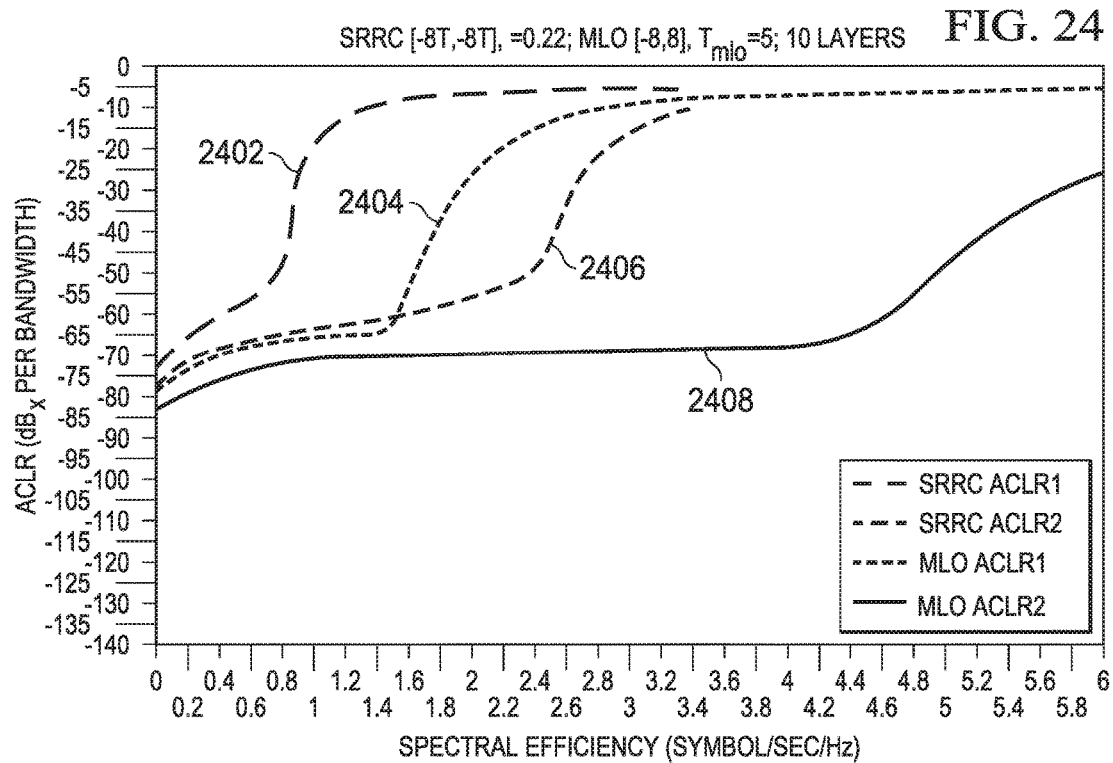
FIG. 24 illustrates a performance comparison between square root raised cosine and multiple level overlay using ACLR.

Referring now to FIG. 24 there is illustrated a performance comparison using ACLR1 and ACLR2 for both a square root raised cosine scheme and a multiple layer overlay scheme. Line 2402 illustrates the performance of a square root raised cosine 2402 using ACLR1 versus an MLO 2404 using ACLR1. Additionally, a comparison between a square root raised cosine 2406 using ACLR2 versus MLO 2408 using ACLR2 is illustrated. Table A illustrates the performance comparison using ACLR.

TABLE A

| Criteria: ACLR1 ≤ −30 dBc per bandwidth ACLR2 ≤ −43 dBc per bandwidth | | | Spectral Efficiency (Symbol/sec/Hz) | Gain |
|---|---|---|---|---|
| SRRC [−8T, 8T] β = 0.22 | | | 0.8765 | 1.0 |
| | N Layers | Symbol Duration (Tmol) | | |
| QLO [−8, 8] | N = 3 | Tmol = 4 | 1.133 | 1.2926 |
| | N = 4 | Tmol = 5 | 1.094 | 1.2481 |
| | | Tmol = 4 | 1.367 | 1.5596 |
| | N = 10 | Tmol = 8 | 1.185 | 1.3520 |
| | | Tmol = 7 | 1.355 | 1.5459 |
| | | Tmol = 6 | 1.580 | 1.8026 |
| | | Tmol = 5 | 1.896 | 2.1631 |
| | | Tmol = 4 | 2.371 | 2.7051 |

Figure 25:
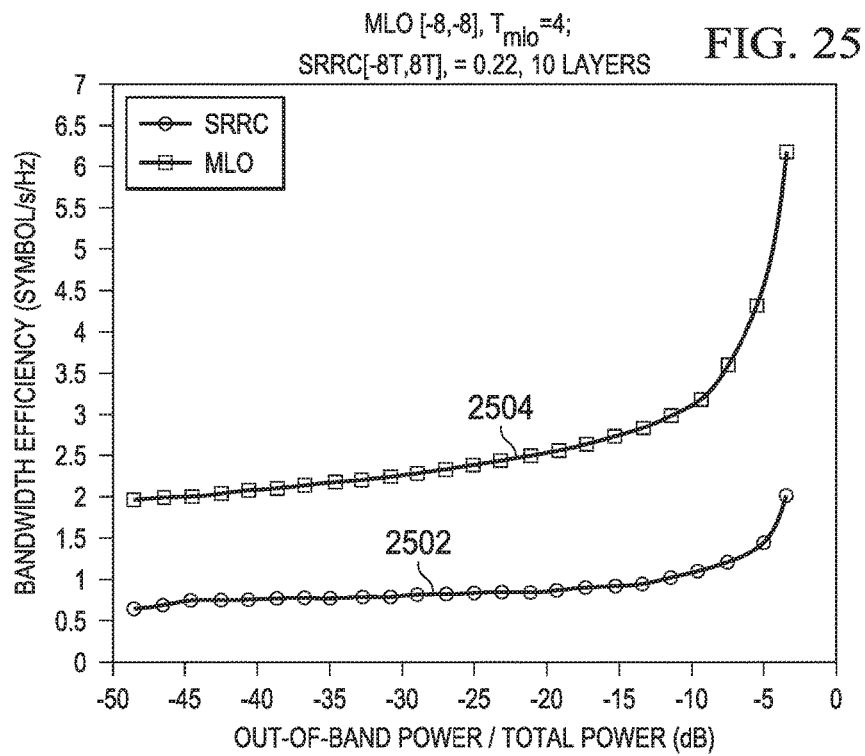
FIG. 25 illustrates a performance comparison between square root raised cosine and multiple lever overlay using out of band power.

Referring now to FIG. 25, there is illustrated a performance comparison between a square root raised cosine 2502 and a MLO 2504 using out-of-band power. Referring now also to Table B, there is illustrated a more detailed comparison of the performance using out-of-band power.

TABLE B

Table 3: Performance Comparison Using Out-of-Band Power

| Criterion: Out-of-band Power/Total Power ≤ −30 dB | | | Spectral Efficiency (Symbol/sec/Hz) | Gain |
|---|---|---|---|---|
| SRRC [−8T, 8T] β = 0.22 | | | 0.861 | 1.0 |
| | N Layers | Symbol Duration (Tmol) | | |
| QLO [−8, 8] | N = 3 | Tmol = 4 | 1.080 | 1.2544 |
| | N = 4 | Tmol = 5 | 1.049 | 1.2184 |
| | | Tmol = 4 | 1.311 | 1.5226 |
| | N = 10 | Tmol = 8 | 1.152 | 1.3380 |
| | | Tmol = 7 | 1.317 | 1.5296 |
| | | Tmol = 6 | 1.536 | 1.7840 |
| | | Tmol = 5 | 1.844 | 2.1417 |
| | | Tmol = 4 | 2.305 | 2.6771 |

Figure 26:
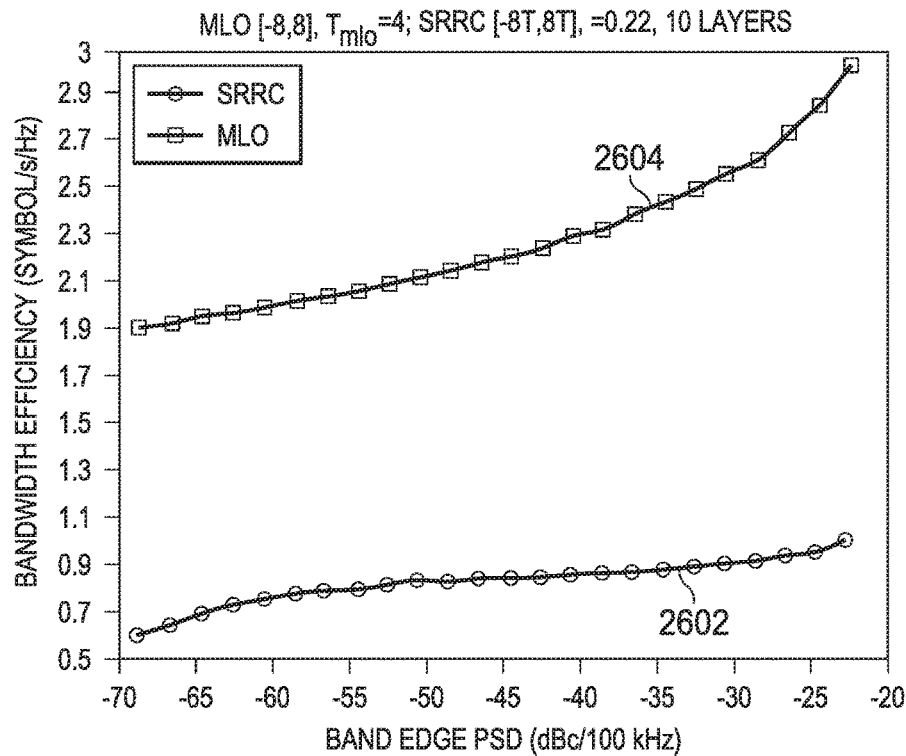
FIG. 26 illustrates a performance comparison between square root raised cosine and multiple lever overlay using band edge PSD.

Referring now to FIG. 26, there is further provided a performance comparison between a square root raised cosine 2602 and a MLO 2604 using band-edge PSD. A more detailed illustration of the performance comparison is provided in Table C.

TABLE C

Table 4: Performance Comparison Using Band-Edge PSD

| Criterion: Band-Edge PSD = −50 dBc/100 kHz | | | Spectral Efficiency (Symbol/sec/Hz) | Gain |
|---|---|---|---|---|
| SRRC [−8T, 8T] β = 0.22 | | | 0.810 | 1.0 |
| | N Layers | Symbol Duration (Tmol) | | |
| QLO [−8, 8] | N = 3 | Tmol = 4 | 0.925 | 1.1420 |
| | N = 4 | Tmol = 5 | 0.912 | 1.1259 |
| | | Tmol = 4 | 1.14 | 1.4074 |
| | N = 10 | Tmol = 8 | 1.049 | 1.2951 |
| | | Tmol = 7 | 1.198 | 1.4790 |
| | | Tmol = 6 | 1.398 | 1.7259 |
| | | Tmol = 5 | 1.678 | 2.0716 |
| | | Tmol = 4 | 2.697 | 2.5889 |

Figure 27:
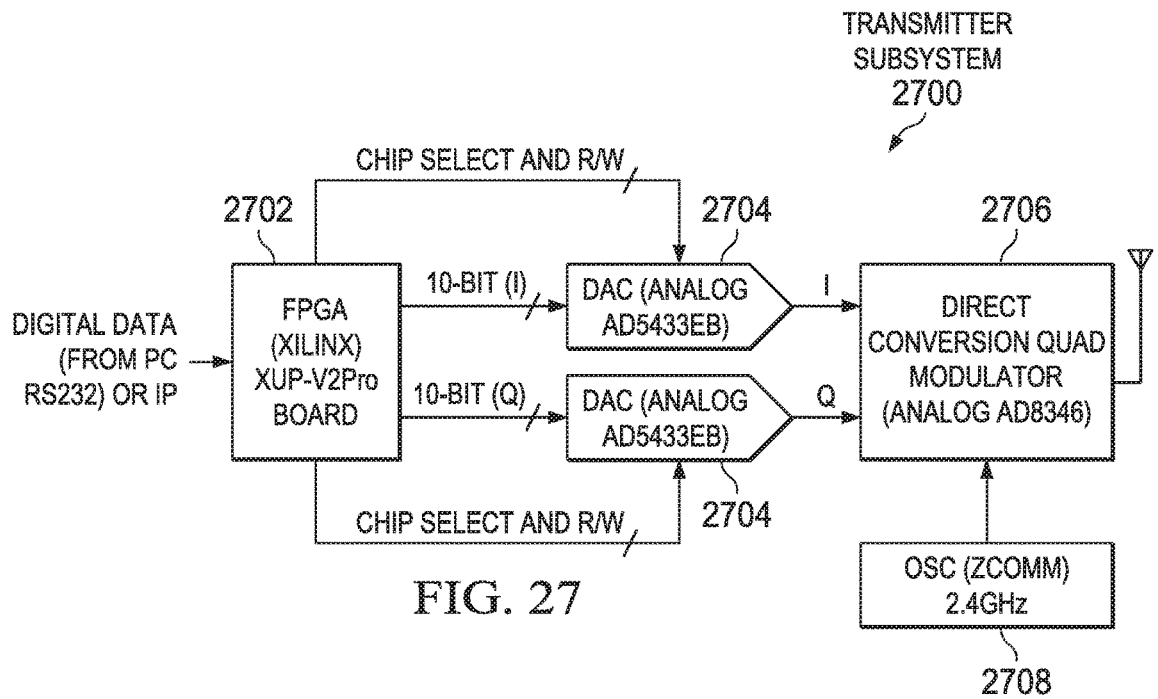
FIG. 27 is a block diagram of a transmitter subsystem for use with multiple level overlay.
Figure 28:
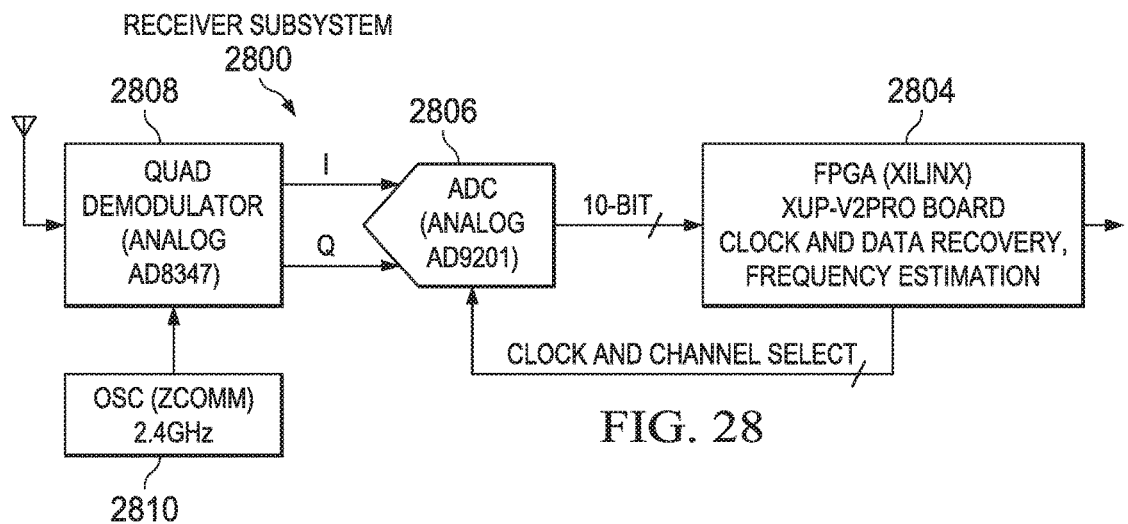
FIG. 28 is a block diagram of a receiver subsystem using multiple level overlay.

Referring now to FIGS. 27 and 28, there are more particularly illustrated the transmit subsystem (FIG. 27) and the receiver subsystem (FIG. 28). The transceiver is realized using basic building blocks available as Commercially Off The Shelf products. Modulation, demodulation and Special Hermite correlation and de-correlation are implemented on a FPGA board. The FPGA board 2802 at the receiver 2800 estimated the frequency error and recovers the data clock (as well as data), which is used to read data from the analog-to-digital (ADC) board 2806. The FGBA board 2800 also segments the digital I and Q channels.

On the transmitter side 2700, the FPGA board 2702 realizes the special hermite correlated QAM signal as well as the necessary control signals to control the digital-to-analog (DAC) boards 2704 to produce analog I&Q baseband channels for the subsequent up conversion within the direct conversion quad modulator 2706. The direct conversion quad modulator 2706 receives an oscillator signal from oscillator 2708.

The ADC 2806 receives the I&Q signals from the quad demodulator 2808 that receives an oscillator signal from 2810.

Neither power amplifier in the transmitter nor an LNA in the receiver is used since the communication will take place over a short distance. The frequency band of 2.4-2.5 GHz (ISM band) is selected, but any frequency band of interest may be utilized.

MIMO uses diversity to achieve some incremental spectral efficiency. Each of the signals from the antennas acts as an independent orthogonal channel. With QLO, the gain in spectral efficiency comes from within the symbol and each QLO signal acts as independent root channels as they are all orthogonal to one another in any permutation. However, since QLO is implemented at the bottom of the protocol stack (physical layer), any technologies at higher levels of the protocol (i.e. Transport) will work with QLO. Therefore one can use all the conventional techniques with QLO. This includes RAKE receivers and equalizers to combat fading, cyclical prefix insertion to combat time dispersion and all other techniques using beam forming and MIMO to increase spectral efficiency even further.

When considering spectral efficiency of a practical wireless communication system, due to possibly different practical bandwidth definitions (and also not strictly bandlimited nature of actual transmit signal), the following approach would be more appropriate.

Figure 29:
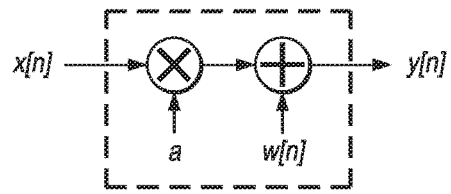
FIG. 29 illustrates an equivalent discreet time orthogonal channel of modified multiple level overlay.

Referring now to FIG. 29, consider the equivalent discrete time system, and obtain the Shannon capacity for that system (will be denoted by Cd). Regarding the discrete time system, for example, for conventional QAM systems in AWGN, the system will be:

$$y[n]=a\,x[n]+w[n]$$

where a is a scalar representing channel gain and amplitude scaling, x[n] is the input signal (QAM symbol) with unit average energy (scaling is embedded in a), y[n] is the demodulator (matched filter) output symbol, and index n is the discrete time index.

The corresponding Shannon capacity is:

$$C_d = \log_2(1+|a|^2/\sigma^2)$$

where σ2 is the noise variance (in complex dimension) and |a|2/σ2 is the SNR of the discrete time system.

Second, compute the bandwidth W based on the adopted bandwidth definition (e.g., bandwidth defined by −40 dBc out of band power). If the symbol duration corresponding to a sample in discrete time (or the time required to transmit $C_d$ bits) is T, then the spectral efficiency can be obtained as:

$$C/W = C_d/(T\,W)\text{ bps/Hz}$$

In discrete time system in AWGN channels, using Turbo or similar codes will give performance quite close to Shannon limit $C_d$. This performance in discrete time domain will be the same regardless of the pulse shape used. For example, using either SRRC (square root raised cosine) pulse or a rectangle pulse gives the same $C_d$ (or $C_d/T$). However, when we consider continuous time practical systems, the bandwidths of SRRC and the rectangle pulse will be different. For a typical practical bandwidth definition, the bandwidth for a SRRC pulse will be smaller than that for the rectangle pulse and hence SRRC will give better spectral efficiency. In other words, in discrete time system in AWGN channels, there is little room for improvement. However, in continuous time practical systems, there can be significant room for improvement in spectral efficiency.

Figure 30:
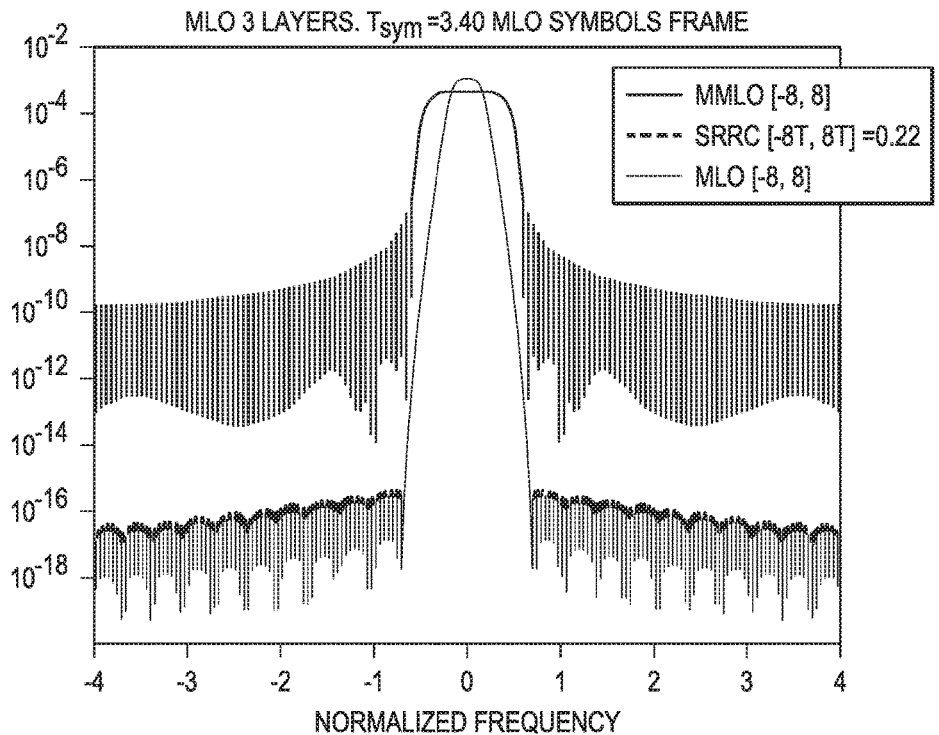
FIG. 30 illustrates the PSDs of multiple layer overlay, modified multiple layer overlay and square root raised cosine.
Figure 31:
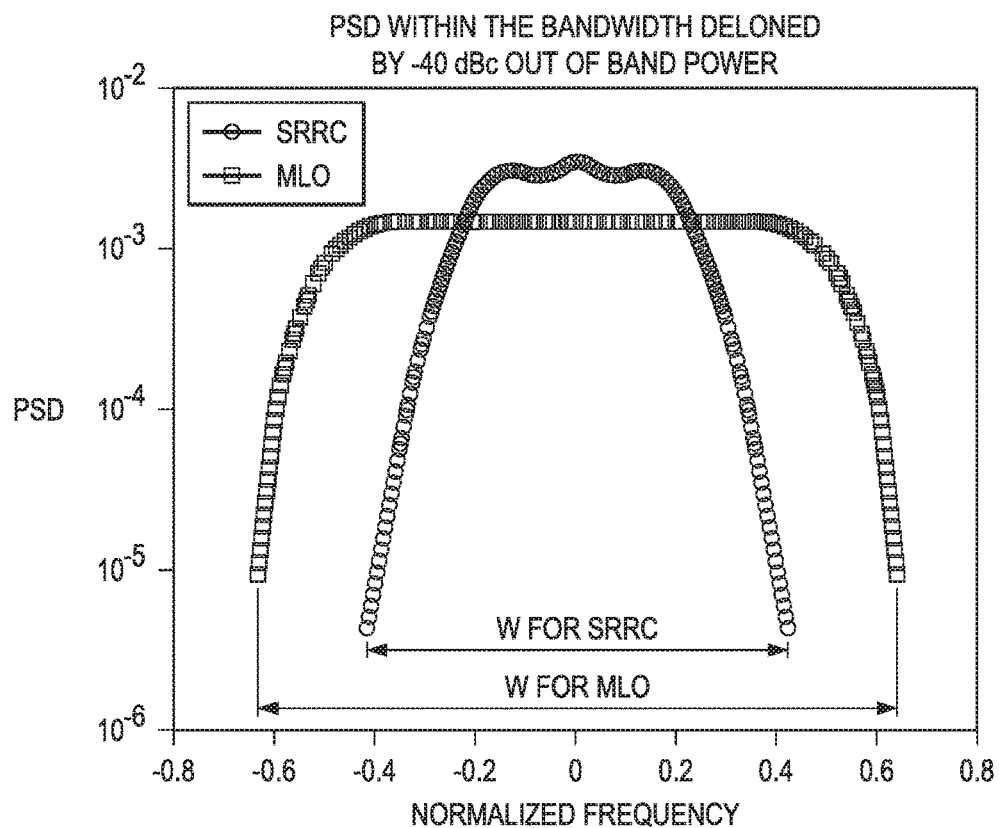
FIG. 31 illustrates a bandwidth comparison based on −40 dBc out of band power bandwidth between multiple layer overlay and square root raised cosine.

Referring now to FIG. 30, there is illustrated a PSD plot (BLANK) of MLO, modified MLO (MMLO) and square root raised cosine (SRRC). From the illustration in FIG. 30, demonstrates the better localization property of MLO. An advantage of MLO is the bandwidth. FIG. 30 also illustrates the interferences to adjacent channels will be much smaller for MLO. This will provide additional advantages in managing, allocating or packaging spectral resources of several channels and systems, and further improvement in overall spectral efficiency. If the bandwidth is defined by the −40 dBc out of band power, the within-bandwidth PSDs of MLO and SRRC are illustrated in FIG. 31. The ratio of the bandwidths is about 1.536. Thus, there is significant room for improvement in spectral efficiency.

Figure 32:
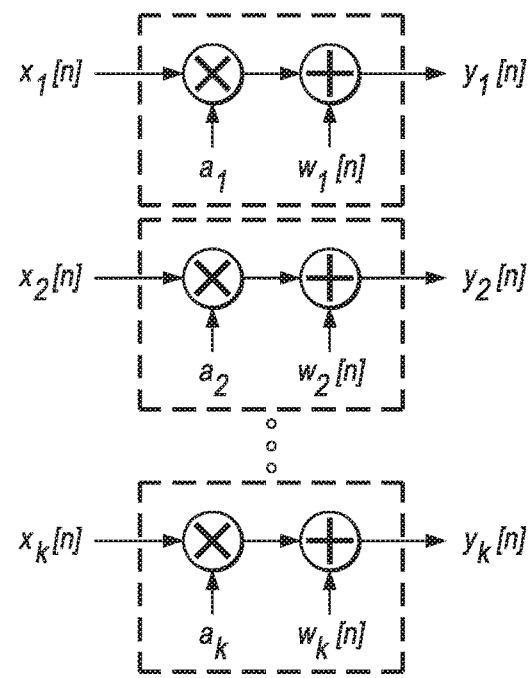
FIG. 32 illustrates equivalent discrete time parallel orthogonal channels of modified multiple layer overlay.

Modified MLO systems are based on block-processing wherein each block contains N MLO symbols and each MLO symbol has L layers. MMLO can be converted into parallel (virtual) orthogonal channels with different channel SNRs as illustrated in FIG. 32. The outputs provide equivalent discrete time parallel orthogonal channels of MMLO.

Figure 33:
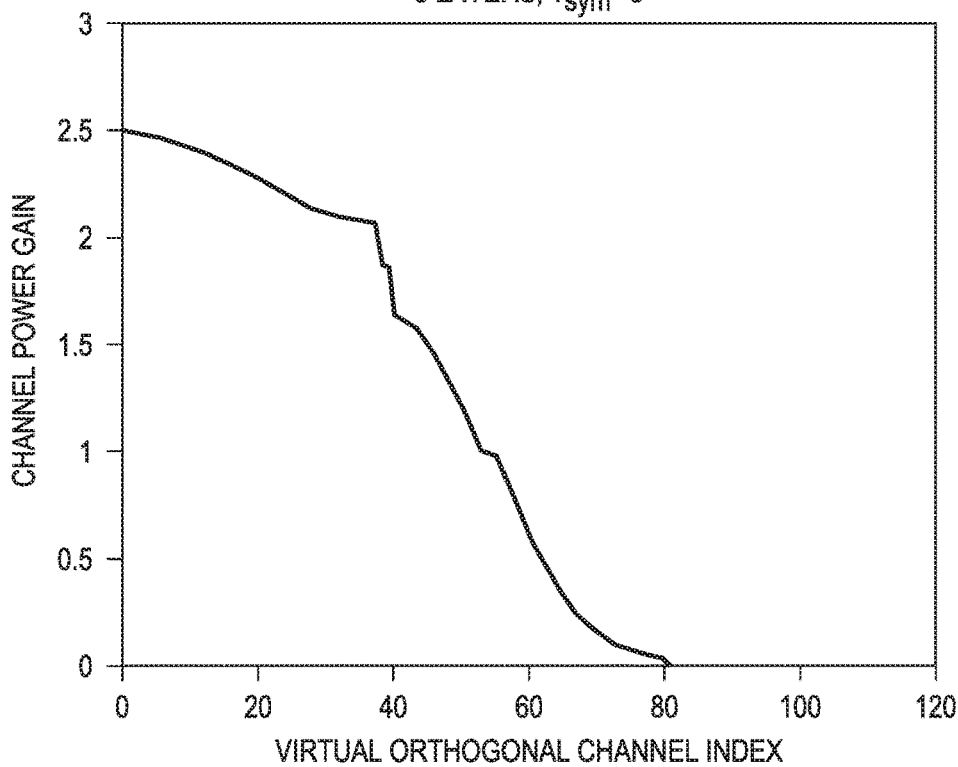
FIG. 33 illustrates the channel power gain of the parallel orthogonal channels of modified multiple layer overlay with three layers and $T_{sym}=3$.

Note that the intersymbol interference caused pulse overlapping of MLO has been addressed by the parallel orthogonal channel conversion. As an example, the power gain of a parallel orthogonal virtual channel of MMLO with three layers and 40 symbols per block is illustrated in FIG. 33. FIG. 33 illustrates the channel power gain of the parallel orthogonal channels of MMLO with three layers and $T_{sim}=3$. By applying a water filling solution, an optimal power distribution across the orthogonal channels for a fixed transmit power may be obtained. The transmit power on the $k^{th}$ orthogonal channel is denoted by $P_k$. Then the discrete time capacity of the MMLO can be given by:

$$C_d = \sum_{k=1}^{k} \log_2\left(1 + \frac{P_k|a_k|^2}{\sigma_k^2}\right)\text{ bits per block}$$

Note that K depends on the number of MLO layers, the number of MLO symbols per block, and MLO symbol duration.

For MLO pulse duration defined by $[-t_1, t_1]$, and symbol duration $T_{mlo}$, the MMLO block length is:

$$T_{block}=(N-1)T_{mlo}+2t_1$$

Suppose the bandwidth of MMLO signal based on the adopted bandwidth definition (ACLR, OBP, or other) is $W_{mmlo}$, then the practical spectral efficiency of MMLO is given by:

$$\frac{C_d}{W_{mmlo}T_{block}} = \frac{1}{W_{mmlo}\{(N-1)T_{mlo}+2t_1\}}\sum_{k=1}^{K}\log_2\left(1+\frac{P_k|a_k|^2}{\sigma_k^2}\right)\frac{\text{bps}}{\text{Hz}}$$

Figure 34:
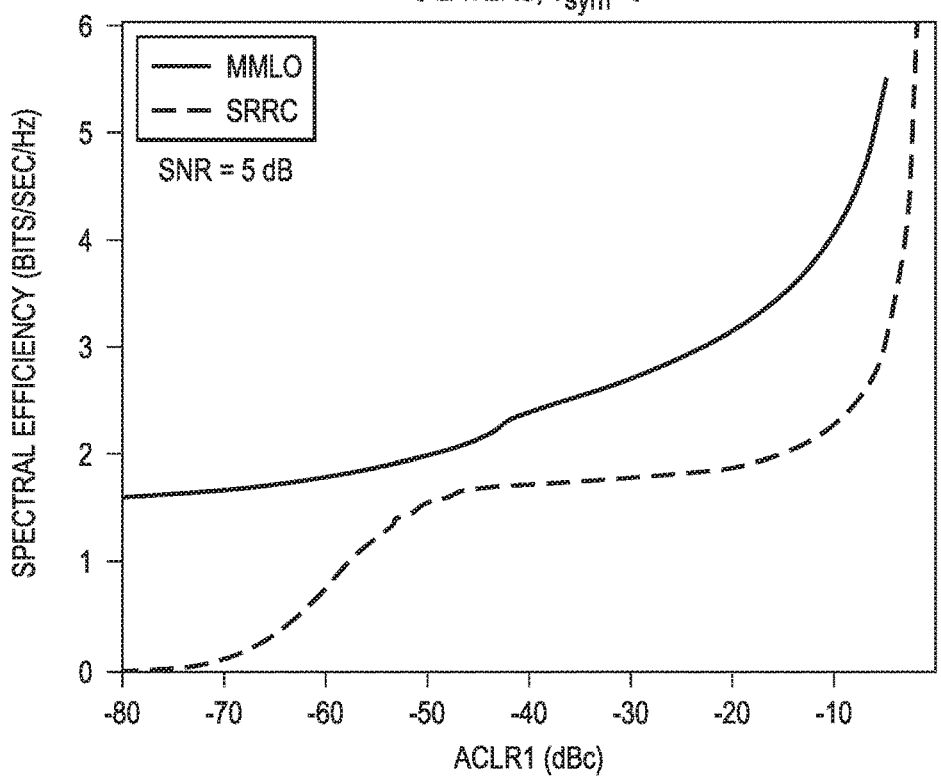
FIG. 34 illustrates a spectral efficiency comparison based on ACLR1 between modified multiple layer overlay and square root raised cosine.
Figure 35:
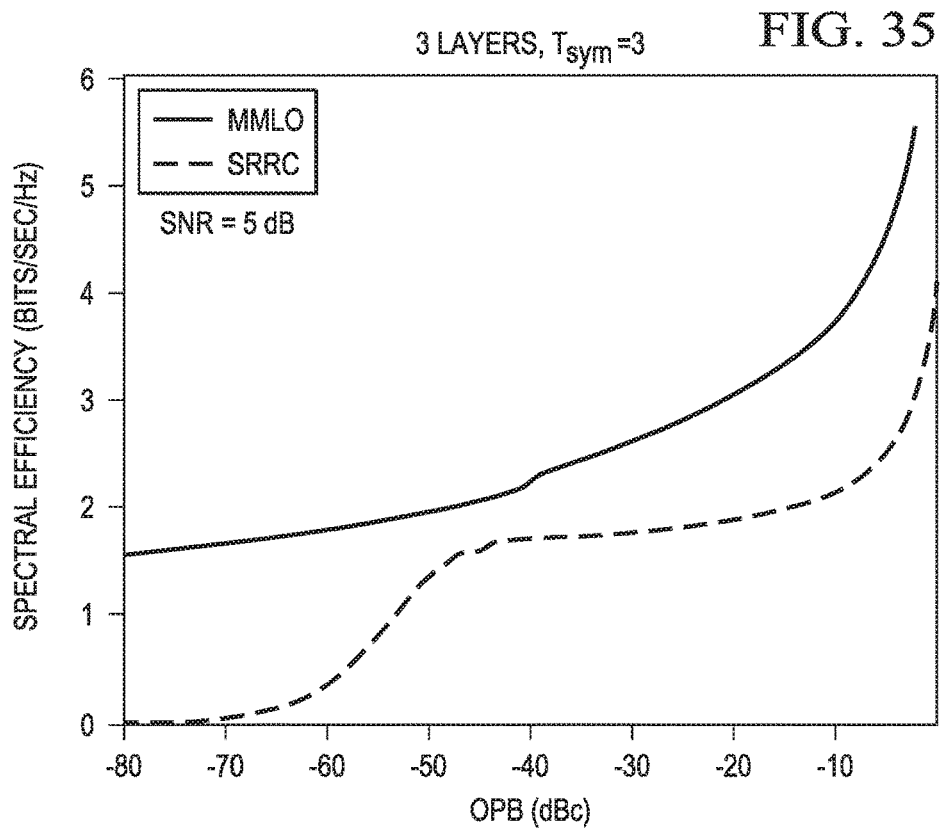
FIG. 35 illustrates a spectral efficiency comparison between modified multiple layer overlay and square root raised cosine based on OBP.

FIGS. 34-35 show the spectral efficiency comparison of MMLO with N=40 symbols per block, L=3 layers, $T_{mlo}=3$, $t_1=8$, and SRRC with duration [−8T, 8T], T=1, and the roll-off factor β=0.22, at SNR of 5 dB. Two bandwidth definitions based on ACLR1 (first adjacent channel leakage power ratio) and OBP (out of band power) are used.

Figure 36:
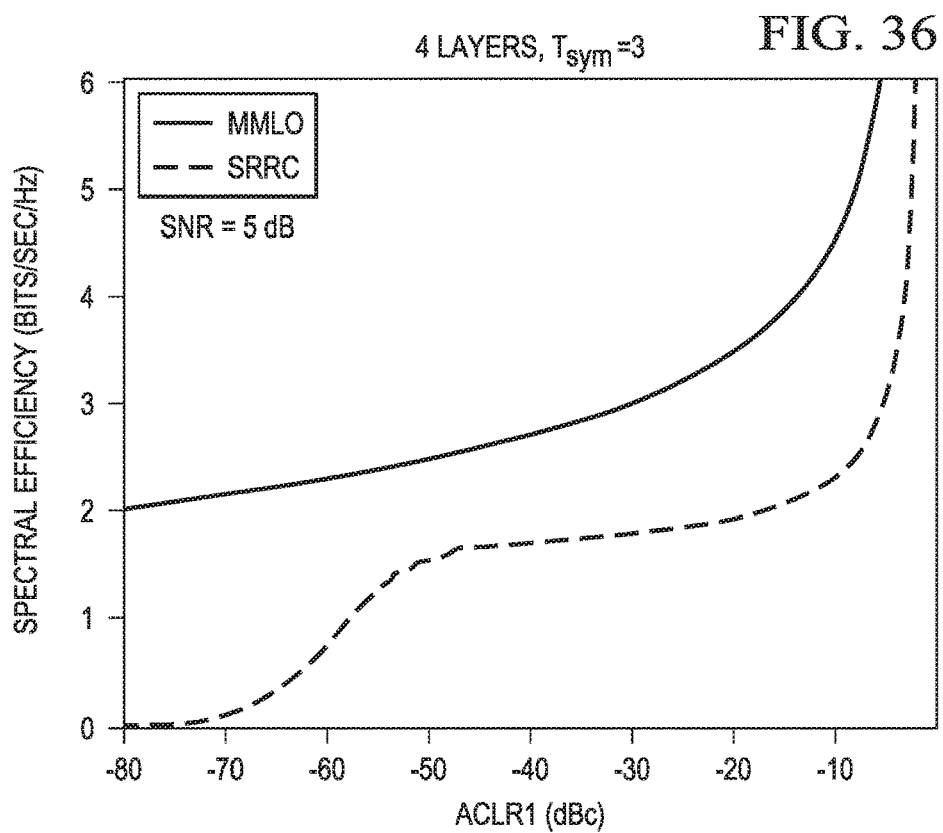
FIG. 36 illustrates a spectral efficiency comparison based on ACLR1 between modified multiple layer overlay and square root raised cosine.
Figure 37:
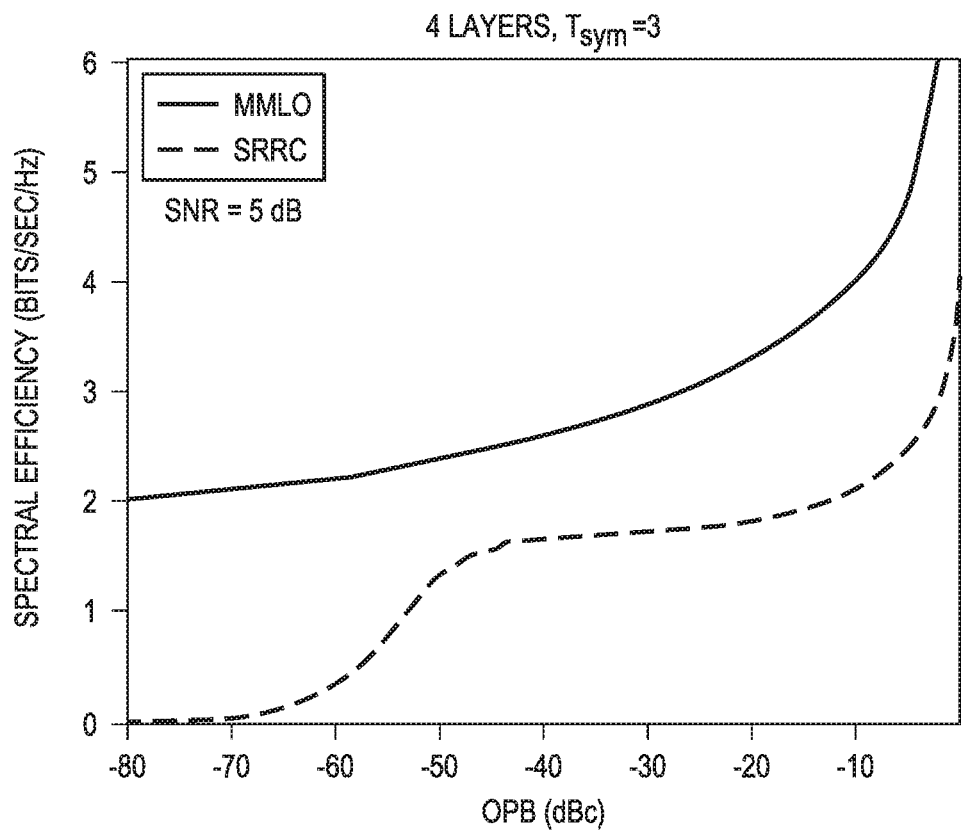
FIG. 37 illustrates a spectral efficiency comparison based on OBP between modified multiple layer overlay and square root raised cosine.

FIGS. 36-37 show the spectral efficiency comparison of MMLO with L=4 layers. The spectral efficiencies and the gains of MMLO for specific bandwidth definitions are shown in the following tables.

TABLE D

| | Spectral Efficiency (bps/Hz) based on ACLR1 ≤30 dBc per bandwidth | Gain with reference to SRRC |
|---|---|---|
| SRRC | 1.7859 | 1 |
| MMLO (3 layers, Tmlo = 3) | 2.7928 | 1.5638 |
| MMLO (4 layers, Tmlo = 3) | 3.0849 | 1.7274 |

TABLE E

| | Spectral Efficiency (bps/Hz) based on OBP ≤−40 dBc | Gain with reference to SRRC |
|---|---|---|
| SRRC | 1.7046 | 1 |
| MMLO (3 layers, Tmlo = 3) | 2.3030 | 1.3510 |
| MMLO (4 layers, Tmlo = 3) | 2.6697 | 1.5662 |

Figure 38:
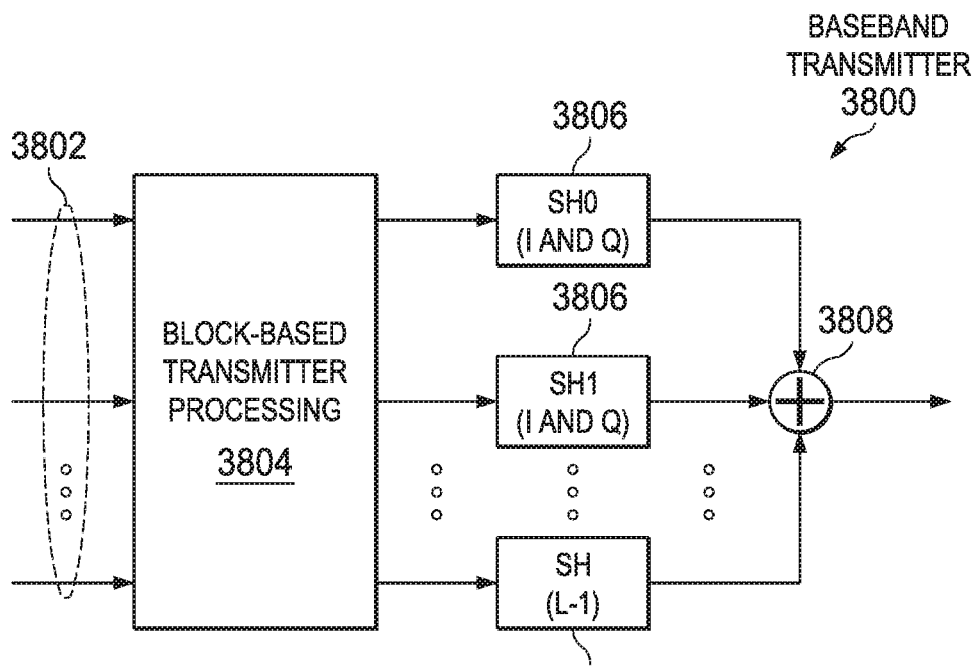
FIG. 38 illustrates a block diagram of a baseband transmitter for a low pass equivalent modified multiple layer overlay system.
Figure 39:
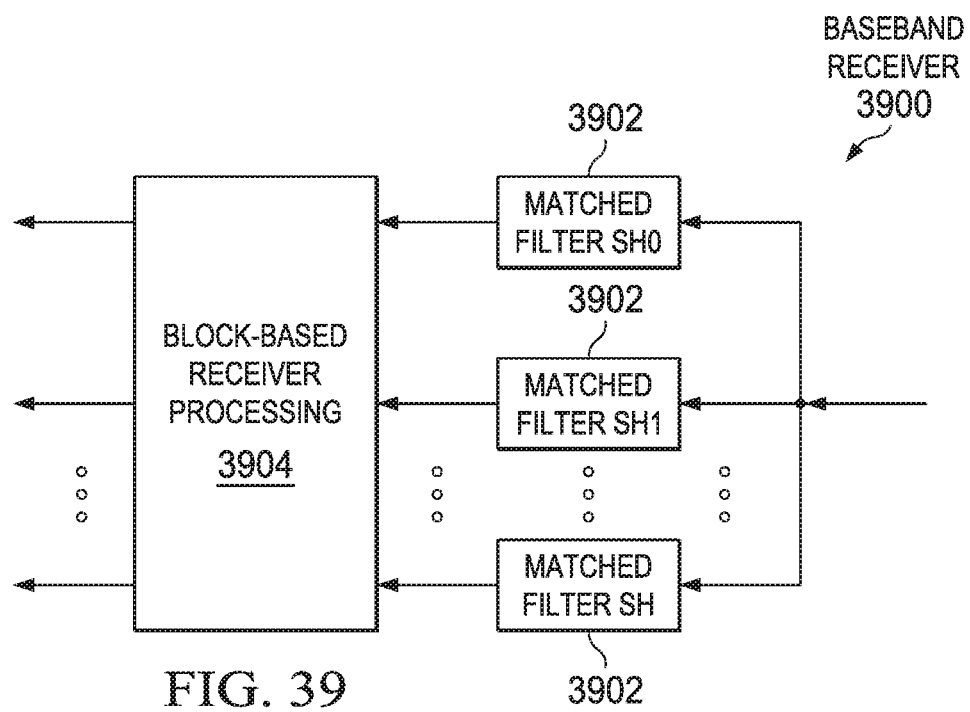
FIG. 39 illustrates a block diagram of a baseband receiver for a low pass equivalent modified multiple layer overlay system.

Referring now to FIGS. 38 and 39, there are provided basic block diagrams of low-pass-equivalent MMLO transmitters (FIG. 38) and receivers (FIG. 39). The low-pass-equivalent MMLO transmitter 3800 receives a number of input signals 3802 at a block-based transmitter processing 3804. The transmitter processing outputs signals to the SH(L−1) blocks 3806 which produce the I&Q outputs. These signals are then all combined together at a combining circuit 3808 for transmission.

Within the baseband receiver (FIG. 39) 3900, the received signal is separated and applied to a series of match filters 3902. The outputs of the match filters are then provided to the block-based receiver processing block 3904 to generate the various output streams.

Consider a block of N MLO-symbols with each MLO symbol carrying L symbols from L layers. Then there are NL symbols in a block. Define c(m, n)=symbol transmitted by the m-th MLO layer at the n-th MLO symbol. Write all NL symbols of a block as a column vector as follows: c=[c(0,0), c(1,0), . . . , c(L−1, 0), c(0,1), c(1,1), . . . , c(L−1, 1), . . . , c(L−1, N−1)]T. Then the outputs of the receiver matched filters for that transmitted block in an AWGN channel, defined by the column vector y of length NL, can be given as y=H c+n, where H is an NL×NL matrix representing the equivalent MLO channel, and n is a correlated Gaussian noise vector.

By applying SVD to H, we have H=U D VH where D is a diagonal matrix containing singular values. Transmitter side processing using V and the receiver side processing UH, provides an equivalent system with NL parallel orthogonal channels, (i.e., y=H Vc+n and UH y=Dc+UH n). These parallel channel gains are given by diagonal elements of D. The channel SNR of these parallel channels can be computed. Note that by the transmit and receive block-based processing, we obtain parallel orthogonal channels and hence the ISI issue has be resolved.

Since the channel SNRs of these parallel channels are not the same, we can apply the optimal Water filling solution to compute the transmit power on each channel given a fixed total transmit power. Using this transmit power and corresponding channel SNR, we can compute capacity of the equivalent system as given in the previous report.

Issues of Fading, Multipath, and Multi-Cell Interference

Techniques used to counteract channel fading (e.g., diversity techniques) in conventional systems can also be applied in MMLO. For slowly-varying multi-path dispersive channels, if the channel impulse response can be fed back, it can be incorporated into the equivalent system mentioned above, by which the channel induced ISI and the intentionally introduced MMLO ISI can be addressed jointly. For fast time-varying channels or when channel feedback is impossible, channel equalization needs to be performed at the receiver. A block-based frequency-domain equalization can be applied and an oversampling would be required.

If we consider the same adjacent channel power leakage for MMLO and the conventional system, then the adjacent cells' interference power would be approximately the same for both systems. If interference cancellation techniques are necessary, they can also be developed for MMLO.

Scope and System Description

This report presents the symbol error probability (or symbol error rate) performance of MLO signals in additive white Gaussian noise channel with various inter-symbol interference levels. As a reference, the performance of the conventional QAM without ISI is also included. The same QAM size is considered for all layers of MLO and the conventional QAM.

The MLO signals are generated from the Physicist's special Hermite functions:

$$f_n(t, \alpha) = \sqrt{\frac{\alpha}{\sqrt{\pi} n! 2^n}} H_n(\alpha t) e^{-\frac{\alpha^2 t^2}{2}}$$

where Hn(αt) is the $n^{th}$ order Hermite polynomial. Note that the functions used in the lab setup correspond to $$\alpha = \frac{1}{\sqrt{2}}$$

and, for consistency, $$\alpha = \frac{1}{\sqrt{2}}$$

is used in this report.

MLO signals with 3, 4 or 10 layers corresponding to n=0~2, 0~3, or 0~9 are used and the pulse duration (the range of t) is [−8, 8] in the above function.

AWGN channel with perfect synchronization is considered.

The receiver consists of matched filters and conventional detectors without any interference cancellation, i.e., QAM slicing at the matched filter outputs.

$$\% \text{ pulse-overlapping} = \frac{T_p - T_{sym}}{T_p} \times 100\%$$

where Tp is the pulse duration (16 in the considered setup) and Tsym is the reciprocal of the symbol rate in each MLO layer. The considered cases are listed in the following table.

TABLE F

| % of Pulse Overlapping | $T_{sym}$ | $T_p$ |
|---|---|---|
| 0% | 16 | 16 |
| 12.5% | 14 | 16 |

TABLE F-continued

| % of Pulse Overlapping | $T_{sym}$ | $T_P$ |
|---|---|---|
| 18.75% | 13 | 16 |
| 25% | 12 | 16 |
| 37.5% | 10 | 16 |
| 43.75% | 9 | 16 |
| 50% | 8 | 16 |
| 56.25% | 7 | 16 |
| 62.5% | 6 | 16 |
| 75% | 4 | 16 |

Derivation of the Signals Used in Modulation

To do that, it would be convenient to express signal amplitude s(t) in a complex form close to quantum mechanical formalism. Therefore the complex signal can be represented as:

$$\psi(t) = s(t) + j\sigma(t)$$

where $s(t) \equiv$ real signal $\sigma(t) =$ imaginary signal (quadrature)

$$\sigma(t) = \frac{1}{\pi}\int_{-\infty}^{\infty} s(\tau)\frac{d\tau}{\tau - t}$$

$$s(t) = -\frac{1}{\pi}\int_{-\infty}^{\infty} \sigma(t)\frac{d\tau}{\tau - t}$$

Where s(t) and σ(t) are Hilbert transforms of one another and since σ(t) is qudratures of s(t), they have similar spectral components. That is if they were the amplitudes of sound waves, the ear could not distinguish one form from the other.

Let us also define the Fourier transform pairs as follows:

$$\psi(t) = \frac{1}{\pi}\int_{-\infty}^{\infty}\varphi(f)e^{j\omega t}df$$

$$\varphi(f) = \frac{1}{\pi}\int_{-\infty}^{\infty}\psi(t)e^{-j\omega t}dt$$

$$\psi^*(t)\psi(t) = [s(t)]^2 + [\sigma(t)]^2 + \ldots \equiv \text{signal power}$$

Let's also normalize all moments to $M_0$:

$$M_0 = \int_0^\tau s(t)dt$$

$$M_0 = \int_0^\tau \varphi^*\varphi df$$

Then the moments are as follows:

$$M_0 = \int_0^\tau s(t)dt$$

$$M_1 = \int_0^\tau ts(t)dt$$

$$M_2 = \int_0^\tau t^2 s(t)dt$$

$$M_{N-1} = \int_0^\tau t^{N-1} s(t)dt$$

In general, one can consider the signal s(t) be represented by a polynomial of order N, to fit closely to s(t) and use the coefficient of the polynomial as representation of data. This is equivalent to specifying the polynomial in such a way that its first N "moments" $M_j$ shall represent the data. That is, instead of the coefficient of the polynomial, we can use the moments. Another method is to expand the signal s(t) in terms of a set of N orthogonal functions $\varphi_k(t)$, instead of powers of time. Here, we can consider the data to be the coefficients of the orthogonal expansion. One class of such orthogonal functions are sine and cosine functions (like in Fourier series).

Therefore we can now represent the above moments using the orthogonal function w with the following moments:

$$\bar{t} = \frac{\int \psi^*(t)t\psi(t)dt}{\int \psi^*(t)\psi(t)dt}$$

$$\overline{t^2} = \frac{\int \psi^*(t)t^2\psi(t)dt}{\int \psi^*(t)\psi(t)dt}$$

$$\overline{t^n} = \frac{\int \psi^*(t)t^n\psi(t)dt}{\int \psi^*(t)\psi(t)dt}$$

Similarly, $$\bar{f} = \frac{\int \varphi^*(f)f\varphi(f)df}{\int \varphi^*(f)\varphi(f)df}$$

$$\overline{f^2} = \frac{\int \varphi^*(f)f^2\varphi(f)df}{\int \varphi^*(f)\varphi(f)df}$$

$$\overline{f^n} = \frac{\int \varphi^*(f)f^n\varphi(f)df}{\int \varphi^*(f)\varphi(f)df}$$

If we did not use complex signal, then:

$$\bar{f}=0$$

To represent the mean values from time to frequency domains, replace:

$$\varphi(f) \to \psi(t)$$

$$f \to \frac{1}{2\pi j}\frac{d}{dt}$$

These are equivalent to somewhat mysterious rule in quantum mechanics where classical momentum becomes an operator:

$$P_x \to \frac{h}{2\pi j}\frac{\partial}{\partial x}$$

Therefore using the above substitutions, we have:

$$\bar{f} = \frac{\int \varphi^*(f) f \varphi(f) df}{\int \varphi^*(f) \varphi(f) df} = \frac{\int \psi^*(t) \left(\frac{1}{2\pi j}\right) \frac{d\psi(t)}{dt} dt}{\int \psi^*(t) \psi(t) dt} = \left(\frac{1}{2\pi j}\right) \frac{\int \psi^* \frac{d\psi}{dt} dt}{\int \psi^* \psi dt}$$

And:

$$\bar{f}^2 = \frac{\int \varphi^*(f) f^2 \varphi(f) df}{\int \varphi^*(f) \varphi(f) df} = \frac{\int \psi^* \left(\frac{1}{2\pi j}\right)^2 \frac{d^2}{dt^2} \psi dt}{\int \psi^* \psi dt} = -\left(\frac{1}{2\pi}\right)^2 \frac{\int \psi^* \frac{d^2}{dt^2} \psi dt}{\int \psi^* \psi dt}$$

$$\bar{t}^2 = \frac{\int \psi^* t^2 \psi dt}{\int \psi^* \psi dt}$$

We can now define an effective duration and effective bandwidth as:

$$\Delta t = \sqrt{2\pi \overline{(t-\bar{t})^2}} = 2\pi \cdot \text{rms in time}$$

$$\Delta f = \sqrt{2\pi \overline{(f-\bar{f})^2}} = 2\pi \cdot \text{rms in frequency}$$

But we know that:

$$\overline{(t-\bar{t})^2} = \bar{t}^2 - (\bar{t})^2$$

$$\overline{(f-\bar{f})^2} = \bar{f}^2 - (\bar{f})^2$$

We can simplify if we make the following substitutions:

$$\tau = t - \bar{t}$$

$$\Psi(\tau) = \psi(t) e^{-j\omega \tau}$$

$$\omega_0 = \bar{\omega} = 2\pi \bar{f} = 2\pi f_0$$

We also know that:

$$(\Delta t)^2 (\Delta f)^2 = (\Delta t \Delta f)^2$$

And therefore:

$$(\Delta t \Delta f)^2 = \frac{1}{4} \left[ 4 \frac{\int \Psi^*(\tau) \tau^2 \Psi(\tau) d\tau \int \frac{d\Psi^*}{d\tau} \frac{d\Psi}{d\tau} d\tau}{\left(\int \Psi^*(\tau) \psi(\tau) d\tau\right)^2} \right] \geq \left(\frac{1}{4}\right)$$

$$(\Delta t \Delta f) \geq \left(\frac{1}{2}\right)$$

Now instead of $$(\Delta t \Delta f) \geq \left(\frac{1}{2}\right)$$

we are interested to force the equality $$(\Delta t \Delta f) = \left(\frac{1}{2}\right)$$

and see what signals satisfy the equality. Given the fixed bandwidth $\Delta f$, the most efficient transmission is one that minimizes the time-bandwidth product $$(\Delta t \Delta f) = \left(\frac{1}{2}\right)$$

For a given bandwidth $\Delta f$, the signal that minimizes the transmission in minimum time will be a Gaussian envelope. However, we are often given not the effective bandwidth, but always the total bandwidth $f_2 - f_1$. Now, what is the signal shape which can be transmitted through this channel in the shortest effective time and what is the effective duration?

$$\Delta t = \frac{\frac{1}{(2\pi)^2} \int_{f_1}^{f_2} \frac{d\varphi^*}{df} \frac{d\varphi}{df}}{\int_{f_1}^{f_2} \varphi^* \varphi df} \to \min$$

Where $\varphi(f)$ is zero outside the range $f_2 - f_1$.

To do the minimization, we would use the calculus of variations (Lagrange's Multiplier technique). Note that the denominator is constant and therefore we only need to minimize the numerator as:

$$\Delta t \to \min \to \delta \int_{f_1}^{f_2} \left(\frac{d\varphi^*}{df} \frac{d\varphi}{df} + \Lambda \varphi^* \varphi\right) df = 0$$

First *Trem*

$$\delta \int_{f_1}^{f_2} \frac{d\varphi^*}{df} \frac{d\varphi}{df} df =$$

$$\int \left(\frac{d\varphi^*}{df} \delta \frac{d\varphi}{df} + \frac{d\varphi}{df} \delta \frac{d\varphi^*}{df}\right) df = \int \left(\frac{d\varphi^*}{df} \frac{d\delta\varphi}{df} + \frac{d\varphi}{df} \frac{d\delta\varphi^*}{df}\right) df =$$

$$\left[\frac{d\varphi^*}{df} \delta\varphi + \frac{d\varphi}{df} \delta\varphi^*\right]_{f_1}^{f_2} - \int \left(\frac{d^2 \varphi^*}{df^2} \delta\varphi + \frac{d^2 \varphi}{df^2} \delta\varphi^*\right) df =$$

$$\int \left(\frac{d^2 \varphi^*}{df^2} \delta\varphi + \frac{d^2 \varphi}{df^2} \delta\varphi^*\right) df$$

Second *Trem*

$$\delta \int_{f_1}^{f_2} (\Lambda \varphi^* \varphi) df = \Lambda \int_{f_1}^{f_2} (\varphi^* \delta\varphi + \varphi \delta\varphi^*) df$$

Both *Trems*

$$= \int \left[\left(\frac{d^2 \varphi^*}{df^2} + \Lambda \varphi^*\right) \delta\varphi + \left(\frac{d^2 \varphi}{df^2} + \Lambda \varphi\right) \delta\varphi^*\right] df = 0$$

This is only possible if and only if:

$$\left(\frac{d^2 \varphi}{df^2} + \Lambda \varphi\right) = 0$$

The solution to this is of the form $$\varphi(f) = \sin k\pi \left(\frac{f - f_1}{f_2 - f_1}\right)$$

Now if we require that the wave vanishes at infinity, but still satisfy the minimum time-bandwidth product:

$$(\Delta t \Delta f) = \left(\frac{1}{2}\right)$$

Then we have the wave equation of a Harmonic Oscillator:

$$\frac{d^2\Psi(\tau)}{d\tau^2} + (\lambda - \alpha^2\tau^2)\Psi(\tau) = 0$$

which vanishes at infinity only if:

$$\lambda = \alpha(2n+1)$$

$$\psi_n = e^{-\frac{1}{2}\omega^2\tau^2}\frac{d^n}{d\tau^n}e^{-\alpha^2\tau^2} \propto H_n(\tau)$$

Where $H_n(\tau)$ is the Hermit functions and:

$$(\Delta t \Delta f) = \frac{1}{2}(2n+1)$$

So Hermit functions $H_n(\tau)$ occupy information blocks of 1/2, 3/2, 5/2, ... with 1/2 as the minimum information quanta.

Squeezed States

Here we would derive the complete Eigen functions in the most generalized form using quantum mechanical approach of Dirac algebra. We start by defining the following operators:

$$b = \sqrt{\frac{m\omega'}{2\hbar}}\left(x + \frac{ip}{m\omega'}\right)$$

$$b^+ = \sqrt{\frac{m\omega'}{2\hbar}}\left(x - \frac{ip}{m\omega'}\right)$$

$$[b, b^+] = 1$$
$$a = \lambda b - \mu b^+$$
$$a^+ = \lambda b^+ - \mu b$$

Now we are ready to define $\Delta x$ and $\Delta p$ as:

$$(\Delta x)^2 = \frac{\hbar}{2m\omega}\left(\frac{\omega}{\omega'}\right) = \frac{\hbar}{2m\omega}(\lambda - \mu)^2$$

$$(\Delta p)^2 = \frac{\hbar m\omega}{2}\left(\frac{\omega'}{\omega}\right) = \frac{\hbar m\omega}{2}(\lambda + \mu)^2$$

$$(\Delta x)^2(\Delta p)^2 = \frac{\hbar^2}{4}(\lambda^2 - \mu^2)^2$$

-continued $$\Delta x \Delta p = \frac{\hbar}{2}(\lambda^2 - \mu^2) = \frac{\hbar}{2}$$

Now let parameterize differently and instead of two variables $\lambda$ and $\mu$, we would use only one variable $\xi$ as follows:

$\lambda = \sin h\, \xi$ $\mu = \cos h\, \xi$ $\lambda + \mu = e^\xi$ $\lambda - \mu = -e^{-\xi}$ Now the Eigen states of the squeezed case are:

$$b|\beta\rangle = \beta|\beta\rangle$$

$$(\lambda a + \mu a^+)|\beta\rangle = \beta|\beta\rangle$$

$$b = UaU^+$$

$$U = e^{\frac{\xi}{2}(a^2 - a^{+2})}$$

$$U^+(\xi)aU(\xi) = a\cosh\xi - a^+\sinh\xi$$

$$U^+(\xi)a^+U(\xi) = a^+\cosh\xi - a\sinh\xi$$

$$U^+(\xi)aU(\xi) = a\cos h\xi - a^+\sin h\xi$$

$$U^+(\xi)a^+U(\xi) = a^+\cos h\xi - a\sin h\xi$$

We can now consider the squeezed operator:

$$|\alpha, \xi\rangle = U(\xi)D(\alpha)|0\rangle$$

$$D(\alpha) = e^{-\frac{|\alpha|^2}{2}}e^{\alpha a^+}e^{-\alpha^* a}$$

$$|\alpha\rangle = \sum_{n=0}^{\infty}\frac{\alpha^n}{\sqrt{n!}}e^{-\frac{|\alpha|^2}{2}}|n\rangle$$

$$|\alpha\rangle = e^{-\frac{|\alpha|^2}{2} + \alpha a^+}|0\rangle$$

For a distribution P(n) we would have:

$$P(n) = |\langle n||\beta, \xi\rangle|^2$$

$$\langle \alpha||\beta, \xi\rangle = \sum_{n=0}^{\infty}\frac{\alpha^n}{\sqrt{n!}}e^{-\frac{|\alpha|^2}{2}}\langle n||\beta, \xi\rangle$$

$$e^{2zt-t^2} = \sum_{n=0}^{\infty}\frac{H_n(z)t^n}{n!}$$

Therefore the final result is:

$$\langle n||\beta, \xi\rangle = \frac{(\tanh\xi)^{n/2}}{2^{n/2}(n!\cosh\xi)^2}e^{-1/2(|\beta|^2 - \beta^2\tanh\xi)}H_n\left(\frac{\beta}{2\sinh\xi\cosh\xi}\right)$$

Optical Fiber Communications

Figure 40:
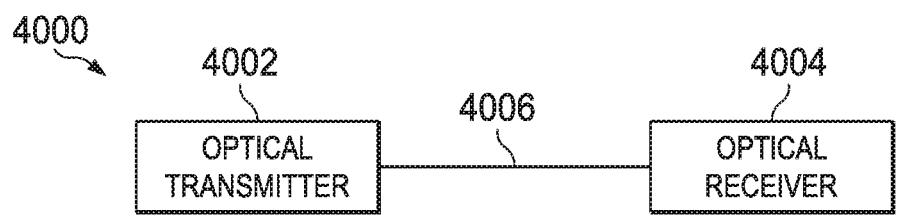
FIG. 40 illustrates the configuration of an optical fiber communication system.

The use of orbital angular momentum and multiple layer overlay modulation processing techniques within an optical communications interface environment as described with respect to FIG. 3 can provide a number of opportunities within the optical communications environment for enabling the use of the greater signal bandwidths provided by the use of optical orbital angular momentum processing, or multiple layer overlay modulation techniques alone. FIG. 40 illustrates the general configuration of an optical fiber communication system. The optical fiber communication system 4000 includes an optical transmitter 4002 and an optical receiver 4004. The transmitter 4002 and receiver 4004 communicate over an optical fiber 4006. The transmitter 4002 includes information within a light wavelength or wavelengths that is propagated over the optical fiber 4006 to the optical receiver 4004.

Optical communications network traffic has been steadily increasing by a factor of 100 every decade. The capacity of single mode optical fibers has increased 10,000 times within the last three decades. Historically, the growth in the bandwidth of optical fiber communications has been sustained by information multiplexing techniques using wavelength, amplitude, phase, and polarization of light as a means for encoding information. Several major discoveries within the fiber-optics domain have enabled today's optical networks. An additional discovery was led by Charles M. Kao's groundbreaking work that recognized glass impurities within an optical fiber as a major signal loss mechanism. Existing glass losses at the time of his discovery were approximately 200 dB per kilometer at 1 micrometer.

Figure 41A:
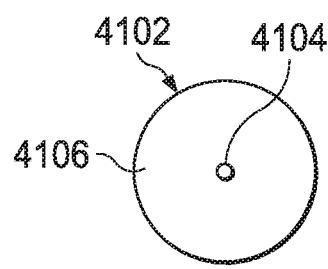
FIG. 41A illustrates a single mode fiber.
Figure 41B:
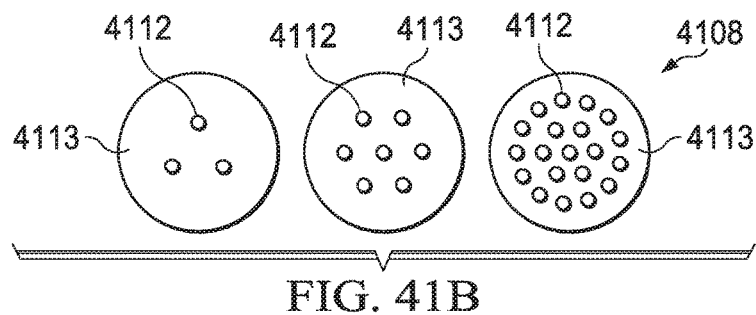
FIG. 41B illustrates multi-core fibers.
Figure 41C:
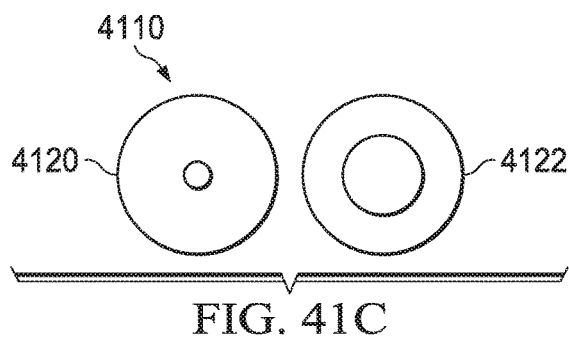
FIG. 41C illustrates multi-mode fibers.
Figure 41D:
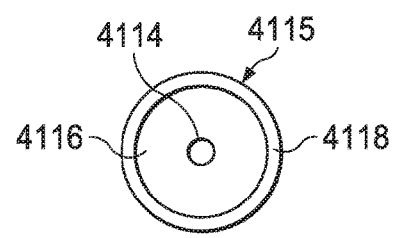
FIG. 41D illustrates a hollow core fiber.

These discoveries gave birth to optical fibers and led to the first commercial optical fibers in the 1970s, having an attenuation low enough for communication purposes in the range of approximately 20 dBs per kilometer. Referring now to FIGS. 41A-41C, there is more particularly illustrated the single mode fiber 4102, multicore fibers 4108, and multimode fibers 4110 described herein above. The multicore fibers 4108 consist of multiple cores 4112 included within the cladding 4113 of the fiber. As can be seen in FIG. 41B, there are illustrated a 3 core fiber, 7 core fiber, and 19 core fiber. Multimode fibers 4110 comprise multimode fibers comprising a few mode fiber 4120 and a multimode fiber 4122. Finally, there is illustrated a hollow core fiber 4115 including a hollow core 4114 within the center of the cladding 4116 and sheathing 4118. The development of single mode fibers (SMF) such as that illustrated at 4102 (FIG. 41A) in the early 1980s reduced pulse dispersion and led to the first fiber-optic based trans-Atlantic telephone cable. This single mode fiber included a single transmission core 4104 within an outer sheathing 4106. Development of indium gallium arsenide photodiodes in the early 1990s shifted the focus to near-infrared wavelengths (1550 NM), were silica had the lowest loss, enabling extended reach of the optical fibers. At roughly the same time, the invention of erbium-doped fiber amplifiers resulted in one of the biggest leaps in fiber capacity within the history of communication, a thousand fold increase in capacity occurred over a 10 year period. The development was mainly due to the removed need for expensive repeaters for signal regeneration, as well as efficient amplification of many wavelengths at the same time, enabling wave division multiplexing (WDM).

Throughout the 2000s, increases in bandwidth capacity came mainly from introduction of complex signal modulation formats and coherent detection, allowing information encoding using the phase of light. More recently, polarization division multiplexing (PDM) doubled channel capacity. Through fiber communication based on SMFs featured tremendous growth in the last three decades, recent research has indicated SMF limitations. Non-linear effects in silica play a significant role in long range transmission, mainly through the Kerr effect, where a presence of a channel at one wavelength can change the refractive index of a fiber, causing distortions of other wavelength channels. More recently, a spectral efficiency (SE) or bandwidth efficiency, referring to the transmitted information rate over a given bandwidth, has become theoretically analyzed assuming nonlinear effects in a noisy fiber channel. This research indicates a specific spectral efficiency limit that a fiber of a certain length can reach for any signal to noise (SNR). Recently achieved spectral efficiency results indeed show that the proximity to the spectral efficiency limit, indicating the need for new technologies to address the capacity issue in the future.

Among several possible directions for optical communications in the future, the introduction of new optical fibers 4006 other than single mode fibers 4102 has shown promising results. In particular, researchers have focused on spatial dimensions in new fibers, leading to so-called space division multiplexing (SDM) where information is transmitted using cores of multi-core fibers (MCF) 4108 (FIG. 41B) or mode division multiplexing (MDM) or information is transmitted using modes of multimode fibers (MMFs) 4110 (FIG. 41C). The latest results show spectral efficiency of 91 bits/S/Hz using 12 core multicore fiber 4108 for 52 kilometer long fibers and 12 bits/S/Hz using 6 mode multimode fiber 4110 and 112 kilometer long fibers. Somewhat unconventional transmissions at 2.08 micrometers have also been demonstrated in two 90 meter long photonic crystal fibers, though these fibers had high losses of 4.5 decibels per kilometer.

While offering promising results, these new types of fibers have their own limitations. Being noncircularly symmetric structures, multicore fibers are known to require more complex, expensive manufacturing. On the other hand, multimode fibers 4110 are easily created using existing technologies. However, conventional multimode fibers 4110 are known to suffer from mode coupling caused by both random perturbations in the fibers and in modal multiplexers/demultiplexers.

Several techniques have been used for mitigating mode coupling. In a strong coupling regime, modal cross talk can be compensated using computationally intensive multi-input multi-output (MIMO) digital signal processing (DSP). While MIMO DSP leverages the technique's current success in wireless networks, the wireless network data rates are several orders of magnitude lower than the ones required for optical networks. Furthermore, MIMO DSP complexity inevitably increases with an increasing number of modes and no MIMO based data transmission demonstrations have been demonstrated in real time thus far. Furthermore, unlike wireless communication systems, optical systems are further complicated because of fiber's nonlinear effects. In a weak coupling regime, where cross talk is smaller, methods that also use computationally intensive adapted optics, feedback algorithms have been demonstrated. These methods reverse the effects of mode coupling by sending a desired superposition of modes at the input, so that desired output modes can be obtained. This approach is limited, however, since mode coupling is a random process that can change on the order of a millisecond in conventional fibers.

Thus, the adaptation of multimode fibers 4110 can be problematic in long haul systems where the round trip signal propagation delay can be tens of milliseconds. Though 2×56

GB/S transmission at 8 kilometers length has been demonstrated in the case of two higher order modes, none of the adaptive optics MDM methods to date have demonstrated for more than two modes. Optical fibers act as wave guides for the information carrying light signals that are transmitted over the fiber. Within an ideal case, optical fibers are 2D, cylindrical wave guides comprising one or several cores surrounded by a cladding having a slightly lower refractive index as illustrated in FIGS. 41A-41D. A fiber mode is a solution (an eigenstate) of a wave guide equation describing the field distribution that propagates within a fiber without changing except for the scaling factor. All fibers have a limit on the number of modes that they can propagate, and have both spatial and polarization degrees of freedom.

Single mode fibers (SMFs) 4102 is illustrated in FIG. 41A support propagation of two orthogonal polarizations of the fundamental mode only (N=2). For sufficiently large core radius and/or the core cladding difference, a fiber is multi-moded for N>2 as illustrated in FIG. 41C. For optical signals having orbital angular momentums and multilayer modulation schemes applied thereto, multimode fibers 4110 that are weakly guided may be used. Weakly guided fibers have a core cladding refractive index difference that is very small. Most glass fibers manufactured today are weakly guided, with the exception of some photonic crystal fibers and air-core fibers. Fiber guide modes of multimode fibers 4110 may be associated in step indexed groups where, within each group, modes typically having similar effective indexes are grouped together. Within a group, the modes are degenerate. However, these degeneracies can be broken in a certain fiber profile design.

We start by describing translationally invariant waveguide with refractive index n=n(x, y), with $n_{co}$ being maximum refractive index ("core" of a waveguide), and $n_{cl}$ being refractive index of the uniform cladding, and ρ represents the maximum radius of the refractive index n. Due to translational invariance the solutions (or modes) for this waveguide can be written as:

$$E_j(x,y,z) = e_j(x,y)e^{i\beta_j z},$$

$$H_j(x,y,z) = h_j(x,y)e^{i\beta_j z},$$

where $\beta_j$ is the propagation constant of the j-th mode. Vector wave equation for source free Maxwell's equation can be written in this case as:

$$(\nabla^2 + n^2 k^2 - \beta_j^2)e^j = -(\nabla_t + i\beta_j \hat{z})(e_{tj} \cdot \nabla_t \ln(n^2))$$

$$(\nabla^2 + n^2 k^2 - \beta_j^2)h_j = -(\nabla_t \ln(n^2)) \times ([(\nabla)]_t + i\beta_j \hat{z}) \times h_j)$$

where k=2π/λ is the free-space wavenumber, λ is a free-space wavelength, $e_t = e_x \hat{x} + e_y \hat{y}$ is a transverse part of the electric field, $\nabla^2$ is a transverse Laplacian and $\nabla_t$ transverse vector gradient operator. Waveguide polarization properties are built into the wave equation through the $\nabla_t \ln(n^2)$ terms and ignoring them would lead to the scalar wave equation, with linearly polarized modes. While previous equations satisfy arbitrary waveguide profile n(x, y), in most cases of interest, profile height parameter Δ can be considered small Δ<<1, in which case waveguide is said to be weakly guided, or that weakly guided approximation (WGA) holds. If this is the case, a perturbation theory can be applied to approximate the solutions as:

$$E(x,y,z) = e(x,y)e^{i(\beta+\hat{\beta})z} = (e_t + \hat{z}e_z)e^{i(\beta+\hat{\beta})z}$$

$$H(x,y,z) = h(x,y)^{i(\beta+\hat{\beta})z} = (h_t + \hat{z}h_z)e^{i(\beta+\hat{\beta})z}$$

where subscripts t and z denote transverse and longitudinal components respectively. Longitudinal components can be considered much smaller in WGA and we can approximate (but not neglect) them as:

$$e_z = \frac{i(2\Delta)^{\frac{1}{2}}}{v}(\rho \nabla_t \cdot e_t)$$

$$h_z = \frac{i(2\Delta)^{\frac{1}{2}}}{V}(\rho \nabla_t \cdot h_t)$$

Where Δ and V are profile height and fiber parameters and transversal components satisfy the simplified wave equation.

$$(\nabla^2 + n^2 k^2 - \beta_j^2)e_j = 0$$

Though WGA simplified the waveguide equation, further simplification can be obtained by assuming circularly symmetric waveguide (such as ideal fiber). If this is the case refractive index that can be written as:

$$n(r) = n^2_{co}(1 - 2f(R)\Delta)$$

where $f(R) \geq 0$ is a small arbitrary profile variation.

For a circularly symmetric waveguide, we would have propagation constants $\beta_{lm}$ that are classified using azimuthal (l) and radial (m) numbers. Another classification uses effective indices $n_{lm}$ (sometimes noted as $n^{eff}_{lm}$ or simply $n_{eff}$, that are related to propagation constant as: $\beta_{lm} = k n^{eff}$). For the case of l=0, the solutions can be separated into two classes that have either transverse electric ($TE_{0m}$) or transverse magnetic ($TM_{0m}$) fields (called meridional modes). In the case of l≠0, both electric and magnetic field have z-component, and depending on which one is more dominant, so-called hybrid modes are denoted as: $HE_{lm}$ and $EH_{lm}$.

Polarization correction δβ has different values within the same group of modes with the same orbital number (l), even in the circularly symmetric fiber. This is an important observation that led to development of a special type of fiber.

In case of a step refractive index, solutions are the Bessel functions of the first kind, $J_l(r)$, in the core region, and modified Bessel functions of the second kind, $K_l(r)$, in the cladding region.

In the case of step-index fiber the groups of modes are almost degenerate, also meaning that the polarization correction δβ can be considered very small. Unlike $HE_{11}$ modes, higher order modes (HOMs) can have elaborate polarizations. In the case of circularly symmetric fiber, the odd and even modes (for example $HE^{odd}$ and $HE^{even}$ modes) are always degenerate (i.e. have equal $n_{eff}$), regardless of the index profile. These modes will be non-degenerate only in the case of circularly asymmetric index profiles.

Figure 42:
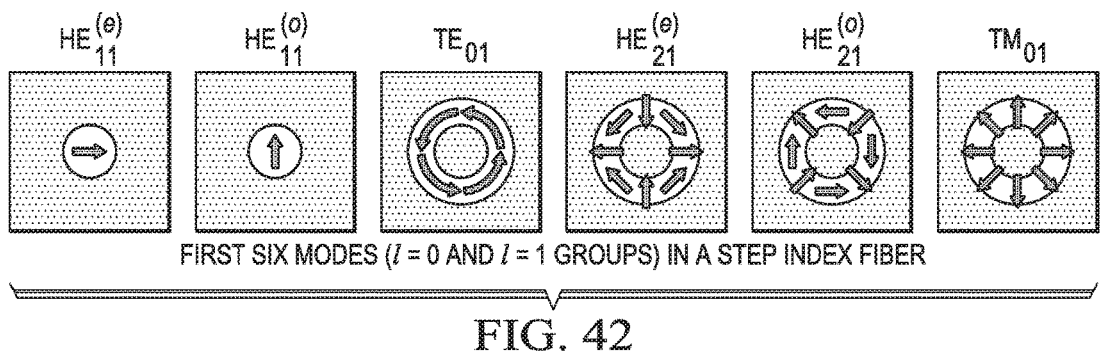
FIG. 42 illustrates the first six modes within a step index fiber.

Referring now to FIG. 42, there are illustrated the first six modes within a step indexed fiber for the groups L=0 and L=1.

When orbital angular momentums are applied to the light wavelength within an optical transmitter of an optical fiber communication system, the various orbital angular momentums applied to the light wavelength may transmit information and be determined within the fiber mode.

Angular momentum density (M) of light in a medium is defined as:

$$M = \frac{1}{c^2} r \times (E \times H) = r \times P = \frac{1}{c^2} r \times S$$

with r as position, E electric field, H magnetic field, P linear momentum density and S Poynting vector.

The total angular momentum (J), and angular momentum flux ($\Phi_M$) can be defined as:

$$J = \iiint M\, dV$$

$$\Phi = \iint M\, dA$$

In order to verify whether certain mode has an OAM let us look at the time averages of the angular momentum flux $\Phi_M$:

$$\langle \Phi_M \rangle = \iint \langle M \rangle\, dA$$

as well as the time average of the energy flux:

$$\langle \Phi_W \rangle = \iint \frac{\langle S_z \rangle}{c} dA$$

Because of the symmetry of radial and axial components about the fiber axis, we note that the integration in equation will leave only z-component of the angular momentum density non zero. Hence:

$$\langle M \rangle = \langle M \rangle_z = \frac{1}{c^2} r \times \langle E \times H \rangle_z$$

and knowing $\langle S \rangle = \text{Re}\{S\}$ and $S = \frac{1}{2} E \times H^*$ leads to:

$$S_\Phi = \frac{1}{2}(-E_r H_z^* + E_z H_r^*)$$

$$S_z = \frac{1}{2}(E_x H_y^* - E_y H_x^*)$$

Let us now focus on a specific linear combination of the $HE_{l+1,m}^{even}$ and $HE_{l+1,m}^{odd}$ modes with $\pi/2$ phase shift among them:

$$V_{lm}^+ = HE_{l+1,m}^{even} + iEH_{l+1,m}^{odd}$$

The idea for this linear combination comes from observing azimuthal dependence of the $HE_{l+1,m}^{even}$ and $HE_{l+1,m}^{odd}$ modes comprising $\cos(\varphi)$ and $\sin(\varphi)$. If we denote the electric field of $HE_{l+1,m}^{even}$ and $HE_{l+1,m}^{odd}$ modes as $e_1$ and $e_2$, respectively, and similarly, denote their magnetic fields as $h_1$ and $h_2$, the expression for this new mode can be written as:

$$e = e_1 + ie_2, \qquad (2.35)$$

$$h = h_1 + ih_2. \qquad (2.36)$$

then we derive:

$$e_r = e^{i(l+1)\varphi} F_l(R)$$

$$h_z = e^{i(l+1)\varphi} n_{co} \left(\frac{\epsilon_0}{\mu_0}\right)^{\frac{1}{2}} \frac{(2\Delta)^{\frac{1}{2}}}{V} G_l^-$$

$$e_z = i e^{i(l+1)\varphi} \frac{(2\Delta)^{\frac{1}{2}}}{V} G_l^-$$

$$h_r = -i e^{i(l+1)\varphi} n_{co} \left(\frac{\epsilon_0}{\mu_0}\right)^{\frac{1}{2}} F_l(R)$$

Where $F_l(R)$ is the Bessel function and $$G_l^\pm = \frac{dF_l}{dR} \pm \frac{l}{R} F_l$$

We note that all the quantities have $e^{i(l+1)\varphi}$ dependence that indicates these modes might have OAM, similarly to the free space case. Therefore the azimuthal and the longitudinal component of the Poynting vector are:

$$S_\varphi = -n_{co} \left(\frac{\epsilon_0}{\mu_0}\right)^{\frac{1}{2}} \frac{(2\Delta)^{\frac{1}{2}}}{V} \text{Re}\{F_l^* G_l^-\}$$

$$S_z = n_{co} \left(\frac{\epsilon_0}{\mu_0}\right)^{\frac{1}{2}} [F_l]^2$$

The ratio of the angular momentum flux to the energy flux therefore becomes:

$$\frac{\phi_M}{\phi_W} = \frac{l+1}{\omega}$$

We note that in the free-space case, this ratio is similar:

$$\frac{\phi_M}{\phi_W} = \frac{\sigma + 1}{\omega}$$

where $\sigma$ represents the polarization of the beam and is bounded to be $-1 < \sigma < 1$. In our case, it can be easily shown that SAM of the $V^+$ state, is 1, leading to important conclusion that the OAM of the $V^{+lm}$ state is 1. Hence, this shows that, in an ideal fiber, OAM mode exists.

Thus, since an orbital angular momentum mode may be detected within the ideal fiber, it is possible to encode information using this OAM mode in order to transmit different types of information having different orbital angular momentums within the same optical wavelength.

Figure 43:
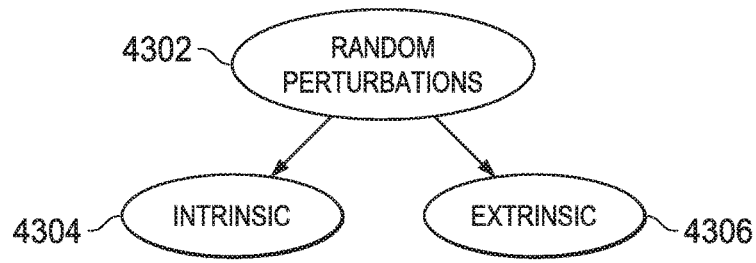
FIG. 43 illustrates the classes of random perturbations within a fiber.

The above description with respect to optical fiber assumed an ideal scenario of perfectly symmetrical fibers having no longitudinal changes within the fiber profile. Within real world fibers, random perturbations can induce coupling between spatial and/or polarization modes, causing propagating fields to evolve randomly through the fiber. The random perturbations can be divided into two classes, as illustrated in FIG. 43. Within the random perturbations 4302, the first class comprises extrinsic perturbations 4304. Extrinsic perturbations 4304 include static and dynamic fluctuations throughout the longitudinal direction of the fiber, such as the density and concentration fluctuations natural to random glassy polymer materials that are included within fibers. The second class includes extrinsic variations 4306 such as microscopic random bends caused by stress, diameter variations, and fiber core defects such as microvoids, cracks, or dust particles.

Mode coupling can be described by field coupling modes which account for complex valued modal electric field amplitudes, or by power coupling modes, which is a simplified description that accounts only for real value modal powers. Early multimode fiber systems used incoherent light emitting diode sources and power coupling models were widely used to describe several properties including steady state, modal power distributions, and fiber impulse responses. While recent multimode fiber systems use coherent sources, power coupling modes are still used to describe effects such as reduced differential group delays and plastic multimode fibers.

By contrast, single mode fiber systems have been using laser sources. The study of random birefringence and mode coupling in single mode fibers which leads to polarization mode dispersion (PMD), uses field coupling modes which predict the existence of principal states of polarization (PSPs). PSPs are polarization states shown to undergo minimal dispersion and are used for optical compensation of polarization mode dispersion in direct detection single mode fiber systems. In recent years, field coupling modes have been applied to multimode fibers, predicting principal mode which are the basis for optical compensation of modal dispersion in direct detection multimode fiber systems.

Mode coupling can be classified as weak or strong, depending on whether the total system length of the optical fiber is comparable to, or much longer than, a length scale over which propagating fields remain correlated. Depending on the detection format, communication systems can be divided into direct and coherent detection systems. In direct detection systems, mode coupling must either be avoided by careful design of fibers and modal D (multiplexers) and/or mitigated by adaptive optical signal processing. In systems using coherent detection, any linear cross talk between modes can be compensated by multiple input multiple output (MIMO) digital signal processing (DSP), as previously discussed, but DSP complexity increases with an increasing number of modes.

Figure 44:
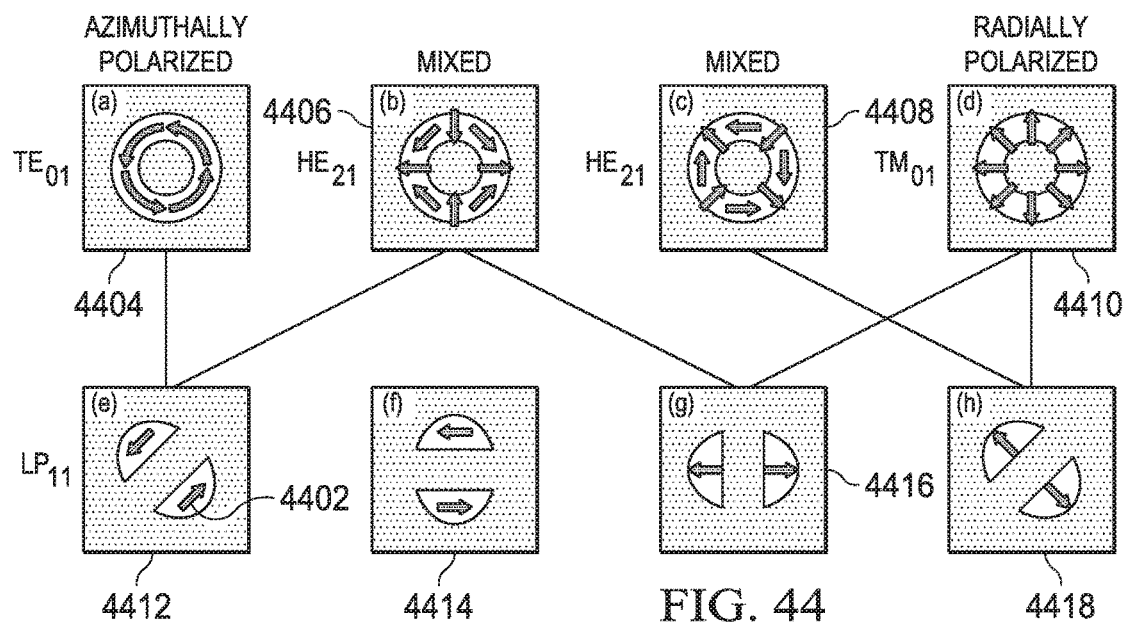
FIG. 44 illustrates the intensity patterns of first order groups within a vortex fiber.

Referring now to FIG. 44, there were illustrated the intensity patterns of the first order mode group within a vortex fiber. Arrows 4402 within the illustration show the polarization of the electric field within the fiber. The top row illustrates vector modes that are the exact vector solutions, and the bottom row shows the resultant, unstable LP11 modes commonly obtained at a fiber output. Specific linear combinations of pairs of top row modes resulting in the variety of LP11 modes obtained at the fiber output. Coupled mode 4402 is provided by the coupled pair of mode 4404 and 4406. Coupled mode 4404 is provided by the coupled pair of mode 4404 and mode 4408. Coupled mode 4416 is provided by the coupled pair of mode 4406 and mode 4410, and coupled mode 4418 is provided by the coupled pair of mode 4408 and mode 4410.

Typically, index separation of two polarizations and single mode fibers is on the order of 10-7. While this small separation lowers the PMD of the fiber, external perturbations can easily couple one mode into another, and indeed in a single mode fiber, arbitrary polarizations are typically observed at the output. Simple fiber polarization controller that uses stress induced birefringence can be used to achieve any desired polarization at the output of the fiber.

By the origin, mode coupling can be classified as distributed (caused by random perturbations in fibers), or discrete (caused at the modal couplers and the multiplexers). Most importantly, it has been shown that small, effective index separation among higher order modes is the main reason for mode coupling and mode instabilities. In particular, the distributed mode coupling has been shown to be inversely proportional to A-P with P greater than 4, depending on coupling conditions. Modes within one group are degenerate. For this reason, in most multimode fiber modes that are observed in the fiber output are in fact the linear combinations of vector modes and are linearly polarized states. Hence, optical angular momentum modes that are the linear combination of the HE even, odd modes cannot coexist in these fibers due to coupling to degenerate TE01 and TM01 states.

Thus, the combination of the various OAM modes is not likely to generate modal coupling within the optical systems and by increasing the number of OAM modes, the reduction in mode coupling is further benefited.

Figure 45A:
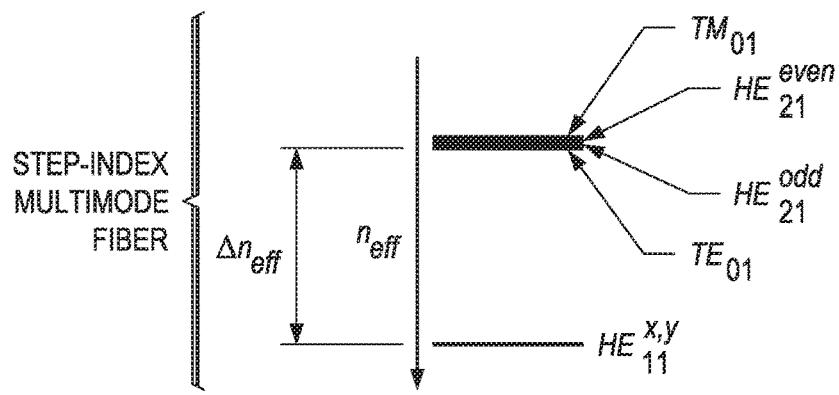
FIGS. 45A and 45B illustrate index separation in first order modes of a multi-mode fiber.
Figure 45B:
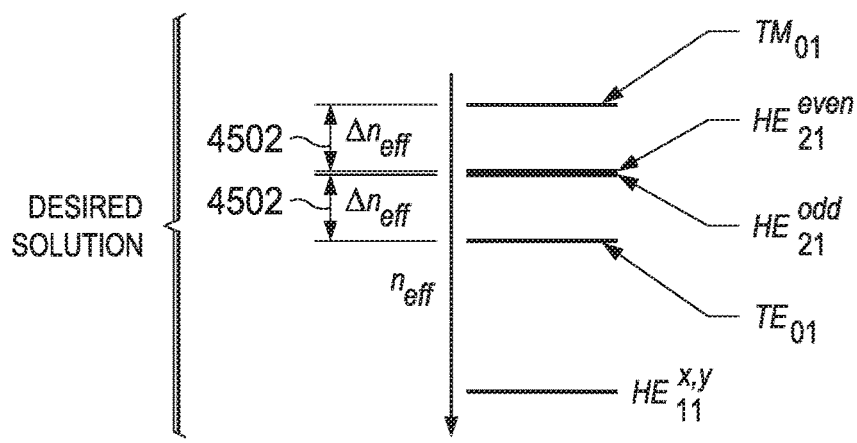

Referring now to FIGS. 45A and 45B, there is illustrated the benefit of effective index separation in first order modes. FIG. 45A illustrates a typical step index multimode fiber that does not exhibit effective index separation causing mode coupling. The mode $TM_{01}$ $HE^{even}_{21}$, mode $HE^{odd}_{21}$, and mode $TE_{01}$ have little effective index separation, and these modes would be coupled together. Mode $HE^{x,1}_{11}$ has an effective index separation such that this mode is not coupled with these other modes.

This can be compared with the same modes in FIG. 45B. In this case, there is an effective separation 4502 between the $TM_{01}$ mode and the $HE^{even}_{21}$ mode and the $TE_{01}$ mode and the $HE^{odd}_{21}$ mode. This effective separation causes no mode coupling between these mode levels in a similar manner that was done in the same modes in FIG. 45A.

In addition to effective index separation, mode coupling also depends on the strength of perturbation. An increase in the cladding diameter of an optical fiber can reduce the bend induced perturbations in the fiber. Special fiber design that includes the trench region can achieve so-called bend insensitivity, which is predominant in fiber to the home. Fiber design that demonstrates reduced bends and sensitivity of higher order Bessel modes for high power lasers have been demonstrated. Most important, a special fiber design can remove the degeneracy of the first order mode, thus reducing the mode coupling and enabling the OAM modes to propagate within these fibers.

Topological charge may be multiplexed to the wave length for either linear or circular polarization. In the case of linear polarizations, topological charge would be multiplexed on vertical and horizontal polarization. In case of circular polarization, topological charge would be multiplexed on left hand and right hand circular polarization.

The topological charges can be created using Spiral Phase Plates (SPPs) such as that illustrated in FIG. 11E, phase mask holograms or a Spatial Light Modulator (SLM) by adjusting the voltages on SLM which creates properly varying index of refraction resulting in twisting of the beam with a specific topological charge. Different topological charges can be created and muxed together and de-muxed to separate charges.

As Spiral Phase plates can transform a plane wave (l=0) to a twisted wave of a specific helicity (i.e. l=+1), Quarter Wave Plates (QWP) can transform a linear polarization (s=0) to circular polarization (i.e. s=+1).

Cross talk and multipath interference can be reduced using Multiple-Input-Multiple-Output (MIMO).

Most of the channel impairments can be detected using a control or pilot channel and be corrected using algorithmic techniques (closed loop control system).

Free Space Communications

Figure 46:
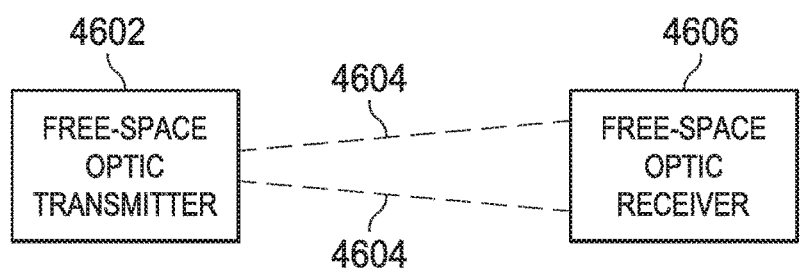
FIG. 46 illustrates a free-space communication system.

An additional configuration in which the optical angular momentum processing and multi-layer overlay modulation technique described herein above may prove useful within the optical network framework is use with free-space optics communications. Free-space optics systems provide a number of advantages over traditional UHF RF based systems from improved isolation between the systems, the size and the cost of the receivers/transmitters, lack of RF licensing laws, and by combining space, lighting, and communication into the same system. Referring now to FIG. 46, there is illustrated an example of the operation of a free-space communication system. The free-space communication system utilizes a free-space optics transmitter 4602 that transmits a light beam 4604 to a free-space optics receiver 4606. The major difference between a fiber-optic network and a free-space optic network is that the information beam is transmitted through free space rather than over a fiber-optic cable. This causes a number of link difficulties, which will be more fully discussed herein below. Free-space optics is a line of sight technology that uses the invisible beams of light to provide optical bandwidth connections that can send and receive up to 2.5 Gbps of data, voice, and video communications between a transmitter 4602 and a receiver 4606. Free-space optics uses the same concepts as fiber-optics, except without the use of a fiber-optic cable. Free-space optics systems provide the light beam 4604 within the infrared (IR) spectrum, which is at the low end of the light spectrum. Specifically, the optical signal is in the range of 300 Gigahertz to 1 Terahertz in terms of wavelength.

Presently existing free-space optics systems can provide data rates of up to 10 Gigabits per second at a distance of up to 2.5 kilometers. In outer space, the communications range of free space optical communications is currently on the order of several thousand kilometers, but has the potential to bridge interplanetary distances of millions of kilometers, using optical telescopes as beam expanders. In January of 2013, NASA used lasers to beam an image of the Mona Lisa to the Lunar Reconnaissance Orbiter roughly 240,000 miles away. To compensate for atmospheric interference, an error correction code algorithm, similar to that used within compact discs, was implemented.

The distance records for optical communications involve detection and emission of laser light by space probes. A two-way distance record for communication was established by the Mercury Laser Altimeter instrument aboard the MESSENGER spacecraft. This infrared diode neodymium laser, designed as a laser altimeter for a Mercury Orbiter mission, was able to communicate across a distance of roughly 15,000,000 miles (24,000,000 kilometers) as the craft neared Earth on a fly by in May of 2005. The previous record had been set with a one-way detection of laser light from Earth by the Galileo Probe as two ground based lasers were seen from 6,000,000 kilometers by the outbound probe in 1992. Researchers used a white LED based space lighting system for indoor local area network communications.

Figure 47:
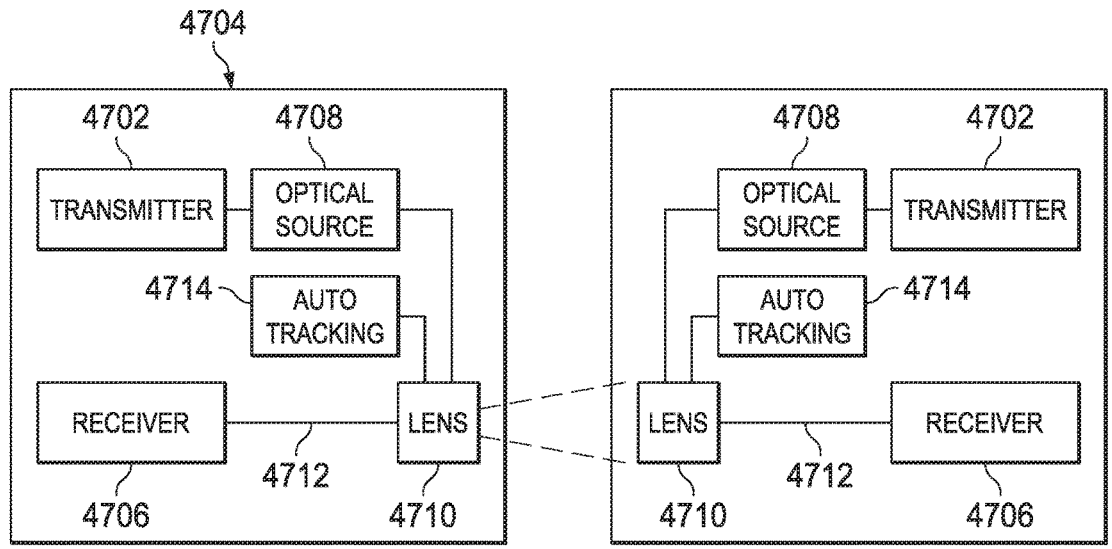
FIG. 47 illustrates a block diagram of a free-space optics system using orbital angular momentum and multi-level overlay modulation.

Referring now to FIG. 47, there is illustrated a block diagram of a free-space optics system using orbital angular momentum and multilevel overlay modulation according to the present disclosure. The OAM twisted signals, in addition to being transmitted over fiber, may also be transmitted using free optics. In this case, the transmission signals are generated within transmission circuitry 4702 at each of the FSO transceivers 4704. Free-space optics technology is based on the connectivity between the FSO based optical wireless units, each consisting of an optical transceiver 4704 with a transmitter 4702 and a receiver 4706 to provide full duplex open pair and bidirectional closed pairing capability. Each optical wireless transceiver unit 4704 additionally includes an optical source 4708 plus a lens or telescope 4710 for transmitting light through the atmosphere to another lens 4710 receiving the information. At this point, the receiving lens or telescope 4710 connects to a high sensitivity receiver 4706 via optical fiber 4712. The transmitting transceiver 4704a and the receiving transceiver 4704b have to have line of sight to each other. Trees, buildings, animals, and atmospheric conditions all can hinder the line of sight needed for this communications medium. Since line of sight is so critical, some systems make use of beam divergence or a diffused beam approach, which involves a large field of view that tolerates substantial line of sight interference without significant impact on overall signal quality. The system may also be equipped with auto tracking mechanism 4714 that maintains a tightly focused beam on the receiving transceiver 3404b, even when the transceivers are mounted on tall buildings or other structures that sway.

The modulated light source used with optical source 4708 is typically a laser or light emitting diode (LED) providing the transmitted optical signal that determines all the transmitter capabilities of the system. Only the detector sensitivity within the receiver 4706 plays an equally important role in total system performance. For telecommunications purposes, only lasers that are capable of being modulated at 20 Megabits per second to 2.5 Gigabits per second can meet current marketplace demands. Additionally, how the device is modulated and how much modulated power is produced are both important to the selection of the device. Lasers in the 780-850 nm and 1520-1600 nm spectral bands meet frequency requirements.

Commercially available FSO systems operate in the near IR wavelength range between 750 and 1600 nm, with one or two systems being developed to operate at the IR wavelength of 10,000 nm. The physics and transmissions properties of optical energy as it travels through the atmosphere are similar throughout the visible and near IR wavelength range, but several factors that influence which wavelengths are chosen for a particular system.

The atmosphere is considered to be highly transparent in the visible and near IR wavelength. However, certain wavelengths or wavelength bands can experience severe absorption. In the near IR wavelength, absorption occurs primarily in response to water particles (i.e., moisture) which are an inherent part of the atmosphere, even under clear weather conditions. There are several transmission windows that are nearly transparent (i.e., have an attenuation of less than 0.2 dB per kilometer) within the 700-10,000 nm wavelength range. These wavelengths are located around specific center wavelengths, with the majority of free-space optics systems designed to operate in the windows of 780-850 nm and 1520-1600 nm.

Wavelengths in the 780-850 nm range are suitable for free-space optics operation and higher power laser sources may operate in this range. At 780 nm, inexpensive CD lasers may be used, but the average lifespan of these lasers can be an issue. These issues may be addressed by running the lasers at a fraction of their maximum rated output power which will greatly increase their lifespan. At around 850 nm, the optical source 4708 may comprise an inexpensive, high performance transmitter and detector components that are readily available and commonly used in network transmission equipment. Highly sensitive silicon (SI) avalanche photodiodes (APD) detector technology and advanced vertical cavity emitting laser may be utilized within the optical source 4708.

VCSEL technology may be used for operation in the 780 to 850 nm range. Possible disadvantage of this technology include beam detection through the use of a night vision scope, although it is still not possible to demodulate a perceived light beam using this technique.

Wavelengths in the 1520-1600 nm range are well-suited for free-space transmission, and high quality transmitter and detector components are readily available for use within the optical source block 4708. The combination of low attenuation and high component availability within this wavelength range makes the development of wavelength division multiplexing (WDM) free-space optics systems feasible. However, components are generally more expensive and detectors are typically less sensitive and have a smaller receive surface area when compared with silicon avalanche photodiode detectors that operator at the 850 nm wavelength. These wavelengths are compatible with erbium-doped fiber amplifier technology, which is important for high power (greater than 500 milliwatt) and high data rate (greater than 2.5 Gigabytes per second) systems. Fifty to 65 times as much power can be transmitted at the 1520-1600 nm wavelength than can be transmitted at the 780-850 nm wavelength for the same eye safety classification. Disadvantages of these wavelengths include the inability to detect a beam with a night vision scope. The night vision scope is one technique that may be used for aligning the beam through the alignment circuitry 4714. Class 1 lasers are safe under reasonably foreseeable operating conditions including the use of optical instruments for intrabeam viewing. Class 1 systems can be installed at any location without restriction.

Another potential optical source 4708 comprised Class 1M lasers. Class 1M laser systems operate in the wavelength range from 302.5 to 4000 nm, which is safe under reasonably foreseeable conditions, but may be hazardous if the user employs optical instruments within some portion of the beam path. As a result, Class 1M systems should only be installed in locations where the unsafe use of optical aids can be prevented. Examples of various characteristics of both Class 1 and Class 1M lasers that may be used for the optical source 4708 are illustrated in Table G below.

TABLE G

| Laser Classification | Power (mW) | Aperture Size (mm) | Distance (m) | Power Density (mW/cm$^2$) |
|---|---|---|---|---|
| 850-nm Wavelength | | | | |
| Class 1 | 0.78 | 7 | 14 | 2.03 |
|  |  | 50 | 2000 | 0.04 |
| Class 1M | 0.78 | 7 | 100 | 2.03 |
|  | 500 | 7 | 14 | 1299.88 |
|  |  | 50 | 2000 | 25.48 |
| 1550-nm Wavelength | | | | |
| Class 1 | 10 | 7 | 14 | 26.00 |
|  |  | 25 | 2000 | 2.04 |
| Class 1M | 10 | 3.5 | 100 | 103.99 |
|  | 500 | 7 | 14 | 1299.88 |
|  |  | 25 | 2000 | 101.91 |

The 10,000 nm wavelength is relatively new to the commercial free space optic arena and is being developed because of better fog transmission capabilities. There is presently considerable debate regarding these characteristics because they are heavily dependent upon fog type and duration. Few components are available at the 10,000 nm wavelength, as it is normally not used within telecommunications equipment. Additionally, 10,000 nm energy does not penetrate glass, so it is ill-suited to behind window deployment.

Within these wavelength windows, FSO systems should have the following characteristics. The system should have the ability to operate at higher power levels, which is important for longer distance FSO system transmissions. The system should have the ability to provide high speed modulation, which is important for high speed FSO systems. The system should provide a small footprint and low power consumption, which is important for overall system design and maintenance. The system should have the ability to operate over a wide temperature range without major performance degradations such that the systems may prove useful for outdoor systems. Additionally, the mean time between failures should exceed 10 years. Presently existing FSO systems generally use VCSELS for operation in the shorter IR wavelength range, and Fabry-Pérot or distributed feedback lasers for operation in the longer IR wavelength range. Several other laser types are suitable for high performance FSO systems.

A free-space optics system using orbital angular momentum processing and multi-layer overlay modulation would provide a number of advantages. The system would be very convenient. Free-space optics provides a wireless solution to a last-mile connection, or a connection between two buildings. There is no necessity to dig or bury fiber cable. Free-space optics also requires no RF license. The system is upgradable and its open interfaces support equipment from a variety of vendors. The system can be deployed behind windows, eliminating the need for costly rooftop right. It is also immune to radiofrequency interference or saturation. The system is also fairly speedy. The system provides 2.5 Gigabits per second of data throughput. This provides ample bandwidth to transfer files between two sites. With the growth in the size of files, free-space optics provides the necessary bandwidth to transfer these files efficiently.

Free-space optics also provides a secure wireless solution. The laser beam cannot be detected with a spectral analyzer or RF meter. The beam is invisible, which makes it difficult to find. The laser beam that is used to transmit and receive the data is very narrow. This means that it is almost impossible to intercept the data being transmitted. One would have to be within the line of sight between the receiver and the transmitter in order to be able to accomplish this feat. If this occurs, this would alert the receiving site that a connection has been lost. Thus, minimal security upgrades would be required for a free-space optics system.

However, there are several weaknesses with free-space optics systems. The distance of a free-space optics system is very limited. Currently operating distances are approximately within 2 kilometers. Although this is a powerful system with great throughput, the limitation of distance is a big deterrent for full-scale implementation. Additionally, all systems require line of sight be maintained at all times during transmission. Any obstacle, be it environmental or animals can hinder the transmission. Free-space optic technology must be designed to combat changes in the atmosphere which can affect free-space optic system performance capacity.

Something that may affect a free-space optics system is fog. Dense fog is a primary challenge to the operation of free-space optics systems. Rain and snow have little effect on free-space optics technology, but fog is different. Fog is a vapor composed of water droplets which are only a few hundred microns in diameter, but can modify light characteristics or completely hinder the passage of light through a combination of absorption, scattering, and reflection. The primary answer to counter fog when deploying free-space optic based wireless products is through a network design that shortens FSO linked distances and adds network redundancies.

Absorption is another problem. Absorption occurs when suspended water molecules in the terrestrial atmosphere extinguish photons. This causes a decrease in the power density (attenuation) of the free space optics beam and directly affects the availability of the system. Absorption occurs more readily at some wavelengths than others. However, the use of appropriate power based on atmospheric conditions and the use of spatial diversity (multiple beams within an FSO based unit), helps maintain the required level of network availability.

Solar interference is also a problem. Free-space optics systems use a high sensitivity receiver in combination with a larger aperture lens. As a result, natural background light can potentially interfere with free-space optics signal reception. This is especially the case with the high levels of background radiation associated with intense sunlight. In some instances, direct sunlight may case link outages for periods of several minutes when the sun is within the receiver's field of vision. However, the times when the receiver is most susceptible to the effects of direct solar illumination can be easily predicted. When direct exposure of the equipment cannot be avoided, the narrowing of receiver field of vision and/or using narrow bandwidth light filters can improve system performance. Interference caused by sunlight reflecting off of a glass surface is also possible.

Scattering issues may also affect connection availability. Scattering is caused when the wavelength collides with the scatterer. The physical size of the scatterer determines the type of scattering. When the scatterer is smaller than the wavelength, this is known as Rayleigh scattering. When a scatterer is of comparable size to the wavelengths, this is known as Mie scattering. When the scattering is much larger than the wavelength, this is known as non-selective scattering. In scattering, unlike absorption, there is no loss of energy, only a directional redistribution of energy that may have significant reduction in beam intensity over longer distances.

Physical obstructions such as flying birds or construction cranes can also temporarily block a single beam free space optics system, but this tends to cause only short interruptions. Transmissions are easily and automatically resumed when the obstacle moves. Optical wireless products use multibeams (spatial diversity) to address temporary abstractions as well as other atmospheric conditions, to provide for greater availability.

The movement of buildings can upset receiver and transmitter alignment. Free-space optics based optical wireless offerings use divergent beams to maintain connectivity. When combined with tracking mechanisms, multiple beam FSO based systems provide even greater performance and enhanced installation simplicity.

Scintillation is caused by heated air rising from the Earth or man-made devices such as heating ducts that create temperature variations among different pockets of air. This can cause fluctuations in signal amplitude, which leads to "image dancing" at the free-space optics based receiver end. The effects of this scintillation are called "refractive turbulence." This causes primarily two effects on the optical beams. Beam wander is caused by the turbulent eddies that are no larger than the beam. Beam spreading is the spread of an optical beam as it propagates through the atmosphere.

Referring now to FIGS. 48A through 48D, in order to achieve higher data capacity within optical links, an additional degree of freedom from multiplexing multiple data channels must be exploited. Moreover, the ability to use two different orthogonal multiplexing techniques together has the potential to dramatically enhance system performance and increased bandwidth.

Figure 48A:
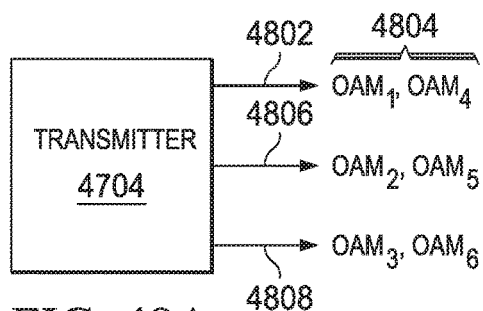
FIGS. 48A-48C illustrate the manner for multiplexing multiple data channels into optical links to achieve higher data capacity.
Figure 48B:
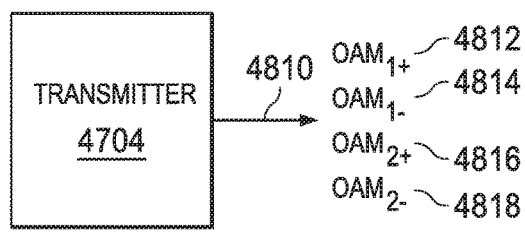

One multiplexing technique which may exploit the possibilities is mode division multiplexing (MDM) using orbital angular momentum (OAM). OAM mode refers to laser beams within a free-space optical system or fiber-optic system that have a phase term of $e^{il\varphi}$ in their wave fronts, in which $\varphi$ is the azimuth angle and l determines the OAM value (topological charge). In general, OAM modes have a "donut-like" ring shaped intensity distribution. Multiple spatial collocated laser beams, which carry different OAM values, are orthogonal to each other and can be used to transmit multiple independent data channels on the same wavelength. Consequently, the system capacity and spectral efficiency in terms of bits/S/Hz can be dramatically increased. Free-space communications links using OAM may support 100 Tbits/capacity. Various techniques for implementing this as illustrated in FIGS. 48A through 48D include a combination of multiple beams 4802 having multiple different OAM values 4804 on each wavelength. Thus, beam 4802 includes OAM values, OAM1 and OAM4. Beam 4806 includes OAM value 2 and OAM value 5. Finally, beam 4808 includes OAM3 value and OAM6 value. Referring now to FIG. 48B, there is illustrated a single beam wavelength 4810 using a first group of OAM values 4812 having both a positive OAM value 4812 and a negative OAM value 4814. Similarly, OAM2 value may have a positive value 4816 and a negative value 4818 on the same wavelength 4810.

Figure 48C:
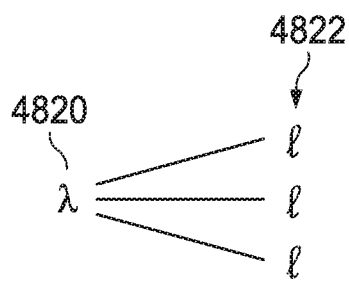
Figure 48D:
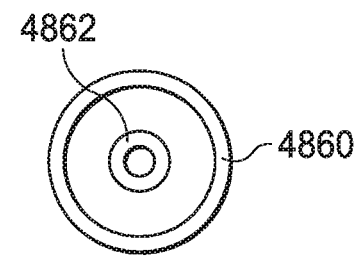
FIG. 48D illustrates groups of concentric rings for a wavelength having multiple OAM valves.

FIG. 48C illustrates the use of a wavelength 4820 having polarization multiplexing of OAM value. The wavelength 4820 can have multiple OAM values 4822 multiplexed thereon. The number of available channels can be further increased by applying left or right handed polarization to the OAM values. Finally, FIG. 48D illustrates two groups of concentric rings 4860, 4862 for a wavelength having multiple OAM values.

Figure 49:
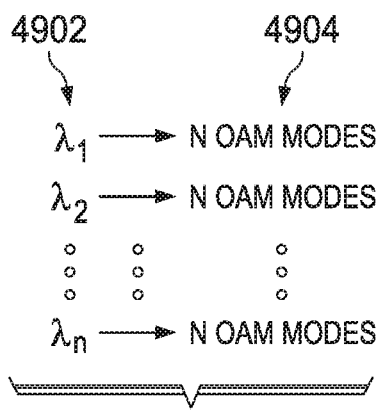
FIG. 49 illustrates a WDM channel containing many orthogonal OAM beams.

Wavelength distribution multiplexing (WDM) has been widely used to improve the optical communication capacity within both fiber-optic systems and free-space communication system. OAM mode multiplexing and WDM are mutually orthogonal such that they can be combined to achieve a dramatic increase in system capacity. Referring now to FIG. 49, there is illustrated a scenario where each WDM channel 4902 contains many orthogonal OAM beam 4904. Thus, using a combination of orbital angular momentum with wave division multiplexing, a significant enhancement in communication link to capacity may be achieved.

Current optical communication architectures have considerable routing challenges. A routing protocol for use with free-space optic system must take into account the line of sight requirements for optical communications within a free-space optics system. Thus, a free-space optics network must be modeled as a directed hierarchical random sector geometric graph in which sensors route their data via multi-hop paths to a base station through a cluster head. This is a new efficient routing algorithm for local neighborhood discovery and a base station uplink and downlink discovery algorithm. The routing protocol requires order O log(n) storage at each node versus order O(n) used within current techniques and architectures.

Current routing protocols are based on link state, distance vectors, path vectors, or source routing, and they differ from the new routing technique in significant manners. First, current techniques assume that a fraction of the links are bidirectional. This is not true within a free-space optic network in which all links are unidirectional. Second, many current protocols are designed for ad hoc networks in which the routing protocol is designed to support multi-hop communications between any pair of nodes. The goal of the sensor network is to route sensor readings to the base station. Therefore, the dominant traffic patterns are different from those in an ad hoc network. In a sensor network, node to base stations, base station to nodes, and local neighborhood communication are mostly used.

Figure 50:
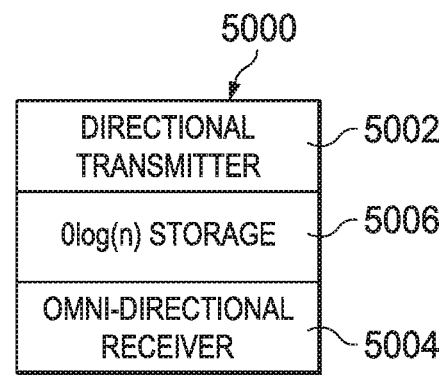
FIG. 50 illustrates a node of a free-space optical system.

Recent studies have considered the effect of unidirectional links and report that as many as 5 percent to 10 percent of links and wireless ad hoc networks are unidirectional due to various factors. Routing protocols such as DSDV and AODV use a reverse path technique, implicitly ignoring such unidirectional links and are therefore not relevant in this scenario. Other protocols such as DSR, ZRP, or ZRL have been designed or modified to accommodate unidirectionality by detecting unidirectional links and then providing bidirectional abstraction for such links. Referring now to FIG. 50, the simplest and most efficient solution for dealing with unidirectionality is tunneling, in which bidirectionality is emulated for a unidirectional link by using bidirectional links on a reverse back channel to establish the tunnel. Tunneling also prevents implosion of acknowledgement packets and looping by simply pressing link layer acknowledgements for tunneled packets received on a unidirectional link. Tunneling, however, works well in mostly bidirectional networks with few unidirectional links.

Figure 51:
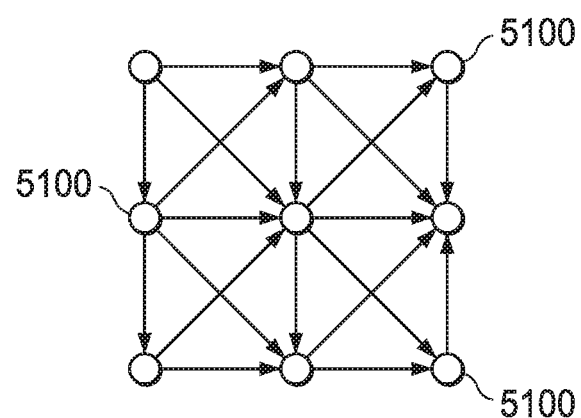
FIG. 51 illustrates a network of nodes within a free-space optical system.

Within a network using only unidirectional links such as a free-space optical network, systems such as that illustrated in FIGS. 50 and 51 would be more applicable. Nodes within a unidirectional network utilize a directional transmit 5002 transmitting from the node 5000 in a single, defined direction. Additionally, each node 5000 includes an omnidirectional receiver 5004 which can receive a signal coming to the node in any direction. Also, as discussed here and above, the node 5000 would also include a 0 log(n) storage 5006. Thus, each node 5000 provide only unidirectional communications links. Thus, a series of nodes 5000 as illustrated in FIG. 51 may unidirectionally communicate with any other node 5000 and forward communication from one desk location to another through a sequence of interconnected nodes.

Topological charge may be multiplexed to the wave length for either linear or circular polarization. In the case of linear polarizations, topological charge would be multiplexed on vertical and horizontal polarization. In case of circular polarization, topological charge would be multiplexed on left hand and right hand circular polarizations.

The topological charges can be created using Spiral Phase Plates (SPPs) such as that illustrated in FIG. 11E, phase mask holograms or a Spatial Light Modulator (SLM) by adjusting the voltages on SLM which creates properly varying index of refraction resulting in twisting of the beam with a specific topological charge. Different topological charges can be created and muxed together and de-muxed to separate charges.

As Spiral Phase plates can transform a plane wave (l=0) to a twisted wave of a specific helicity (i.e. l=+1), Quarter Wave Plates (QWP) can transform a linear polarization (s=0) to circular polarization (i.e. s=+1).

Cross talk and multipath interference can be reduced using Multiple-Input-Multiple-Output (MIMO).

Most of the channel impairments can be detected using a control or pilot channel and be corrected using algorithmic techniques (closed loop control system).

Multiplexing of the topological charge to the RF as well as free space optics in real time provides redundancy and better capacity. When channel impairments from atmospheric disturbances or scintillation impact the information signals, it is possible to toggle between free space optics to RF and back in real time. This approach still uses twisted waves on both the free space optics as well as the RF signal. Most of the channel impairments can be detected using a control or pilot channel and be corrected using algorithmic techniques (closed loop control system) or by toggling between the RF and free space optics.

Figure 52:
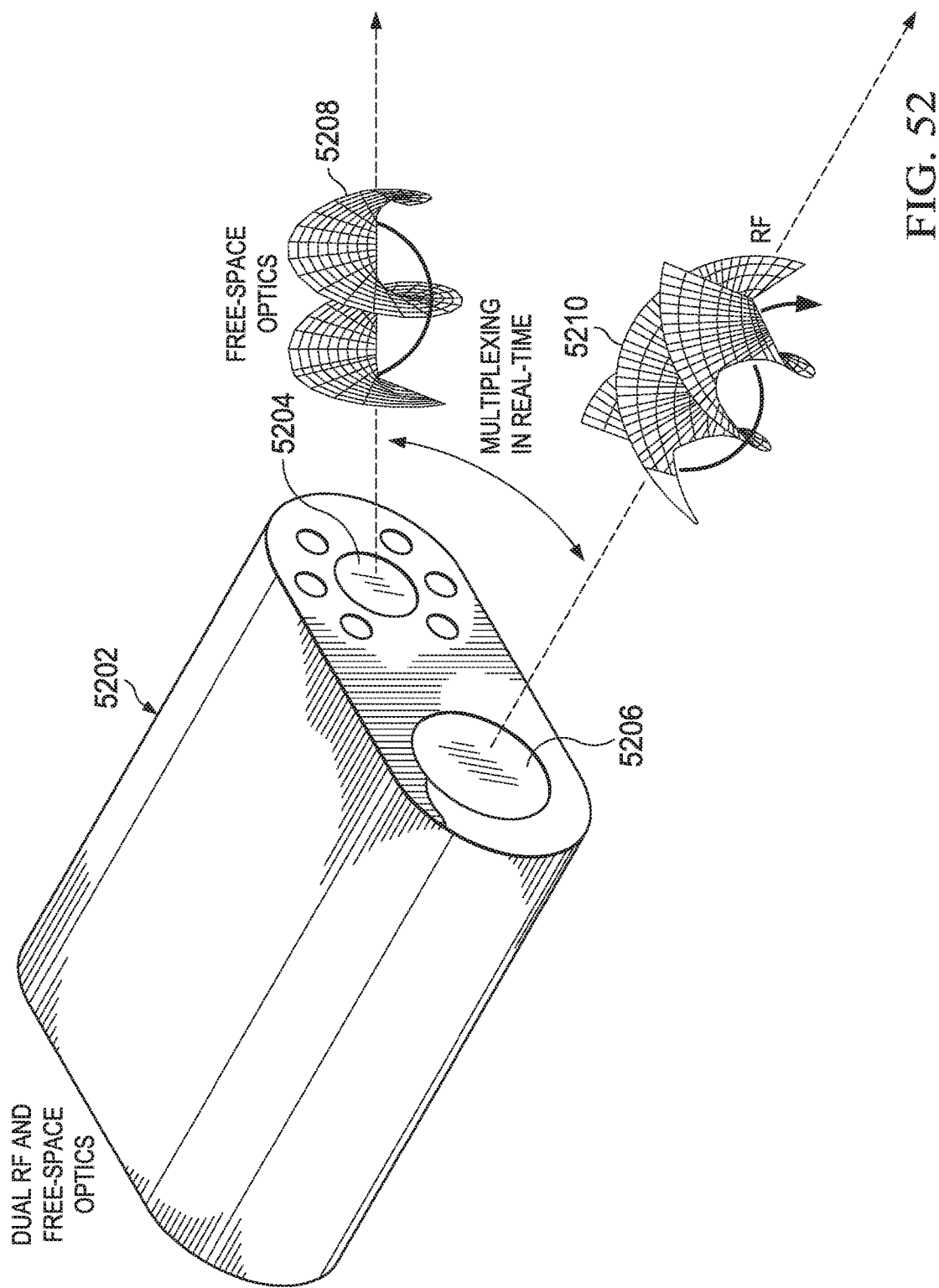
FIG. 52 illustrates a system for multiplexing between a free space signal and an RF signal.

In a further embodiment illustrated in FIG. 52, both RF signals and free space optics may be implemented within a dual RF and free space optics mechanism 5202. The dual RF and free space optics mechanism 5202 include a free space optics projection portion 5204 that transmits a light wave having an orbital angular momentum applied thereto with multilevel overlay modulation and a RF portion 5206 including circuitry necessary for transmitting information with orbital angular momentum and multilayer overlay on an RF signal 5210. The dual RF and free space optics mechanism 5202 may be multiplexed in real time between the free space optics signal 5208 and the RF signal 5210 depending upon operating conditions. In some situations, the free space optics signal 5208 would be most appropriate for transmitting the data. In other situations, the free space optics signal 5208 would not be available and the RF signal 5210 would be most appropriate for transmitting data. The dual RF and free space optics mechanism 5202 may multiplex in real time between these two signals based upon the available operating conditions.

Multiplexing of the topological charge to the RF as well as free space optics in real time provides redundancy and better capacity. When channel impairments from atmospheric disturbances or scintillation impact the information signals, it is possible to toggle between free space optics to RF and back in real time. This approach still uses twisted waves on both the free space optics as well as the RF signal. Most of the channel impairments can be detected using a control or pilot channel and be corrected using algorithmic techniques (closed loop control system) or by toggling between the RF and free space optics.

Quantum Key Distribution

Figure 53:
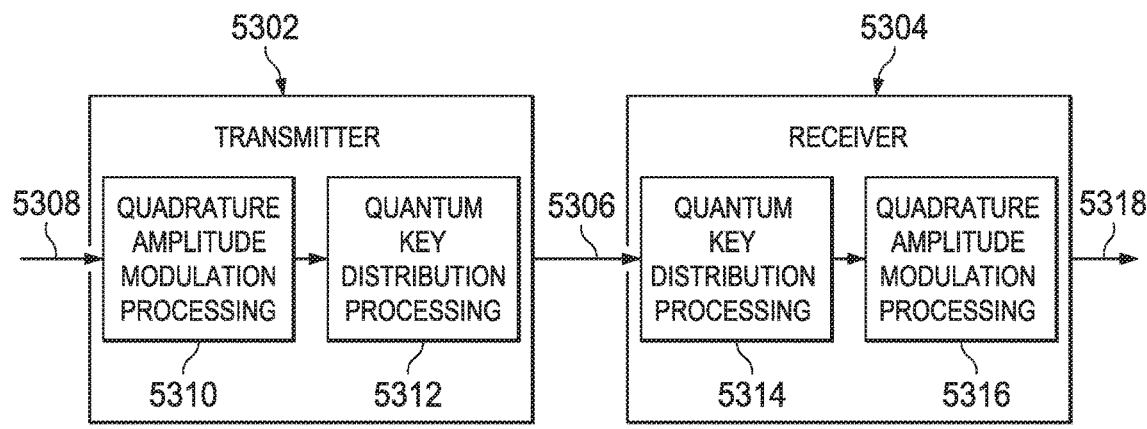
FIG. 53 illustrates a block diagram of an OAM processing system utilizing quantum key distribution.

Referring now to FIG. 53, there is illustrated a further improvement of a system utilizing orbital angular momentum processing. In the illustration of FIG. 53, a transmitter 5302 and receiver 5304 are interconnected over an optical link 5306. The optical link 5306 may comprise a fiber-optic link or a free-space optic link as described herein above. The transmitter receives a data stream 5308 that is processed via orbital angular momentum processing circuitry 5310. The orbital angular momentum processing circuitry 5310 provide orbital angular momentum twist to various signals on separate channels as described herein above. In some embodiments, the orbital angular momentum processing circuitry may further provide multi-layer overlay modulation to the signal channels in order to further increase system bandwidth.

The OAM processed signals are provided to quantum key distribution processing circuitry 5312. The quantum key distribution processing circuitry 5312 utilizes the principals of quantum key distribution as will be more fully described herein below to enable encryption of the signal being transmitted over the optical link 5306 to the receiver 5304. The received signals are processed within the receiver 5304 using the quantum key distribution processing circuitry 5314. The quantum key distribution processing circuitry 5314 decrypts the received signals using the quantum key distribution processing as will be more fully described herein below. The decrypted signals are provided to orbital angular momentum processing circuitry 5316 which removes any orbital angular momentum twist from the signals to generate the plurality of output signals 5318. As mentioned previously, the orbital angular momentum processing circuitry 5316 may also demodulate the signals using multilayer overlay modulation included within the received signals.

Orbital angular momentum in combination with optical polarization is exploited within the circuit of FIG. 53 in order to encode information in rotation invariant photonic states, so as to guarantee full independence of the communication from the local reference frames of the transmitting unit 5302 and the receiving unit 5304. There are various ways to implement quantum key distribution (QKD), a protocol that exploits the features of quantum mechanics to guarantee unconditional security in cryptographic communications with error rate performances that are fully compatible with real world application environments.

Encrypted communication requires the exchange of keys in a protected manner. This key exchanged is often done through a trusted authority. Quantum key distribution is an alternative solution to the key establishment problem. In contrast to, for example, public key cryptography, quantum key distribution has been proven to be unconditionally secure, i.e., secure against any attack, even in the future, irrespective of the computing power or in any other resources that may be used. Quantum key distribution security relies on the laws of quantum mechanics, and more specifically on the fact that it is impossible to gain information about non-orthogonal quantum states without perturbing these states. This property can be used to establish random keys between a transmitter and receiver, and guarantee that the key is perfectly secret from any third party eavesdropping on the line.

Figure 54:
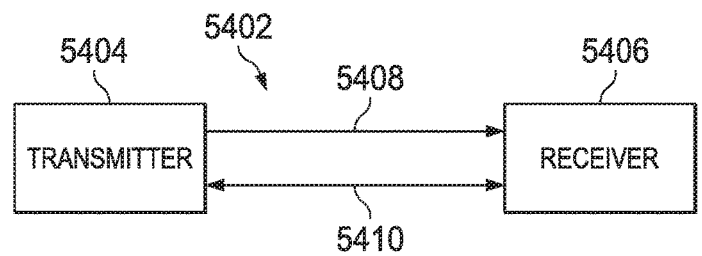
FIG. 54 illustrates a basic quantum key distribution system.

In parallel to the "full quantum proofs" mentioned above, the security of QKD systems has been put on stable information theoretic footing, thanks to the work on secret key agreements done in the framework of information theoretic cryptography and to its extensions, triggered by the new possibilities offered by quantum information. Referring now to FIG. 54, within a basic QKD system, a QKD link 5402 is a point to point connection between a transmitter 5404 and a receiver 5406 that want to share secret keys. The QKD link 5402 is constituted by the combination of a quantum channel 5408 and a classic channel 5410. The transmitter 5404 generates a random stream of classical bits and encodes them into a sequence of non-orthogonal states of light that are transmitted over the quantum channel 5408. Upon reception of these quantum states, the receiver 5406 performs some appropriate measurements leading the receiver to share some classical data over the classical link 5410 correlated with the transmitter bit stream. The classical channel 5410 is used to test these correlations.

If the correlations are high enough, this statistically implies that no significant eavesdropping has occurred on the quantum channel 5408 and thus, that has a very high probability, a perfectly secure, symmetric key can be distilled from the correlated data shared by the transmitter 5404 and the receiver 5406. In the opposite case, the key generation process has to be aborted and started again. The quantum key distribution is a symmetric key distribution technique. Quantum key distribution requires, for authentication purposes, that the transmitter 5404 and receiver 5406 share in advance a short key whose length scales only logarithmically in the length of the secret key generated by an OKD session.

Quantum key distribution on a regional scale has already been demonstrated in a number of countries. However, free-space optical links are required for long distance communication among areas which are not suitable for fiber installation or for moving terminals, including the important case of satellite based links. The present approach exploits spatial transverse modes of the optical beam, in particular of the OAM degree of freedom, in order to acquire a significant technical advantage that is the insensitivity of the communication to relevant alignment of the user's reference frames. This advantage may be very relevant for quantum key distribution implementation to be upgraded from the regional scale to a national or continental one, or for links crossing hostile ground, and even for envisioning a quantum key distribution on a global scale by exploiting orbiting terminals on a network of satellites.

The OAM Eigen modes are characterized by a twisted wavefront composed of "l" intertwined helices, where "l" is an integer, and by photons carrying "$\pm l\hbar$" of (orbital) angular momentum, in addition to the more usual spin angular momentum (SAM) associated with polarization. The potentially unlimited value of "l" opens the possibility to exploit OAM also for increasing the capacity of communication systems (although at the expense of increasing also the channel cross-section size), and terabit classical data transmission based on OAM multiplexing can be demonstrated both in free-space and optical fibers. Such a feature can also be exploited in the quantum domain, for example to expand the number of qubits per photon, or to achieve new functions, such as the rotational invariance of the qubits.

In a free-space QKD, two users (Alice and Bob) must establish a shared reference frame (SRF) in order to communicate with good fidelity. Indeed the lack of a SRF is equivalent to an unknown relative rotation which introduces noise into the quantum channel, disrupting the communication. When the information is encoded in photon polarization, such a reference frame can be defined by the orientations of Alice's and Bob's "horizontal" linear polarization directions. The alignment of these directions needs extra resources and can impose serious obstacles in long distance free space QKD and/or when the misalignment varies in time. As indicated, we can solve this by using rotation invariant states, which remove altogether the need for establishing a SRF. Such states are obtained as a particular combination of OAM and polarization modes (hybrid states), for which the transformation induced by the misalignment on polarization is exactly balanced by the effect of the same misalignment on spatial modes. These states exhibit a global symmetry under rotations of the beam around its axis and can be visualized as space-variant polarization states, generalizing the well-known azimuthal and radial vector beams, and forming a two-dimensional Hilbert space. Moreover, this rotation-invariant hybrid space can be also regarded as a decoherence-free subspace of the four-dimensional OAM-polarization product Hilbert space, insensitive to the noise associated with random rotations.

The hybrid states can be generated by a particular space-variant birefringent plate having topological charge "q" at its center, named "q-plate". In particular, a polarized Gaussian beam (having zero OAM) passing through a q-plate with q=1/2 will undergo the following transformation:

$$(\alpha|R\rangle + \beta|R\rangle)_\pi \otimes |0\rangle_O \rightarrow \alpha|L\rangle_\pi \otimes |r\rangle_O + \beta|R\rangle_\pi \otimes |l\rangle_O$$

$|L\rangle_{\pi_-}$ and $|R\rangle_{\pi_-}$ denote the left and right circular polarization states (eigenstates of SAM with eigenvalues "$\pm h$"), $|0\rangle_O$ represents the transverse Gaussian mode with zero OAM and the $|L\rangle_{O_-}$ and $|R\rangle_O$ eigenstates of OAM with $|l|=1$ and with eigenvalues "$\pm l\hbar$"). The states appearing on the right hand side of equation are rotation-invariant states. The reverse operation to this can be realized by a second q-plate with the same q. In practice, the q-plate operates as an interface between the polarization space and the hybrid one, converting qubits from one space to the other and vice versa in a universal (qubit invariant) way. This in turn means that the initial encoding and final decoding of information in our QKD implementation protocol can be conveniently performed in the polarization space, while the transmission is done in the rotation-invariant hybrid space.

OAM is a conserved quantity for light propagation in vacuum, which is obviously important for communication applications. However, OAM is also highly sensitive to atmospheric turbulence, a feature which limits its potential usefulness in many practical cases unless new techniques are developed to deal with such issues.

Quantum cryptography describes the use of quantum mechanical effects (in particular quantum communication and quantum computation) to perform cryptographic tasks or to break cryptographic systems. Well-known examples of quantum cryptography are the use of quantum communication to exchange a key securely (quantum key distribution) and the hypothetical use of quantum computers that would allow the breaking of various popular public-key encryption and signature schemes (e.g., RSA).

The advantage of quantum cryptography lies in the fact that it allows the completion of various cryptographic tasks that are proven to be impossible using only classical (i.e. non-quantum) communication. For example, quantum mechanics guarantees that measuring quantum data disturbs that data; this can be used to detect eavesdropping in quantum key distribution.

Quantum key distribution (QKD) uses quantum mechanics to guarantee secure communication. It enables two parties to produce a shared random secret key known only to them, which can then be used to encrypt and decrypt messages.

An important and unique property of quantum distribution is the ability of the two communicating users to detect the presence of any third party trying to gain knowledge of the key. This results from a fundamental aspect of quantum mechanics: the process of measuring a quantum system in general disturbs the system. A third party trying to eavesdrop on the key must in some way measure it, thus introducing detectable anomalies. By using quantum superposition or quantum entanglement and transmitting information in quantum states, a communication system can be implemented which detects eavesdropping. If the level of eavesdropping is below a certain threshold, a key can be produced that is guaranteed to be secure (i.e. the eavesdropper has no information about it), otherwise no secure key is possible and communication is aborted.

The security of quantum key distribution relies on the foundations of quantum mechanics, in contrast to traditional key distribution protocol which relies on the computational difficulty of certain mathematical functions, and cannot provide any indication of eavesdropping or guarantee of key security.

Quantum key distribution is only used to reduce and distribute a key, not to transmit any message data. This key can then be used with any chosen encryption algorithm to encrypt (and decrypt) a message, which is transmitted over a standard communications channel. The algorithm most commonly associated with QKD is the one-time pad, as it is provably secure when used with a secret, random key.

Quantum communication involves encoding information in quantum states, or qubits, as opposed to classical communication's use of bits. Usually, photons are used for these quantum states and thus is applicable within optical communication systems. Quantum key distribution exploits certain properties of these quantum states to ensure its security.

There are several approaches to quantum key distribution, but they can be divided into two main categories, depending on which property they exploit. The first of these are prepare and measure protocol. In contrast to classical physics, the act of measurement is an integral part of quantum mechanics. In general, measuring an unknown quantum state changes that state in some way. This is known as quantum indeterminacy, and underlies results such as the Heisenberg uncertainty principle, information distribution theorem, and no cloning theorem. This can be exploited in order to detect any eavesdropping on communication (which necessarily involves measurement) and, more importantly, to calculate the amount of information that has been intercepted. Thus, by detecting the change within the signal, the amount of eavesdropping or information that has been intercepted may be determined by the receiving party.

The second category involves the use of entanglement based protocols. The quantum states of two or more separate objects can become linked together in such a way that they must be described by a combined quantum state, not as individual objects. This is known as entanglement, and means that, for example, performing a measurement on one object affects the other object. If an entanglement pair of objects is shared between two parties, anyone intercepting either object alters the overall system, revealing the presence of a third party (and the amount of information that they have gained). Thus, again, undesired reception of information may be determined by change in the entangled pair of objects that is shared between the parties when intercepted by an unauthorized third party.

One example of a quantum key distribution (QKD) protocol is the BB84 protocol. The BB84 protocol was originally described using photon polarization states to transmit information. However, any two pairs of conjugate states can be used for the protocol, and optical fiber-based implementations described as BB84 can use phase-encoded states. The transmitter (traditionally referred to as Alice) and the receiver (traditionally referred to as Bob) are connected by a quantum communication channel which allows quantum states to be transmitted. In the case of photons, this channel is generally either an optical fiber, or simply free-space, as described previously with respect to FIG. 53. In addition, the transmitter and receiver communicate via a public classical channel, for example using broadcast radio or the Internet. Neither of these channels needs to be secure. The protocol is designed with the assumption that an eavesdropper (referred to as Eve) can interfere in any way with both the transmitter and receiver.

Figure 55:
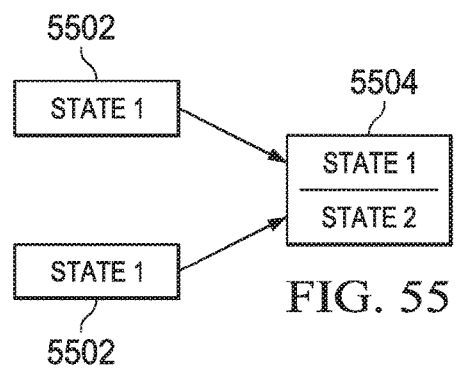
FIG. 55 illustrates the manner in which two separate states are combined into a single conjugate pair within quantum key distribution.
Figure 56:
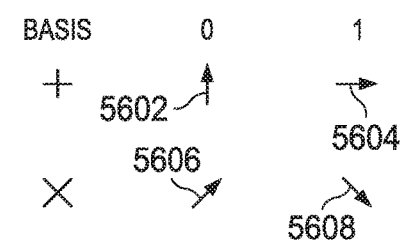
FIG. 56 illustrates one manner in which 0 and 1 bits may be transmitted using different basis within a quantum key distribution system.

Referring now to FIG. 55, the security of the protocol comes from encoding the information in non-orthogonal states. Quantum indeterminacy means that these states cannot generally be measured without disturbing the original state. BB84 uses two pair of states 5502, each pair conjugate to the other pair to form a conjugate pair 5504. The two states 5502 within a pair 5504 are orthogonal to each other. Pairs of orthogonal states are referred to as a basis. The usual polarization state pairs used are either the rectilinear basis of vertical (0 degrees) and horizontal (90 degrees), the diagonal basis of 45 degrees and 135 degrees, or the circular basis of left handedness and/or right handedness. Any two of these basis are conjugate to each other, and so any two can be used in the protocol. In the example of FIG. 56, rectilinear basis are used at 5602 and 5604, respectively, and diagonal basis are used at 5606 and 5608.

The first step in BB84 protocol is quantum transmission. Referring now to FIG. 57 wherein there is illustrated a flow diagram describing the process, wherein the transmitter creates a random bit (0 or 1) at step 5702, and randomly selects at 5704 one of the two basis, either rectilinear or diagonal, to transmit the random bit. The transmitter prepares at step 5706 a photon polarization state depending both on the bit value and the selected basis, as shown in FIG. 55. So, for example, a 0 is encoded in the rectilinear basis (+) as a vertical polarization state and a 1 is encoded in a diagonal basis (X) as a 135 degree state. The transmitter transmits at step 5708 a single proton in the state specified to the receiver using the quantum channel. This process is repeated from the random bit stage at step 5702 with the transmitter recording the state, basis, and time of each photon that is sent over the optical link.

According to quantum mechanics, no possible measurement distinguishes between the four different polarization states 5602 through 5608 of FIG. 56, as they are not all orthogonal. The only possible measurement is between any two orthogonal states (and orthonormal basis). So, for example, measuring in the rectilinear basis gives a result of horizontal or vertical. If the photo was created as horizontal or vertical (as a rectilinear eigenstate), then this measures the correct state, but if it was created as 45 degrees or 135 degrees (diagonal eigenstate), the rectilinear measurement instead returns either horizontal or vertical at random. Furthermore, after this measurement, the proton is polarized in the state it was measured in (horizontal or vertical), with all of the information about its initial polarization lost.

Referring now to FIG. 58, as the receiver does not know the basis the photons were encoded in, the receiver can only select a basis at random to measure in, either rectilinear or diagonal. At step 5802, the transmitter does this for each received photon, recording the time measurement basis used and measurement result at step 5804. At step 5806, a determination is made if there are further protons present and, if so, control passes back to step 5802. Once inquiry step 5806 determines the receiver had measured all of the protons, the transceiver communicates at step 5808 with the transmitter over the public communications channel. The transmitter broadcast the basis for each photon that was sent at step 5810 and the receiver broadcasts the basis each photon was measured in at step 5812. Each of the transmitter and receiver discard photon measurements where the receiver used a different basis at step 5814 which, on average, is one-half, leaving half of the bits as a shared key, at step 5816. This process is more fully illustrated in FIG. 59.

The transmitter transmits the random bit 01101001. For each of these bits respectively, the transmitter selects the sending basis of rectilinear, rectilinear, diagonal, rectilinear, diagonal, diagonal, diagonal, and rectilinear. Thus, based upon the associated random bits selected and the random sending basis associated with the signal, the polarization indicated in line 5802 is provided. Upon receiving the photon, the receiver selects the random measuring basis as indicated in line 5904. The photon polarization measurements from these basis will then be as indicated in line 5906. A public discussion of the transmitted basis and the measurement basis are discussed at 5908 and the secret key is determined to be 0101 at 5910 based upon the matching bases for transmitted photons 1, 3, 6, and 8.

Figure 60:
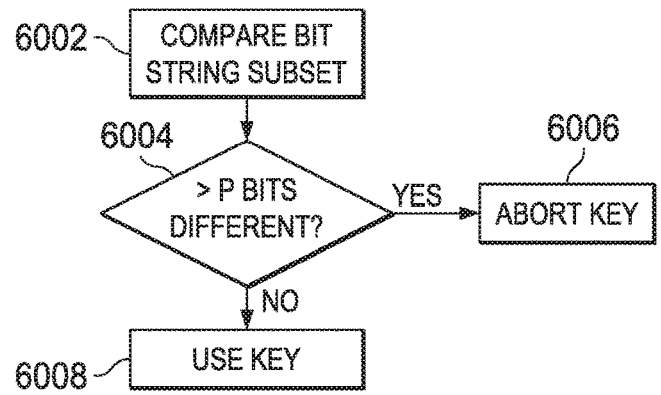
FIG. 60 is a flow diagram illustrating the process for determining whether to keep or abort a determined key.

Referring now to FIG. 60, there is illustrated the process for determining whether to keep or abort the determined key based upon errors detected within the determined bit string. To check for the presence of eavesdropping, the transmitter and receiver compare a certain subset of their remaining bit strings at step 6002. If a third party has gained any information about the photon's polarization, this introduces errors within the receiver's measurements. If more than P bits differ at inquiry step 6004, the key is aborted at step 6006, and the transmitter and receiver try again, possibly with a different quantum channel, as the security of the key cannot be guaranteed. P is chosen so that if the number of bits that is known to the eavesdropper is less than this, privacy amplification can be used to reduce the eavesdropper's knowledge of the key to an arbitrarily small amount by reducing the length of the key. If inquiry step 6004 determines that the number of bits is not greater than P, then the key may be used at step 6008.

The E91 protocol comprises another quantum key distribution scheme that uses entangled pairs of protons. The entangled pairs can be created by the transmitter, by the receiver, or by some other source separate from both of the transmitter and receiver, including an eavesdropper. The photons are distributed so that the transmitter and receiver each end up with one photon from each pair. The scheme relies on two properties of entanglement. First, the entangled states are perfectly correlated in the sense that if the transmitter and receiver both measure whether their particles have vertical or horizontal polarizations, they always get the same answer with 100 percent probability. The same is true if they both measure any other pair of complementary (orthogonal) polarizations. However, the particular results are not completely random. It is impossible for the transmitter to predict if the transmitter, and thus the receiver, will get vertical polarizations or horizontal polarizations. Second, any attempt at eavesdropping by a third party destroys these correlations in a way that the transmitter and receiver can detect. The original Ekert protocol (E91) consists of three possible states and testing Bell inequality violation for detecting eavesdropping.

Presently, the highest bit rate systems currently using quantum key distribution demonstrate the exchange of secure keys at 1 Megabit per second over a 20 kilometer optical fiber and 10 Kilobits per second over a 100 kilometer fiber.

The longest distance over which quantum key distribution has been demonstrated using optical fiber is 148 kilometers. The distance is long enough for almost all of the spans found in today's fiber-optic networks. The distance record for free-space quantum key distribution is 144 kilometers using BB84 enhanced with decoy states.

Figure 61:
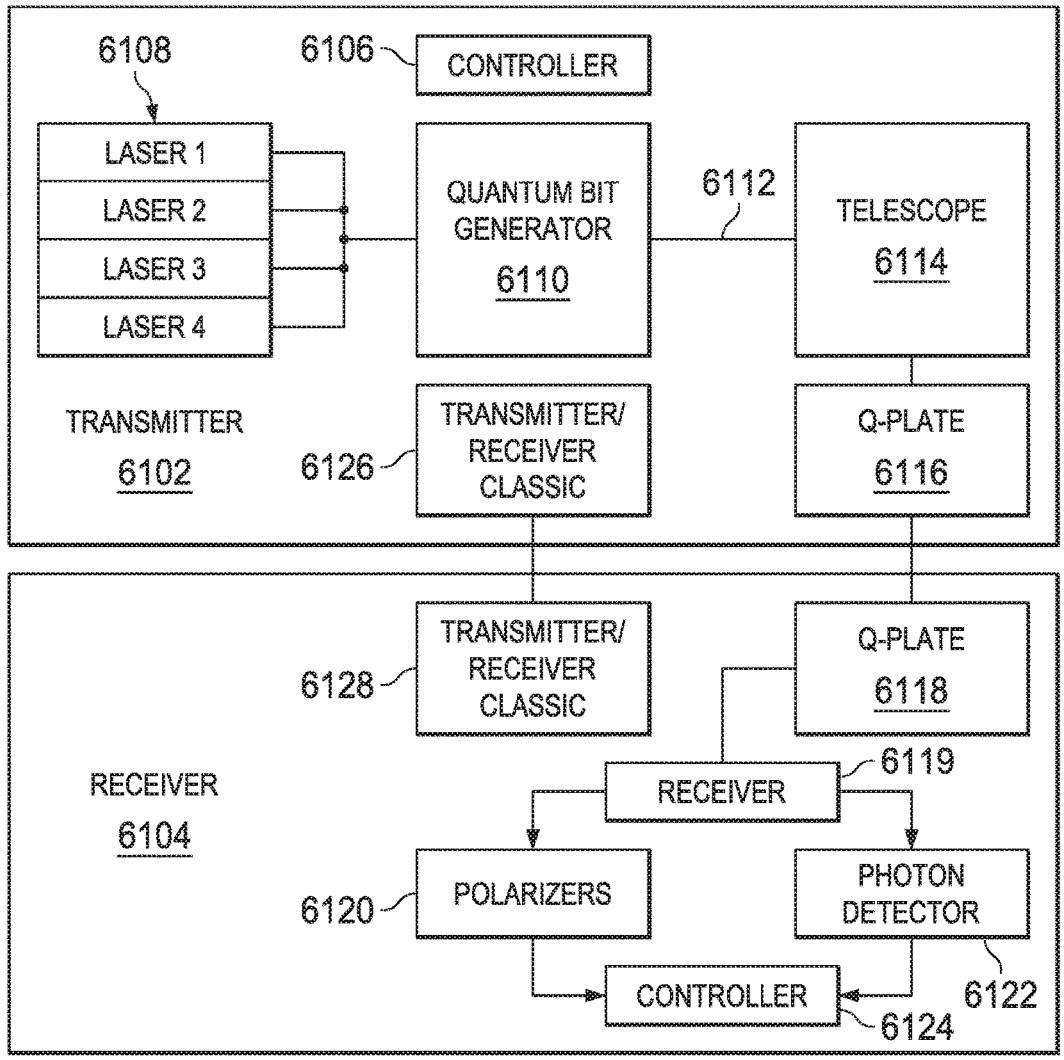
FIG. 61 illustrates a functional block diagram of a transmitter and receiver utilizing a free-space quantum key distribution system.

Referring now to FIG. 61, there is illustrated a functional block diagram of a transmitter 6102 and receiver 6104 that can implement alignment of free-space quantum key distribution. The system can implement the BB84 protocol with decoy states. The controller 6106 enables the bits to be encoded in two mutually unbiased bases $Z=\{|0\rangle, |1\rangle\}$ and $X=\{|+\rangle, |-\rangle\}$, where $|0\rangle$ and $|1\rangle$ are two orthogonal states spanning the qubit space and $|\pm\rangle = 1/\sqrt{2}\,(|0\rangle \pm |1\rangle)$. The transmitter controller 6106 randomly chooses between the Z and X basis to send the classical bits 0 and 1. Within hybrid encoding, the Z basis corresponds to $\{|L\rangle_\pi \otimes |r\rangle_O, |R\rangle_\pi \otimes |l\rangle_O\}$ while the X basis states correspond to $1/\sqrt{2}(|L\rangle_\pi \otimes |r\rangle_O \pm |R\rangle_\pi \otimes |l\rangle_O)$. The transmitter 6102 uses four different polarized attenuated lasers 6108 to generate quantum bits through the quantum bit generator 6110. Photons from the quantum bit generator 4610 are delivered via a single mode fiber 6112 to a telescope 6114. Polarization states $|H\rangle, |V\rangle, |R\rangle, |L\rangle$ are transformed into rotation invariant hybrid states by means of a q-plate 6116 with $q=\frac{1}{2}$. The photons can then be transmitted to the receiving station 6104 where a second q-plate transform 6118 transforms the signals back into the original polarization states $|H\rangle, |V\rangle, |R\rangle, |L\rangle$, as defined by the receiver reference frame. Qubits can then be analyzed by polarizers 6120 and single photon detectors 6122. The information from the polarizers 6120 and photo detectors 6122 may then be provided to the receiver controller 6124 such that the shifted keys can be obtained by keeping only the bits corresponding to the same basis on the transmitter and receiver side as determined by communications over a classic channel between the transceivers 6126, 6128 in the transmitter 6102 and receiver 6104.

Figure 62:
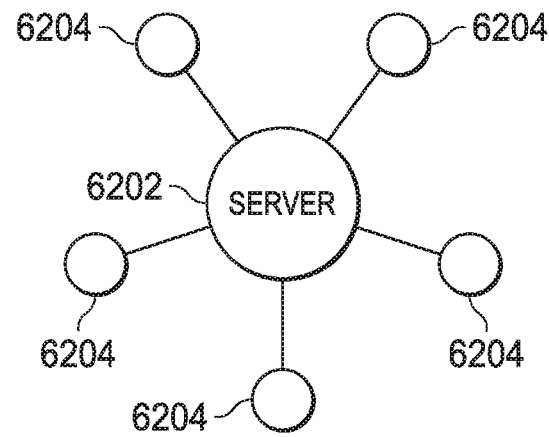
FIG. 62 illustrates a network cloud-based quantum key distribution system.

Referring now to FIG. 62, there is illustrated a network cloud based quantum key distribution system including a central server 6202 and various attached nodes 6204 in a hub and spoke configuration. Trends in networking are presenting new security concerns that are challenging to meet with conventional cryptography, owing to constrained computational resources or the difficulty of providing suitable key management. In principle, quantum cryptography, with its forward security and lightweight computational footprint, could meet these challenges, provided it could evolve from the current point to point architecture to a form compatible with multimode network architecture. Trusted quantum key distribution networks based on a mesh of point to point links lacks scalability, require dedicated optical fibers, are expensive and not amenable to mass production since they only provide one of the cryptographic functions, namely key distribution needed for secure communications. Thus, they have limited practical interest.

A new, scalable approach such as that illustrated in FIG. 62 provides quantum information assurance that is network based quantum communications which can solve new network security challenges. In this approach, a BB84 type quantum communication between each of N client nodes 6204 and a central sever 6202 at the physical layer support a quantum key management layer, which in turn enables secure communication functions (confidentiality, authentication, and nonrepudiation) at the application layer between approximately N2 client pairs. This network based communication "hub and spoke" topology can be implemented in a network setting, and permits a hierarchical trust architecture that allows the server 6202 to act as a trusted authority in cryptographic protocols for quantum authenticated key establishment. This avoids the poor scaling of previous approaches that required a pre-existing trust relationship between every pair of nodes. By making a server 6202, a single multiplex QC (quantum communications) receiver and the client nodes 6204 QC transmitters, this network can simplify complexity across multiple network nodes. In this way, the network based quantum key distribution architecture is scalable in terms of both quantum physical resources and trust. One can at time multiplex the server 6202 with three transmitters 6204 over a single mode fiber, larger number of clients could be accommodated with a combination of temporal and wavelength multiplexing as well as orbital angular momentum multiplexed with wave division multiplexing to support much higher clients.

Figure 63:
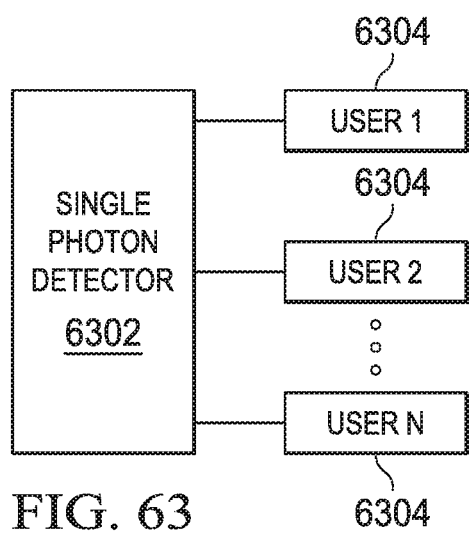
FIG. 63 illustrates a high-speed single photon detector in communication with a plurality of users.
Figure 64:
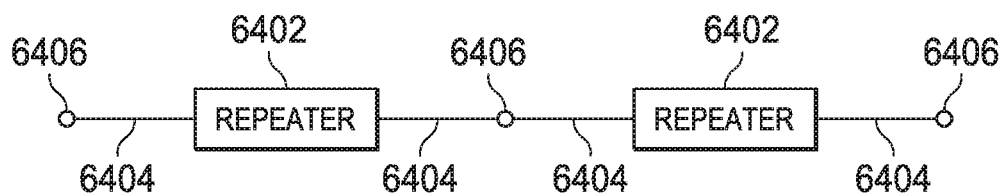
FIG. 64 illustrates a nodal quantum key distribution network.

Referring now to FIGS. 63 and 64, there are illustrated various components of multi-user orbital angular momentum based quantum key distribution multi-access network. FIG. 63 illustrates a high speed single photon detector 6302 positioned at a network node that can be shared between multiple users 6304 using conventional network architectures, thereby significantly reducing the hardware requirements for each user added to the network. In an embodiment, the single photon detector 6302 may share up to 64 users. This shared receiver architecture removes one of the main obstacles restricting the widespread application of quantum key distribution. The embodiment presents a viable method for realizing multi-user quantum key distribution networks with resource efficiency.

Referring now also to FIG. 64, in a nodal quantum key distribution network, multiple trusted repeaters 6402 are connected via point to point links 6404 between node 6406. The repeaters are connected via point to point links between a quantum transmitter and a quantum receiver. These point to point links 6404 can be realized using long distance optical fiber lengths and may even utilize ground to satellite quantum key distribution communication. While point to point connections 6404 are suitable to form a backbone quantum core network, they are less suitable to provide the last-mile service needed to give a multitude of users access to the quantum key distribution infrastructure. Reconfigurable optical networks based on optical switches or wavelength division multiplexing may achieve more flexible network structures, however, they also require the installation of a full quantum key distribution system per user which is prohibitively expensive for many applications.

The quantum key signals used in quantum key distribution need only travel in one direction along a fiber to establish a secure key between the transmitter and the receiver. Single photon quantum key distribution with the sender positioned at the network node 6406 and the receiver at the user premises therefore lends itself to a passive multi-user network approach. However, this downstream implementation has two major shortcomings. Firstly, every user in the network requires a single photon detector, which is often expensive and difficult to operate. Additionally, it is not possible to deterministically address a user. All detectors, therefore, have to operate at the same speed as a transmitter in order not to miss photons, which means that most of the detector bandwidth is unused.

Most systems associated with a downstream implementation can be overcome. The most valuable resource should be shared by all users and should operate at full capacity. One can build an upstream quantum access network in which the transmitters are placed at the end user location and a common receiver is placed at the network node. This way, an operation with up to 64 users is feasible, which can be done with multi-user quantum key distribution over a 1×64 passive optical splitter.

Thus, using various configurations of the above described orbital angular momentum processing, multi-layer overlay modulation, and quantum key distribution within various types of communication networks and more particularly optical fiber networks and free-space optic communication network, a variety of benefits and improvements in system bandwidth and capacity maybe achieved.

Prolate Spheroidal Functions

Figure 65:
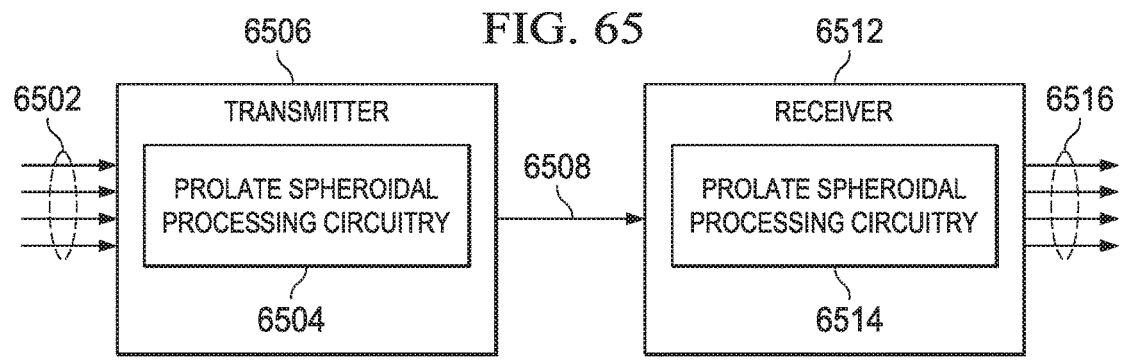
FIG. 65 illustrates a block diagram of Prolate Spheroidal transmission system.

Referring now to FIG. 65, another type of orthogonal function that may be used to improve communications is a Prolate Spheroidal function. Multiple input data signals 6502 are processed by Prolate Spheroidal processing circuitry 6504 within a transmitter 6506 that transmit the combined signals over an associated communications link 6508. The Prolate Spheroidal processing circuitry 6508 adds a Prolate Spheroidal function to the data signals before they are combined together. The transmitted signals are received at a receiver 6510 including Prolate Spheroidal processing circuitry 6512 that removes the Prolate Spheroidal function applied previously and separate the combined signal into the separate data signals as a plurality of output data signals 6514.

Hermite-Gaussian functions of different orders are all mutually orthogonal to one another if the Hermite-Gaussian functions are infinitely extended in the time domain. When Hermite-Gaussian functions are truncated, they become pseudo-orthogonal. Even though the Hermite-Gaussian functions remain orthogonal practically, they are not truly orthogonal in a mathematical sense. However, Prolate Spheroidal functions remain orthogonal both if they are infinitely extended and if they are truncated.

Prolate Spheroidal function decompose into a linear combination of coefficients by the following means:

$$f(t) = \sum_{n=0}^{\infty} \gamma_n \phi_n(t)$$

where $f(t)$ is the used function, $\gamma_n$ is a set of scalar coefficients and $\varphi_n(t)$ is an orthogonal basis set. The coefficients can be computed in the following fashion:

$$\gamma_n = \frac{\langle f(t) | \phi_n(t) \rangle}{\langle \phi_n(t) | \phi_n(t) \rangle}$$

Some popular basis sets for performing this analysis are the Legendre, Chebyschev, and Fourier series.

Bandlimited functions are given the conventional notation of $\varphi_n(t)$ on the continuous domain.

Prolate Spheroidal Wave Functions (PSWFs) are actually dependent on a total of four parameters: the continuous time parameter t, the order, n, of the function, the interval on which the function is known, $t_0$, and the bandwidth parameter c. The bandwidth parameter is given by:

$$c = t_0 \Omega$$

where $\Omega$ is the finite bandwidth or cutoff frequency of $\psi_n(t)$ of a given order n.

$$\psi_n(c, kT) = \psi_{n,c}[k]$$

where T is the sampling period, c is a real positive value (Slepian frequency), n is the integer order and k is the integer time sample number. Also, the following notation is defined:

$$f(kT) = y[k]$$

where y[k] is the discrete version of continuous $f(t)$.

$\psi_n(c, t)$ concentrated in the interval of $[-t_0, t_0]$ are normalized eigenfunctions of the system:

$$\int_{-t_0}^{t_0} \psi_n(c, t) \frac{\sin\Omega(x-t)}{\pi(x-t)} dt = \psi_n(c, x) \lambda_n(c)$$

where $\lambda_n(c)$ is the eigenvalue of the sinc kernel and can be also regarded as the index of concentration on the interval $[-t_0, t_0]$. The eigenfunctions $\psi_n(c, t)$ are invariant to a finite Fourier transform:

$$\int_{-t_0}^{t_0} \psi_n(c, t) e^{j\omega t} dt = j^n \left( \frac{2\pi \lambda_n(c) t_0}{\Omega} \right)^{1/2} \psi_n\left(c, \frac{\omega t_0}{\Omega}\right)$$

The infinite Fourier transform of $\psi_n(c, t)$ is also invariant $$\int_{-\infty}^{\infty} \psi_n(c, t) e^{j\omega t} dt = j^n \left( \frac{2\pi t_0}{\Omega} \right)^{1/2} \psi_n\left(c, \frac{\omega t_0}{\Omega}\right)$$

This shows that $\psi_n(c, t)$ are doubly invariant to the Fourier transform. This invariance for both the finite and infinite domain states that $\psi_n(c, t)$ is bandlimited.

Another key set of properties states that $\psi_n(c, t)$ also obey a duality of orthogonality where the eigenfunctions are orthogonal over a finite and infinite domain. These functions are also normalized so that the following inner products obey the following:

$$\int_{-t_0}^{t_0} \psi_n(c, t) \psi_m(c, t) dt = \begin{cases} \lambda_n(c) & \text{for } n = m, \\ 0 & \text{otherwise.} \end{cases}$$

$$\int_{t_0}^{t_0} \psi_n(c, t) \psi_m(c, t) dt = \begin{cases} 1 & \text{for } n = m, \\ 0 & \text{otherwise.} \end{cases}$$

Any infinite continuous function $f(t)$ can be represented as:

$$f(t) = \sum_{n=0}^{\infty} \gamma_n(c) \psi_n(c, t)$$

where the coefficients are given by:

$$\gamma_n(c) = \int_{-\infty}^{\infty} f(t) \psi_n(c, t) dt.$$

This naturally obeys the Parseval's equality, $$\sum_{n=0}^{\infty} (\gamma_n(c))^2 = \int_{-\infty}^{\infty} |f(t)|^2 dt.$$

The convergence of the series is given by:

$$\lim_{N \to \infty} \int_{-\infty}^{\infty} \left[ f(t) - \sum_{n=0}^{N} \gamma_n(c) \psi_n(c, t) \right]^2 dt = 0$$

From this $f(t)$ can be closely approximated for all t and with N from:

$$f(t) \simeq \sum_{n=0}^{N} \gamma_n(c) \psi_n(c, t).$$

Within the last ten years, computer processing speeds have climbed to the point where generating the function set is not an issue when it comes to their study. It becomes difficult when implementing an algorithm that generates the function set over its domain for higher orders of n and high bandwidth values of c. For this, the best approach is the following expansion:

$$\psi_n(c, t) = \sum_{k=0}^{\infty} \beta_k^n P_k(t)$$

$P_n(t)$ is the normalized Legendre polynomial of order n.

The present embodiment adopts the same approach in the derivation as did Slepian and Flammer, which uses the angular and radial solutions in spheroidal wave coordinates of the first kind to the Helmoltz wave equation. To find the eigenvalues, the radial solution in spheroidal wave coordinates of the Helmoltz wave equation of the first kind is used.

$$\lambda_n(c) = \frac{2c}{\pi}[R_{0n}(c, 1)^2]$$

For the evaluation of eigenfunction $\psi_n(c, t)$, the angular solution of the Helmoltz wave equation of the first kind is used:

$$\psi_n(c, t) = \frac{\sqrt{\lambda_n(c)/t_0}}{\mu_n(c)} S_{0n}\left(c, \frac{t}{t_0}\right)$$

$$\mu_n(c) = \sqrt{\int_{-1}^{1}(S_{0n}(c, t))^2 dt}$$

$\psi_n(c, t)$ are simply normalized versions of the spheroidal wave functions of order zero. To find the solution $S_{0n}(c, t)$, the following expansion is applied:

$$S_{mn}(c, t) = \sum_{r=0,1}^{\infty} d_r^{mn}(c) P_{m+r}^m(t)$$

$P_{m+r}^m(t)$ is the Legendre polynomial while $d_r^{mn}(c)$ represents the expansion coefficient.

The expansion for the radial solution $R_{mn}(c, \varepsilon)$ of the first kind $$R_{mn}(c, \varepsilon) = \frac{u_{m,n}(c, \varepsilon)}{\sum_{r=0,1}^{\infty} d_r^{mn}(c)((2m+1)!)/r!}\left(\frac{\varepsilon^2-1}{\varepsilon^2}\right)^{1/2m}$$

$$u_{m,n}(c, \varepsilon) = \sum_{r=0,1}^{\infty} i^{r+m-n} d_r^{mn}(c) \frac{(2m+r)!}{r!} j_{m+r}(c, \varepsilon)$$

The term $j_{p(z)}$ is a scaled spherical Bessel function $B_p(v)$ of the first kind:

$$j_{m+r}(c, \varepsilon) = \sqrt{\frac{\pi}{2c\varepsilon}} B_{m+r+1/2}(c, \varepsilon)$$

This approach to generate $\psi_n(c, t)$ can be used in the numerical experimentation to attain the results. This procedure is only valid for time values within the bounds of [−1, 1]. For the determination of $\psi_n(c, t)$ outside the bounds of [−1, 1], the following scheme can be applied:

$$\psi_n(c, t) = \left(\frac{\lambda_n(c)}{t_0 N_n}\right)^2 k_n \sum_{r=0,1}^{M(n)} (-1)^{(r-n)/2} d_r^{0n}(c) j_r\left(\frac{ct}{t_0}\right)$$

$j_r(Z)$ are the spherical Bessel functions as above.

Any continuous bandlimited function $f(t)$ can be synthesized by a set of coefficients determined by a finite interval employing the following:

$$\gamma_n(c) = \lambda_n^{-1}(c) \int_{-t_0}^{t_0} f(t) \psi_n(c, t) dt$$

$$f(t) \simeq \sum_{n=0}^{N} \gamma_n(c) \psi_n(c, t)$$

These can be regarded as a synthesis and analysis pair for finite length continuous functions.

A number of popular orthogonal expansions include:
Fourier Series $$a_n = \frac{1}{L} \int_{-L}^{L} f(t) \cos\left(\frac{\pi n t}{L}\right) dt$$

$$b_n = \frac{1}{L} \int_{-L}^{L} f(t) \sin\left(\frac{\pi n t}{L}\right) dt$$

$$f(t) \simeq \sum_{n=0}^{N} a_n \cos\left(\frac{\pi n t}{L}\right) + b_n \sin\left(\frac{\pi n t}{L}\right)$$

Legendre Series $$a_n = \frac{2n+1}{2} \int_{-1}^{1} P_n(t) f(t) d(t)$$

$$f(t) \simeq \sum_{n=0}^{N} a_n P_n(t),$$

Chebyschev Series $$f(t) \simeq \left[\sum_{n=0}^{N-1} a_n T_n(t)\right] - \frac{a_0}{2}$$

$P_n(t)$ are Legendre polynomials and $T_n(t)$ are Chebyschev polynomials. The set $\{t_{-M}, \ldots, t_{-M}\}$ represents the zero crossings of $T_n(t)$.

Fourier synthesis is optimally suited for periodic functions while Chebyschev synthesis works extremely well with polynomial functions. With the Slepian synthesis it is not known where it is optimally suited for, but it converges very well with the Gaussian function and the discontinuous square wave function.

As the order n increases, the energy of the functions $\psi_n(c, t)$ becomes less concentrated in the interval [−1, 1] for fixed values of c. A good measure of this is the numerical value of the eigenvalue $\lambda_n(c)$. Since the functions $\psi_n(c, t)$ posses this kind of behavior for increasing order n, the summation of the eigenvalues is a finite value:

$$\sum_{n=0}^{\infty} \lambda_n(c) = \frac{2c}{\pi}$$

The first $[(2c)/\pi]$ eigenvalues are close to 1 by a small difference $\delta$, where $\delta > 0$; therefore $$\lambda_n(c) < (1-\delta) \text{ whenever } n \leq \left\lceil \frac{2c}{\pi} \right\rceil$$

For n beyond $[(2c)/\pi]$ the eigenvalues quickly descend close to 0 yet never reaching it. For $\delta \approx 0$, close to all the energy in $\psi_2(c, t)$ of a given order n for all $t \in [-1,1]$ is contained within that boundary.

By applying the analysis of finite length function and the sum of the eigenvalues using Parseval's equality:

$$\int_{-t_0}^{t_0} |f(t)|^2 dt > \sum_{n=0}^{\lceil (2c)/\pi \rceil} \lambda_n(c) |\gamma_n(c)|^2$$

This says that the energy contained in the function $f(t)$ will obey the following truncation condition:

$$N > \left\lceil \frac{2c}{\pi} \right\rceil$$

where N is the truncation value. From this, one can see that c shares some relationship with the number of coefficients used in the set.

Looking at the Fourier series synthesis, it is seen that the synthesis is broken into the orthogonal basis set that uses cosine, which are even functions and the orthogonal basis set that uses sine, which are odd functions. Naturally, they can be used to synthesize even functions and can be used to synthesize odd functions. PSWFs also exhibit similar behaviors of symmetry.

Even orders of $\psi_n(c, t)$ are even and the odd orders of $\psi_n(c, t)$ are odd. The rules of symmetry that apply to the Fourier series also apply in the same manner to the Slepian series.

$$P_n(c) = \lambda_{2c}^{-1}(c) \int_{-t_0}^{t_0} f(t) \psi_{2n}(c, t) dt$$

$$q_n(c) = \lambda_{2n+1}^{-1} \int_{-t_0}^{t_0} f(t) \psi_{2n}(c, t) dt$$

and for the synthesis:

$$f(t) \simeq \sum_{n=0}^{N} p_n(c) \psi_{2n}(c, t) + q_n(c) \psi_{2n+1}(c, t)$$

Where $$N' > \left\lceil \frac{c}{\pi} \right\rceil$$

The analysis can be represented in a discrete sense as:

$$P_n(c) = \frac{t_0}{M \lambda_{2n}(c)} \sum_{k=-M}^{M} y[k] \psi_{2n,c}[k]$$

$$q_n(c) = \frac{t_0}{M \lambda_{2n+1}(c)} \sum_{k=-M}^{M} y[k] \psi_{sn+1,c[k]}$$

and for the synthesis:

$$y[k] \simeq \sum_{n=0}^{N'} p_n(c) \psi_{2n,c}[k] + q_n(c) \psi_{2n+1,c}[k]$$

Figure 66:
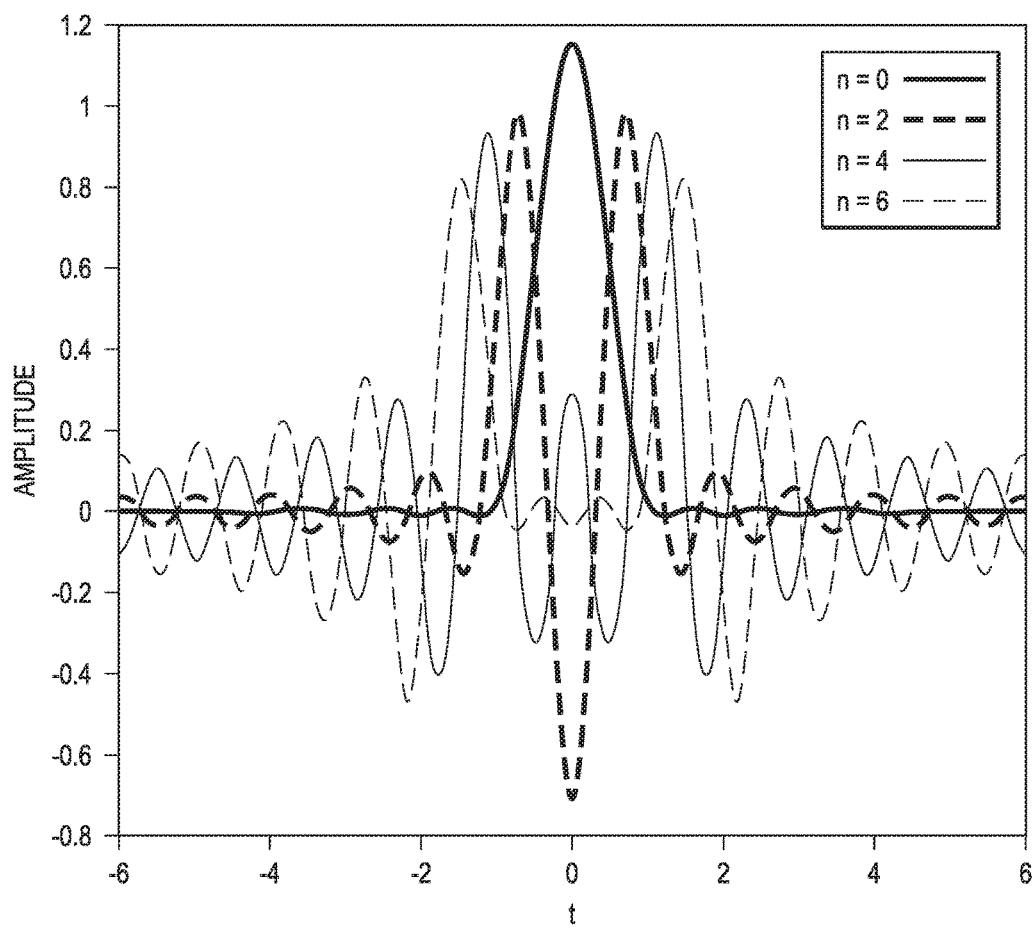
FIG. 66 illustrates $\psi_n(6, t)$ for even order values of n.
Figure 67:
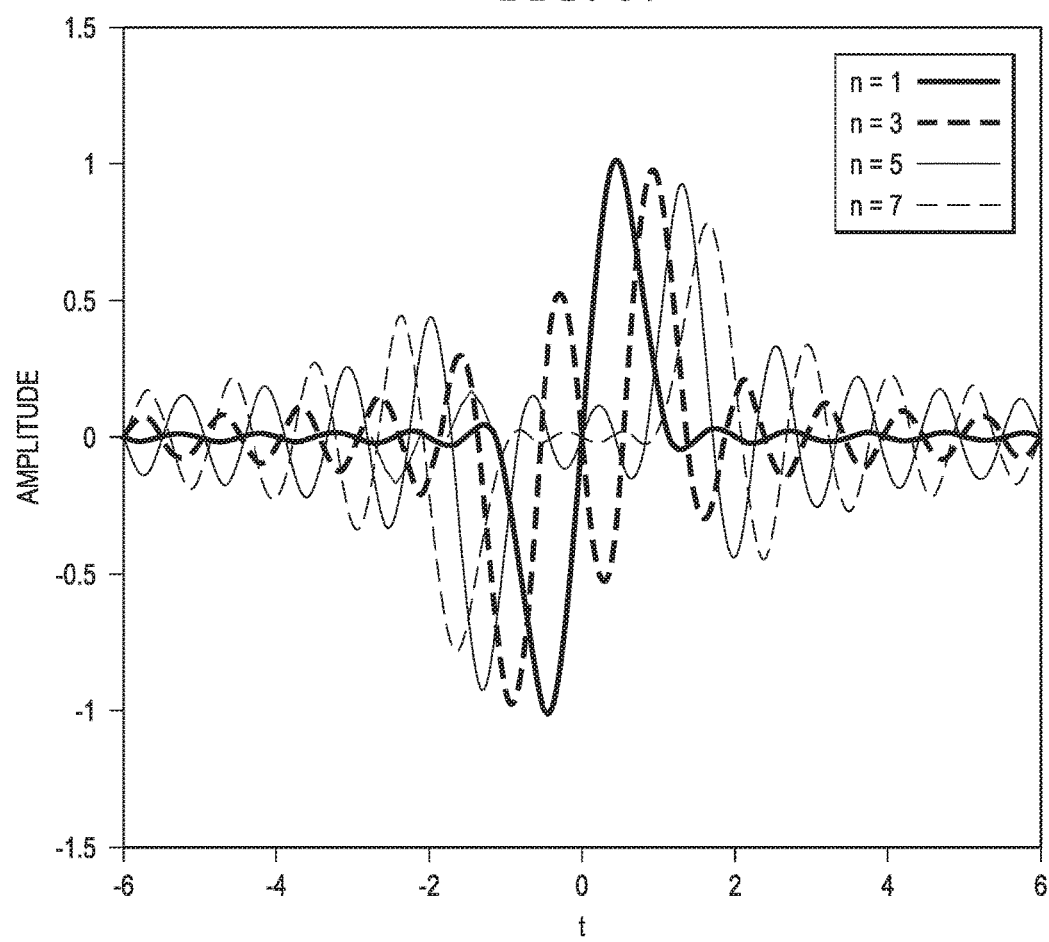
FIG. 67 illustrates $\psi_n(6,t)$ for odd order values of n.
Figure 68:
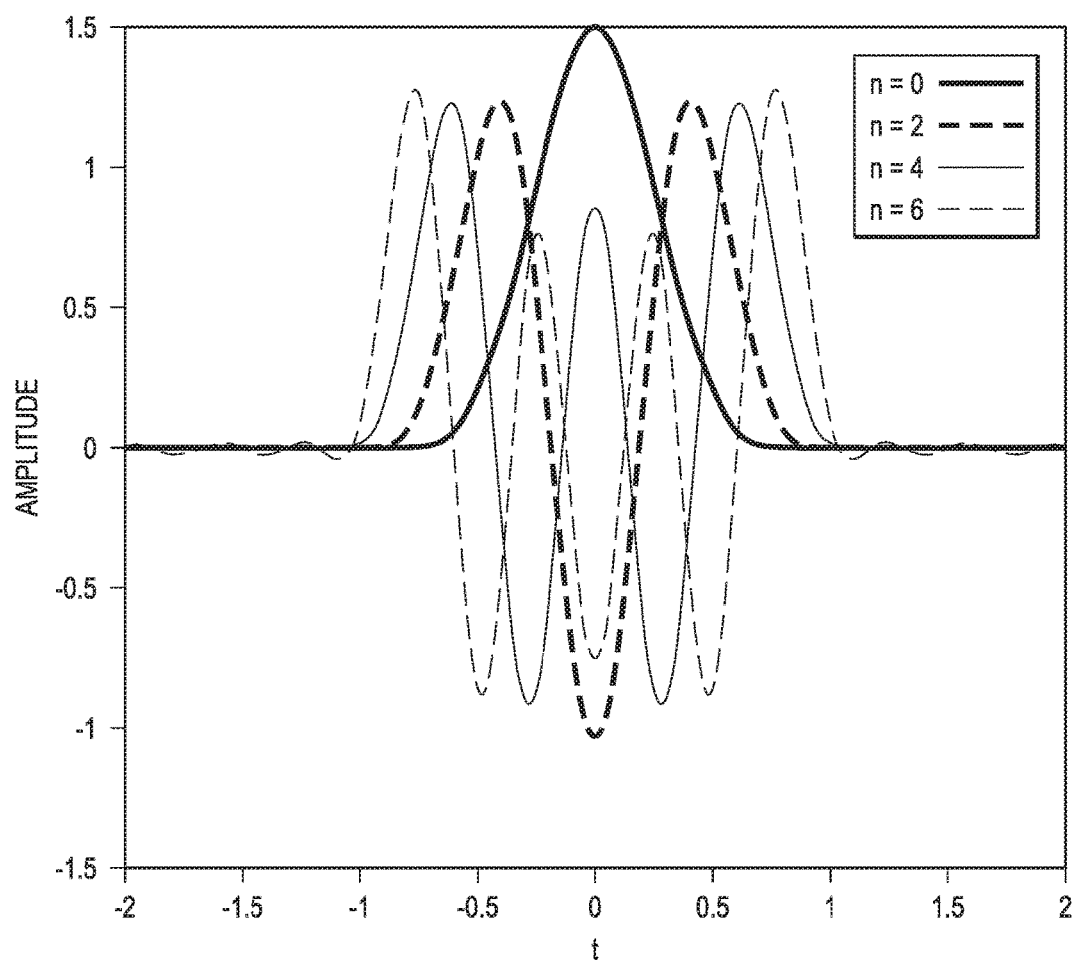
FIG. 68 illustrates $\psi_n(16,t)$ for even order values of n.
Figure 69:
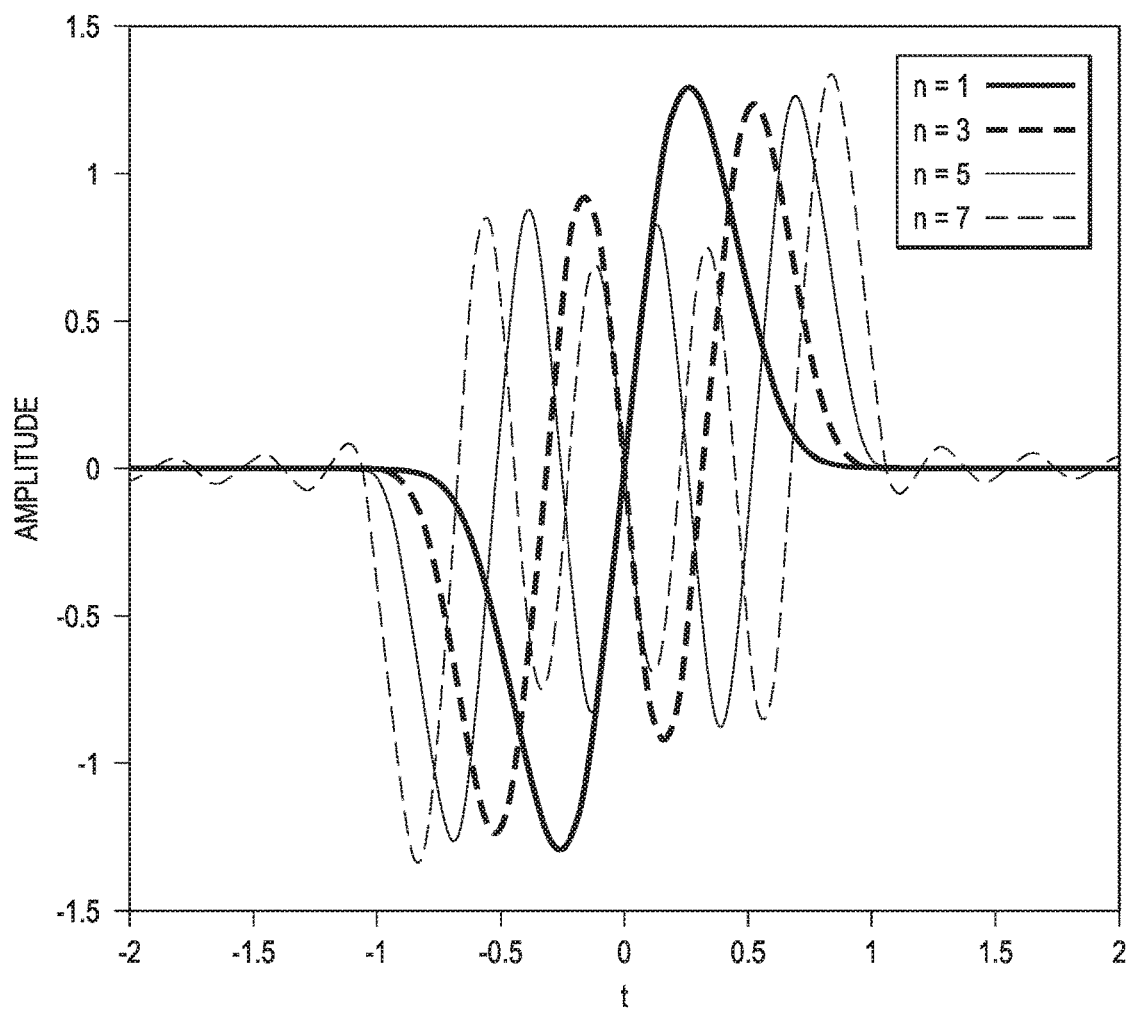
FIG. 69 illustrates $\psi_n(16,t)$ for odd order values of n.

Using these equations the results illustrated in FIGS. 66-69 are achieved. FIG. 66 illustrates $\psi_n(6, t)$ for even order values of n. FIG. 67 illustrates $\psi_n(6, t)$ for odd order values of n. FIG. 68 illustrates $\psi_n(16,t)$ for even order values of n and FIG. 69 illustrates $\psi_n(16,t)$ for odd order values of n.

$$\psi_{2n}^2(c,t) + \psi_{2n+1}^2(c,t) = K_n^2(c,t)$$

$$\psi_{2n}^2(c,t) + \psi_{2n+1}^2(c,t) = k$$

the energy of $K_n(c, t)$ being:

$$\int_{-\infty}^{\infty} |K_n(t)|^2 dt =$$

$$\int_{-\infty}^{\infty} \left| \sqrt{\psi_{2n}^2(c,t) + \psi_{2n+1}^2(c,t)} \right|^2 dt = \int_{-\infty}^{\infty} \psi_{2n}^2(c,t) dt + \int_{-\infty}^{\infty} \psi_{2n+1}^2(c,t) dt = 2$$

If we regard the horizontal axis as real and the vertical axis as imaginary, the relationship between odd and even orders of $\psi_n(c, t)$:

$$\theta_n(c, t) = \tan^{-1} \frac{\psi_{2n+1}(c, t)}{\psi_{2n}(c, t)}$$

$$\gamma_{n(c)} = \int_{-\infty}^{\infty} f(t) K_n(c, t) e^{j\theta_n(c, t)} dt$$

$$\left( \frac{\psi_{2n}(c, t)}{\lambda_{2n}(c)} \right)^2 + \left( \frac{\psi_{2n+1}(c, t)}{\lambda_{2n+1}(c)} \right)^2 = (K_n'(c, t))^2$$

$$\frac{\psi_{2n}(c, t)}{\lambda_{2n}(c)} + j \frac{\psi_{2n+1}(c, t)}{\lambda_{2n+1}(c)} = |K_n'(c, t)| e^{j\theta_n(c, t)}$$

Using $K_n'(c, t)$ the Slepian analysis for signals of finite length becomes $$\gamma_n(c) = \int_{-\infty}^{\infty} f(t) K_n'(c, t) e^{j\theta_n(c, t)} dt$$

Where the phase is defined by:

$$\theta_n'(c, t) = \tan^{-1} = \frac{\lambda_{2n}(c) \psi_{2n+1}(c, t)}{\lambda_{2n+1}(c) \psi_{2n}(c, t)}$$

For a given set of length 2M discrete values of $f$, where $k \in [-M, M]$, can be expressed as:

$$\gamma_n(c) = \frac{t_0}{M\lambda_n(c)} \sum_{k=-m}^{M} y[k]\psi_{n,c}[k]$$

$$f(t) \simeq \sum_{n=0}^{N} \gamma_n(c)\psi_n(c,t)$$

$$f(t) \simeq \frac{t_0}{M} \sum_{n=0}^{N} \frac{\psi_n(c,t)}{\lambda_n(c)} \left\{ \sum_{k=-M}^{M} y[k]\psi_{n,c}[k] \right\}$$

The expansion of the sinc function using PSWFs, is $$\mathrm{sinc}\,\Omega(t-x) = \frac{\pi}{\Omega} \sum_{n=0}^{\infty} \psi_n(c,t)\psi_n(c,t)$$

Looking at the continuous case where $t \in (-\infty, \infty)$. Given the synthesis over the entire domain of t can be written as:

$$f(t) = \sum_{n=0}^{N} \psi_n(c,t) \int_{-\infty}^{\infty} f(x)\psi_n(c,x)dx$$

By implementing the integral of the equation in the discrete sense, the following is obtained:

$$f(t) = T_s \sum_{n=0}^{\infty} \psi_n(c,t) \sum_{k=-\infty}^{\infty} y[k]\psi_{n,c}[k]$$

Which can be written as:

$$f(t) = T_s \sum_{k=-\infty}^{\infty} y[k] \sum_{n=0}^{N} \psi_n(c,t)\psi_{n,c}[k]$$

Where $$T_s = \frac{\pi}{\Omega}$$

is me sampling period and $\Omega$ is the cutoff frequency of the discrete function set. This can also be regarded as the Shannon sampling theorem for certain c and as $N \to \infty$ but can be approximated to a good precision for certain N.

When this is implemented in a discrete manner within the interval $t \in [-t_0, t_0]$, the following is obtained:

$$\frac{\sin \omega_c \pi(t/T_s - k)}{\pi(t/T_s - k)} = \frac{\omega_c \pi t_0}{c} \sum_{n=0}^{N} \psi_n(c,t)\psi_{n,c}[k]$$

Where $\omega_c$ is the normalized cutoff frequency of the sinc function. The eigenvalue or energy index is very small as it goes well beyond the $\lceil (2\pi)/c \rceil$ cutoff point for increasing n.

$$c = \frac{\omega_c \pi t_0}{T_s}$$

Total energy, $E_p$ $$E_p = \sum_{k=-M}^{M} |y_i(k)|^2$$

It is important to note that the energy of the sinc expansion, $y_3$, using (68), when $N=\lceil c \rceil$. When $N=\lceil c/2 \rceil$ is noticeably less than the energy of $y_2$ for which $N=\lceil c \rceil$. When $N=\lceil a \rceil$, the energy is virtually the same as that of the sampled sinc function of $y_1$ as is shown:

Setting $\omega_c = 1$ $$f_t = \frac{cT_s}{\pi t_0} \sum_{k=-\infty}^{\infty} y[k] \frac{\sin \pi((t/T_s - k))}{\pi(t/T_s - k)}$$

It is important to reemphasize the fact that c is also equal to the time bandwidth product relationship of $\Omega t_0$.

Figure 70:
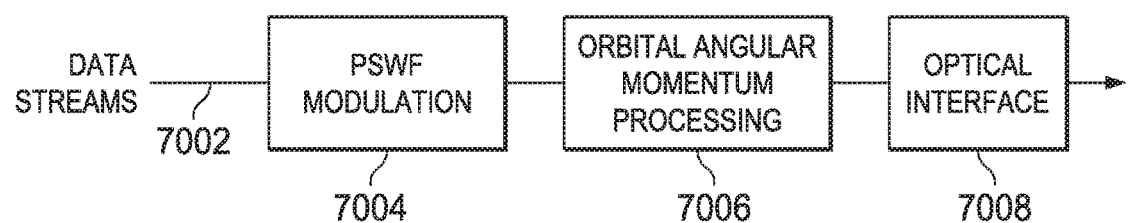
FIG. 70 illustrates a general block diagram for processing a plurality of data streams within an optical communication system.

Referring now to FIG. 70, there is illustrated a general block diagram for processing a plurality of data streams 7002 for transmission in an optical communication system using Prolate Spheroidal Wave Functions (PSWF). The multiple data streams 7002 are provided to the multi-layer overlay modulation circuitry 7004 wherein the signals are modulated using PSWF overlay modulation technique. The modulated signals are provided to orthogonal processing circuitry 7006 which applies a twist to each of the wave fronts being transmitted on the wavelengths of the optical communication channel. The twisted waves are transmitted through the optical interface 7008 over an optical communications link such as an optical fiber or free space optics communication system. FIG. 70 may also illustrate an RF mechanism wherein the interface 7008 would comprise and RF interface rather than an optical interface.

Figure 71:
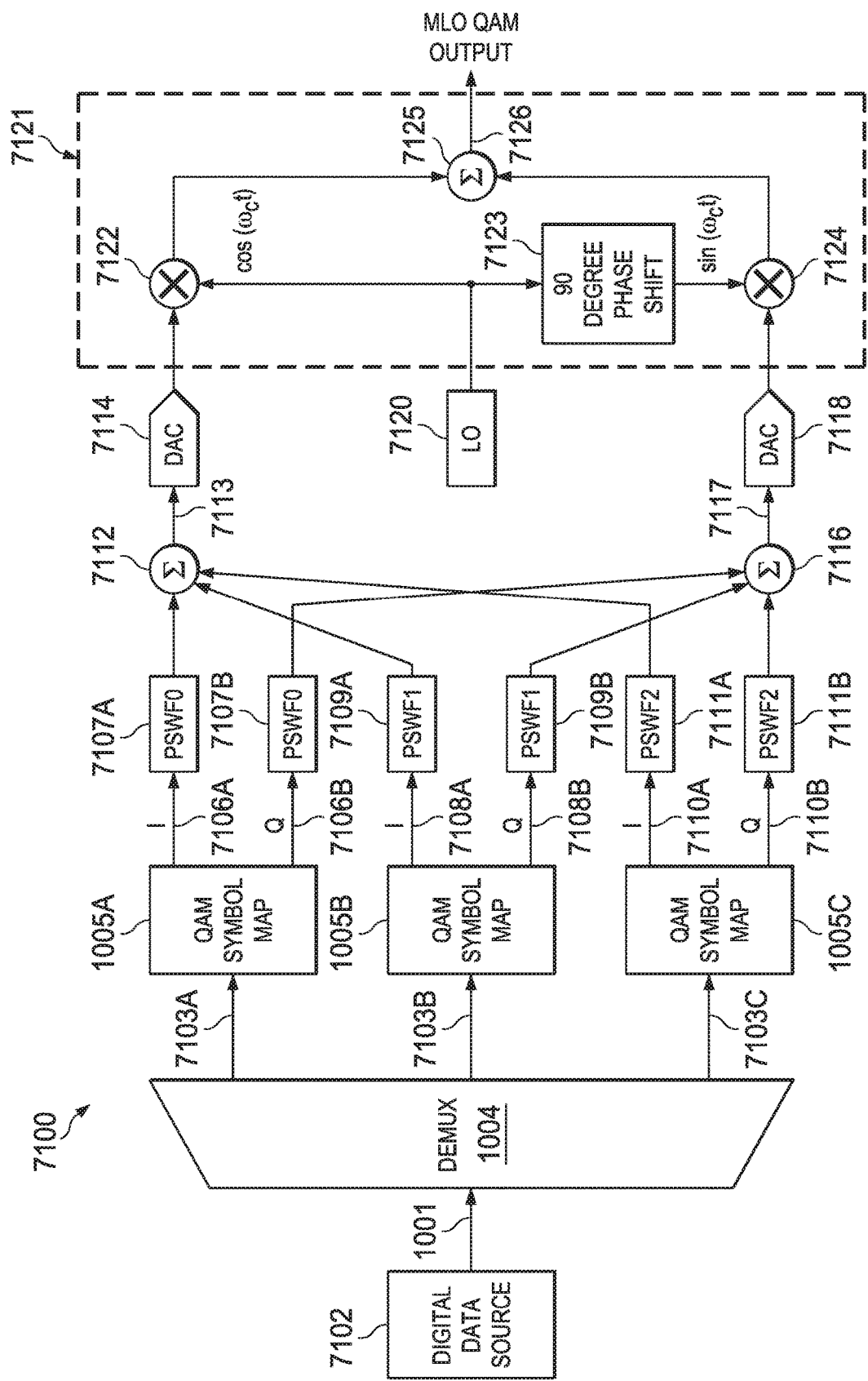
FIG. 71 illustrates a Prolate Spheroidal wave function modulation system.

Referring now to FIG. 71, the reference number 7100 generally indicates an embodiment of a Prolate Spheroidal Wave Function (PSWF) modulation system, although it should be understood that the term PSWF and the illustrated system 7100 are examples of embodiments. The PSWF system 7100 is similar to the MLO system 1200 described previously with respect to FIG. 12. In one example, the modulation system 7100 would be implemented within the PSWF modulation box 7004 of FIG. 70. System 7100 takes as input an input data stream 7101 from a digital source 7102, which is separated into three parallel, separate data streams, 7103A-7103C, of logical 1s and 0s by input stage demultiplexer (DEMUX) 1004. Data stream 1001 may represent a data file to be transferred, or an audio or video data stream. It should be understood that a greater or lesser number of separated data streams may be used. In some of the embodiments, each of the separated data streams 7103A-7103C has a data rate of 1/N of the original rate, where N is the number of parallel data streams. In the embodiment illustrated in FIG. 71, N is 3.

Each of the separated data streams 7103A-7103C is mapped to a quadrature amplitude modulation (QAM) symbol in an M-QAM constellation, for example, 16 QAM or 64 QAM, by one of the QAM symbol mappers 7105A-C. The QAM symbol mappers 7105A-C are coupled to respective outputs of DEMUX 7104, and produced parallel in phase (I) 7106A, 7108A, and 7110A and quadrature phase (Q) 7106B, 7108B, and 7110B data streams at discrete levels. For example, in 64 QAM, each I and Q channel uses 8 discrete levels to transmit 3 bits per symbol. Each of the three I and Q pairs, 7106A-7106B, 7108A-7108B, and 7110A-7110B, is used to weight the output of the corresponding pair of PSWF function generators 7107A-7107B, 7109A-7109B, and 7111A-7111B, which in some embodiments generate signals such as the Prolate Spheroidal Wave Functions described above and weights them based on the amplitude value of the input symbols. PFWFs are orthogonal functions that maintain their orthogonality even when truncated. This provides 2N weighted or modulated signals, each carrying a portion of the data originally from income data stream 7101, and is in place of modulating each symbol in the I and Q pairs, 7106A-7106B, 7108A-7108B, and 7110A-7110B with a raised cosine filter, as would be done for a prior art QAM system. In the illustrated embodiment, three signals are used, SH0, SH1, and SH2, which correspond to modifications of H0, H1, and H2, respectively, although it should be understood that different signals may be used in other embodiments.

The weighted signals are not subcarriers, but rather are sublayers of a modulated carrier, and are combined, superimposed in both frequency and time, using summers 7112 and 7116, without mutual interference in each of the I and Q dimensions, due to the signal orthogonality. Summers 7112 and 7116 act as signal combiners to produce composite signals 7113 and 7117. The weighted orthogonal signals are used for both I and Q channels, which have been processed equivalently by system 7100, and are summed before the QAM signal is transmitted. Therefore, although new orthogonal functions are used, some embodiments additionally use QAM for transmission. Because of the tapering of the signals in the time domain, as will be shown in FIGS. 16A through 16K, the time domain waveform of the weighted signals will be confined to the duration of the symbols. Further, because of the tapering of the special signals and frequency domain, the signal will also be confined to frequency domain, minimizing interface with signals and adjacent channels.

The composite signals 7113 and 7117 are converted to analogue signals 7115 and 7119 using digital to analogue converters 7114 and 7118, and are then used to modulate a carrier signal at the frequency of local oscillator (LO) 7120, using modulator 7121. Modulator 7121 comprises mixers 7122 and 7124 coupled to DACs 7114 and 7118, respectively. Ninety degree phase shifter 7123 converts the signals from LO 7120 into a Q component of the carrier signal. The output of mixers 7122 and 7124 are summed in summer 7125 to produce output signals 7126.

PSWF can be used with a variety of transport mediums, such as wire, optical, and wireless, and may be used in conjunction with QAM. This is because PSWF uses spectral overlay of various signals, rather than spectral overlap. Bandwidth utilization efficiency may be increased by an order of magnitude, through extensions of available spectral resources into multiple layers. The number of orthogonal signals is increased from 2, cosine and sine, in the prior art, to a number limited by the accuracy and jitter limits of generators used to produce the orthogonal polynomials. In this manner, PSWF extends each of the I and Q dimensions of QAM to any multiple access techniques such as GSM, code division multiple access (CDMA), wide band CDMA (WCDMA), high speed downlink packet access (HSPDA), evolution-data optimized (EV-DO), orthogonal frequency division multiplexing (OFDM), world-wide interoperability for microwave access (WIMAX), and long term evolution (LTE) systems. PSWF may be further used in conjunction with other multiple access (MA) schemes such as frequency division duplexing (FDD), time division duplexing (TDD), frequency division multiple access (FDMA), and time division multiple access (TDMA). Overlaying individual orthogonal signals over the same frequency band allows creation of a virtual bandwidth wider than the physical bandwidth, thus adding a new dimension to signal processing. This modulation is applicable to twisted pair, cable, fiber optic, satellite, broadcast, free-space optics, and all types of wireless access. The method and system are compatible with many current and future multiple access systems, including EV-DO, UMB, WIMAX, WCDMA (with or without), multimedia broadcast multicast service (MBMS)/ multiple input multiple output (MIMO), HSPA evolution, and LTE.

Figure 72:
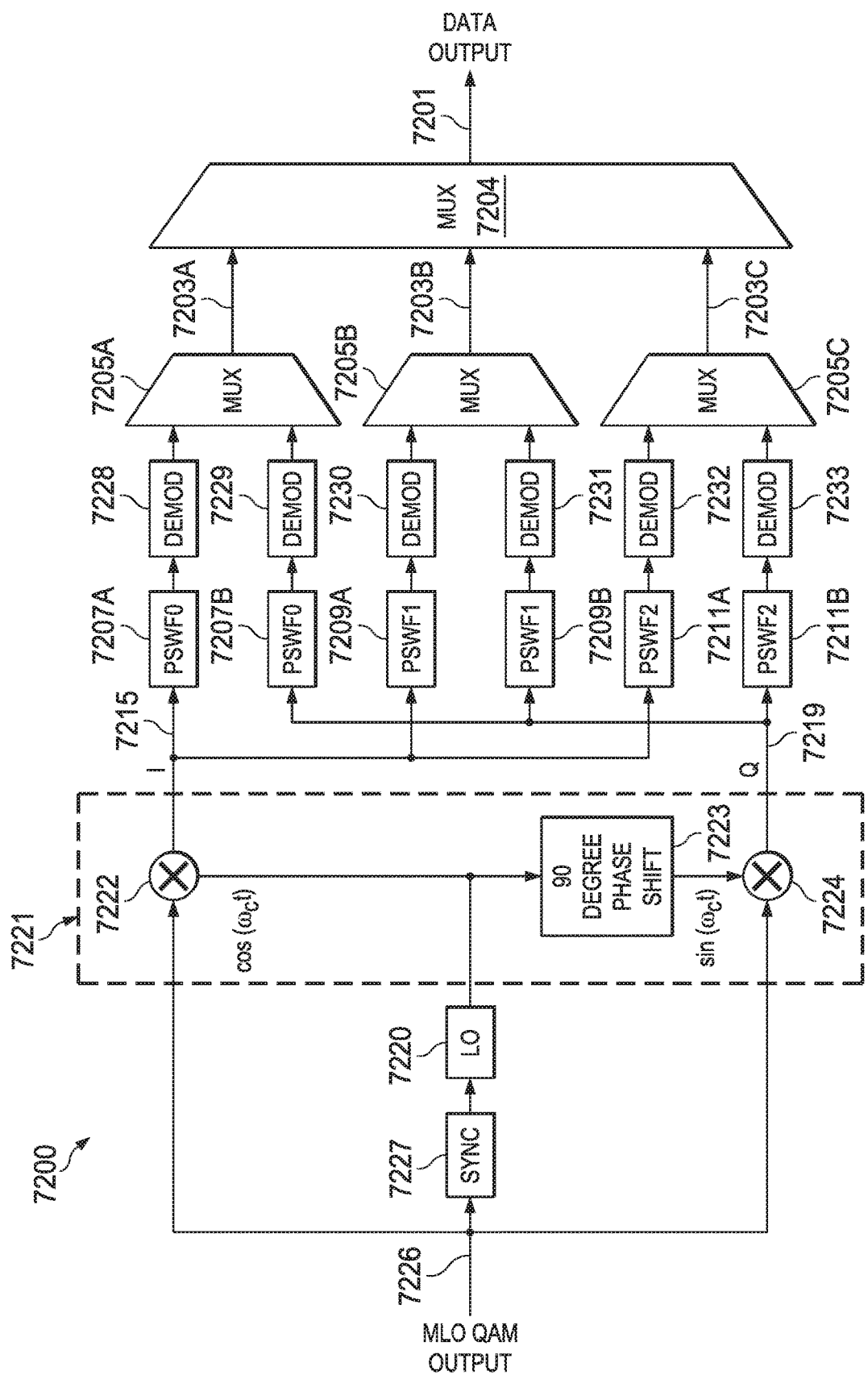
FIG. 72 illustrates a Prolate Spheroidal wave function demodulator.

Referring now to FIG. 72, an PSWF demodulator 7200 is illustrated, although it should be understood that the term PSWF and the illustrated system 7200 are examples of embodiments. The modulator 7200 takes as input an PSWF signal 7126 which may be similar to output signal 7126 from system 7100. Synchronizer 7227 extracts phase information, which is input to local oscillator 7220 to maintain coherence so that the modulator 7221 can produce base band to analogue I signal 7215 and Q signal 7219. The modulator 7221 comprises mixers 7222 and 7224, which, coupled to OL7220 through 90 degree phase shifter 7223. I signal 7215 is input to each of PSWF signal filters 7207A, 7209A, and 7211A, and Q signal 1319 is input to each of PSWF signal filters 7207B, 7209B, and 7211B. The PSWF filters 7207A, 7207B, 7209A, 7209B, 7211A and 7211B implement Prolate Spheroidal Wave Functions or other types of orthogonal functions depending upon what was used in the modulator. Since the orthogonal functions are known, they can be separated using correlation or other techniques to recover the modulated data. Information in each of the I and Q signals 7215 and 7219 can be extracted from the overlapped functions which have been summed within each of the symbols because the functions are orthogonal in a correlative sense.

In some embodiments, PSWF signal filters 7207A-7207B, 7209A-7209B, and 7211A-7211B use locally generated replicas of the polynomials as known signals in match filters. The outputs of the match filters are the recovered data bits, for example, equivalence of the QAM symbols 7206A-7206B, 7208A-7208B, and 7210A-7210B of system 7200. PSWF Signal filters 7207A-7207B, 7209A-7209B, and 7211A-7211B produce 2n streams of n, I, and Q signal pairs, which are input into demodulators 7228-7233. Demodulators 7228-7233 integrate the energy in their respective input signals to determine the value of the QAM symbol, and hence the logical 1s and 0s data bit stream segment represented by the determined symbol. The outputs of the modulators 7228-7233 are then input into multiplexers (MUXs) 7205A-7205C to generate data streams 7203A-7203C. If system 7200 is demodulating a signal from system 7100, data streams 7203A-7203C correspond to data streams 7103A-7103C. Data streams 7203A-7203C are multiplexed by MUX 7204 to generate data output stream 7201. In summary, MLO signals are overlayed (stacked) on top of one another on transmitter and separated on receiver.

MLO may be differentiated from CDMA or OFDM by the manner in which orthogonality among signals is achieved. MLO signals are mutually orthogonal in both time and frequency domains, and can be overlaid in the same symbol time bandwidth product. Orthogonality is attained by the correlation properties, for example, by least sum of squares, of the overlaid signals. In comparison, CDMA uses orthogonal interleaving or displacement of signals in the time domain, whereas OFDM uses orthogonal displacement of signals in the frequency domain.

Bandwidth efficiency may be increased for a channel by assigning the same channel to multiple users. This is feasible if individual user information is mapped to special orthogonal functions. CDMA systems overlap multiple user information and views time intersymbol orthogonal code sequences to distinguish individual users, and OFDM assigns unique signals to each user, but which are not overlaid, are only orthogonal in the frequency domain. Neither CDMA nor OFDM increases bandwidth efficiency. CDMA uses more bandwidth than is necessary to transmit data when the signal has a low signal to noise ratio (SNR). OFDM spreads data over many subcarriers to achieve superior performance in multipath radiofrequency environments. OFDM uses a cyclic prefix OFDM to mitigate multipath effects and a guard time to minimize intersymbol interference (ISI), and each channel is mechanistically made to behave as if the transmitted waveform is orthogonal. (Sync function for each subcarrier in frequency domain.)

In contrast, MLO uses a set of functions which effectively form an alphabet that provides more usable channels in the same bandwidth, thereby enabling high bandwidth efficiency. Some embodiments of MLO do not require the use of cyclic prefixes or guard times, and therefore, outperforms OFDM in spectral efficiency, peak to average power ratio, power consumption, and requires fewer operations per bit. In addition, embodiments of MLO are more tolerant of amplifier nonlinearities than are CDMA and OFDM systems.

Figure 73:
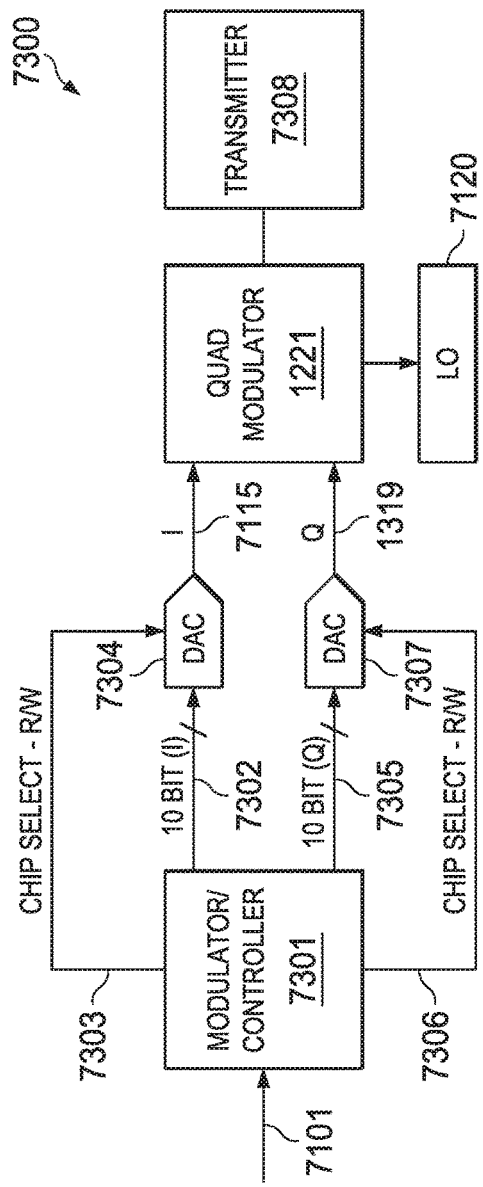
FIG. 73 illustrates a Prolate Spheroidal wave function transmitter system.

FIG. 73 illustrates an embodiment of an PSWF transmitter system 7300, which receives input data stream 7301. System 7300 represents a modulator/controller 7301, which incorporates equivalent functionality of DEMUX 7104, QAM symbol mappers 7105A-C, PSWF function generators 7107A-7107B, 7109A-7109B, and 7111A-7111B, and summers 7112 and 7116 of system 7100, shown in FIG. 71. However, it should be understood that modulator/controller 7301 may use a greater or lesser quantity of signals than the three illustrated in system 7100. Modulator/controller 7301 may comprise an application specific integrated circuit (ASIC), a field programmable gate array (FPGA), and/or other components, whether discrete circuit elements or integrated into a single integrated circuit (IC) chip.

Modulator/controller 7301 is coupled to DACs 7304 and 7307, communicating a 10 bit I signal 7302 and a 10 bit Q signal 7305, respectively. In some embodiments, I signal 7302 and Q signal 7305 correspond to composite signals 7113 and 7117 of system 7100. It should be understood, however, that the 10 bit capacity of I signal 7302 and Q signal 7305 is merely representative of an embodiment. As illustrated, modulator/controller 7301 also controls DACs 7304 and 7307 using control signals 7303 and 7306, respectively. In some embodiments, DACs 7304 and 7307 each comprise an AD5433, complementary metal oxide semiconductor (CMOS) 10 bit current output DAC. In some embodiments, multiple control signals are sent to each of DACs 7304 and 7307.

DACs 7304 and 7307 output analogue signals 7115 and 7119 to quadrature modulator 7121, which is coupled to LO 7120. The output of modulator 7120 is illustrated as coupled to a transmitter 7308 to transmit data wirelessly, although in some embodiments, modulator 7121 may be coupled to a fiber-optic modem, a twisted pair, a coaxial cable, or other suitable transmission media.

Figure 74:
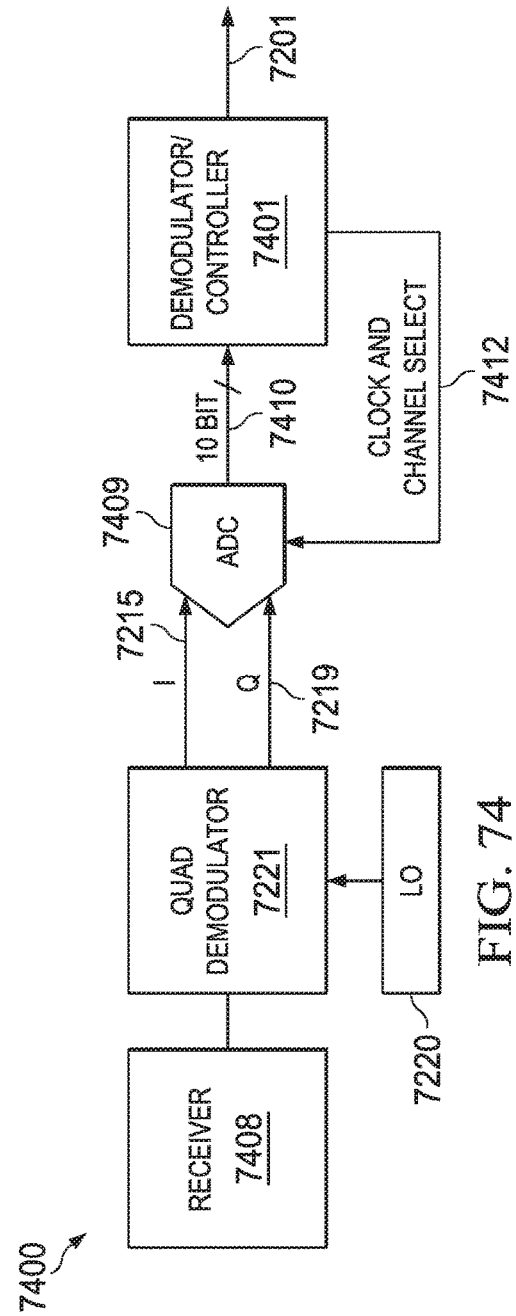
FIG. 74 illustrates a Prolate Spheroidal wave function receiver system.

FIG. 74 illustrates an embodiment of an PSWF receiver system 7400 capable of receiving and demodulating signals from system 7300. System 7400 receives an input signal from a receiver 7408 that may comprise input medium, such as RF, wired or optical. The modulator 7221 driven by LO 7220 converts the input to baseband I signal 7215 and Q signal 7219. I signal 7215 and Q signal 7219 are input to analogue to digital converter (ADC) 7409.

ADC 7409 outputs 10 bit signal 7410 to demodulator/controller 7401 and receives a control signal 7412 from demodulator/controller 7401. Demodulator/controller 7401 may comprise an application specific integrated circuit (ASIC), a field programmable gate array (FPGA), and/or other components, whether discrete circuit elements or integrated into a single integrated circuit (IC) chip. Demodulator/controller 7401 correlates received signals with locally generated replicas of the signal set used, in order to perform demodulation and identify the symbols sent. Demodulator/controller 7401 also estimates frequency errors and recovers the data clock, which is used to read data from the ADC 7409. The clock timing is sent back to ADC 7409 using control signal 7412, enabling ADC 7409 to segment the digital I and Q signals 7215 and 7219. In some embodiments, multiple control signals are sent by demodulator/controller 7401 to ADC 7409. Demodulator/controller 7401 also outputs data signal 1301.

Hermite polynomials are a classical orthogonal polynomial sequence, which are the Eigenstates of a quantum harmonic oscillator. Signals based on Hermite polynomials possess the minimal time-bandwidth product property described above, and may be used for embodiments of MLO systems. The Prolate Spheroidal Wave Functions described herein below are another orthogonal functions that may be utilized. However, it should be understood that other signals may also be used, for example orthogonal polynomials such as Jacobi polynomials, Gegenbauer polynomials, Legendre polynomials, Chebyshev polynomials, and Laguerre polynomials. Q-functions are another class of functions that can be employed as a basis for MLO signals.

Figure 75:
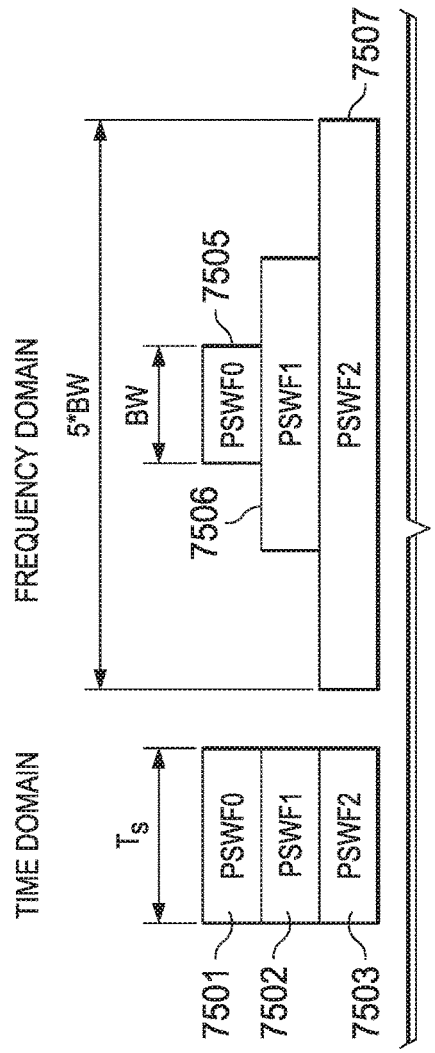
FIG. 75 illustrates comparisons of multiple level overlay signals within the time and frequency domain for a Prolate Spheroidal wave function.

FIG. 75 illustrates a comparison of PSWF signal widths in the time and frequency domains. Time domain envelope representations 7501-7503 of signals PSWF0-PSFW2 are illustrated as all having a duration $T_S$. PSFW0-PSWF2 may represent $PSI_0$-$PSI_2$, or may be other signals. The corresponding frequency domain envelope representations are 7505-7507, respectively. PSWF0 has a bandwidth BW, PSWF1 has a bandwidth three times BW, and PSWF2 has a bandwidth of 5BW, which is five times as great as that of PSWF0. The bandwidth used by an PSWF system will be determined, at least in part, by the widest bandwidth of any of the signals used. The highest order signal must set within the available bandwidth. This will set the parameters for each of the lower order signals in each of the layers and enable the signals to fit together without interference. If each layer uses only a single signal type within identical time windows, the spectrum will not be fully utilized, because the lower order signals will use less of the available bandwidth than is used by the higher order signals.

FIG. 76A illustrates a spectral alignment of PSWF signals that accounts for the differing bandwidths of the signals, and makes spectral usage more uniform, using PSWF0-PSWF2. Blocks 7601-7604 are frequency domain blocks of an OFDM signal with multiple subcarriers. Block 7603 is expanded to show further detail. Block 7603 comprises a first layer 7603x comprised of multiple PSWF0 envelopes 7603a-7603o. A second layer 7603y of PSWF1 envelopes 7603p-7603t has one third the number of envelopes as the first layer. In the illustrated example, first layer 7603x has 15 PSWF0 envelopes, and second layer 7603y has five PSWF1 envelopes. This is because, since the PSWF1 bandwidth envelope is three times as wide as that of PSWF0, 15 PSWF0 envelopes occupy the same spectral width as five PSWF1 envelopes. The third layer 7603z of block 7603 comprises three PSWF2 envelopes 7603u-7603w, because the PSWF2 envelope is five times the width of the PSWF0 envelope.

The total required bandwidth for such an implementation is a multiple of the least common multiple of the bandwidths of the PSWF signals. In the illustrated example, the least common multiple of the bandwidth required for SH0, SH1, and SH2 is 15BW, which is a block in the frequency domain. The OFDM-PSWF signal can have multiple blocks, and the spectral efficiency of this illustrated implementation is proportional to (15+5+3)/15. The largest bandwidth signal is thus pegged to the available physical bandwidth.

FIGS. 76B-76C illustrate a situation wherein the frequency domain envelopes 7620-7624 are each located in a separate layer within a same physical band width 7625. However, each envelope rather than being centered on a same center frequency as shown in FIG. 75 has its own center frequency 7626-7630 shifted in order to allow a slided overlay. The purposed of the slided center frequency is to allow better use of the available bandwidth and insert more envelopes in a same physical bandwidth.

Since each of the layers within the PSWF signal comprises a different channel, different service providers may share a same bandwidth by being assigned to different PSWF layers within a same bandwidth. Thus, within a same bandwidth, service provider one may be assigned to a first PSWF layer, service provider two may be assigned to a second PSWF layer and so forth.

Figure 77:
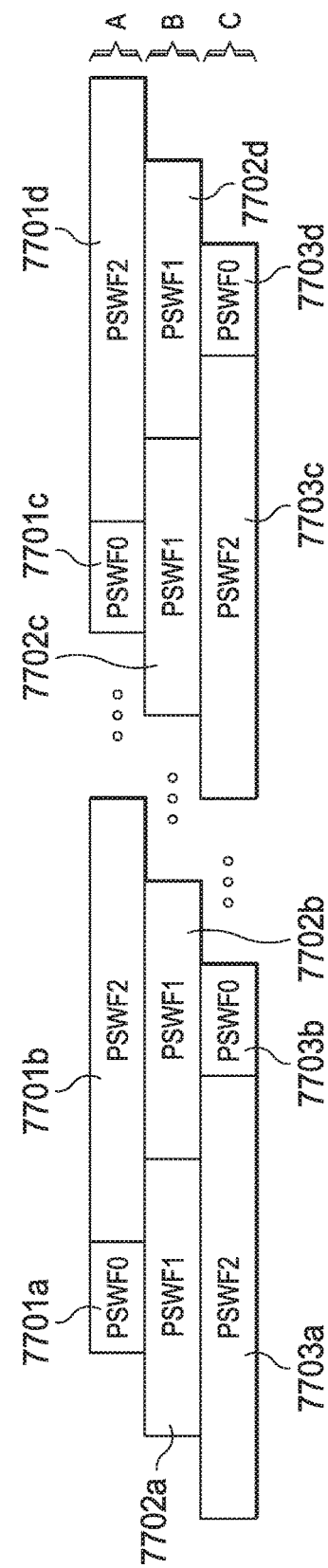
FIG. 77 illustrates an alternative spectral alignment of Prolate Spheroidal signals.

FIG. 77 illustrates another spectral alignment of PSWF signals, which may be used alternatively to alignment scheme shown in FIG. 76. In the embodiment illustrated in FIG. 77, the OFDM-PSWF implementation stacks the spectrum of PSWF0, PSWF1, and PSWF2 in such a way that the spectrum in each layer is utilized uniformly. Layer 7700A comprises envelopes 7701A-7701D, which includes both PSWF0 and PSWF2 envelopes. Similarly, layer 7700C, comprising envelopes 7703A-7703D, includes both PSWF0 and PSWF2 envelopes. Layer 7700B, however, comprising envelopes 7702A-7702D, includes only SH1 envelopes. Using the ratio of envelope sizes described above, it can be easily seen that BW+5BW=3BW+3BW. Thus, for each PSWF0 envelope in layer 7700A, there is one PSWF2 envelope also in layer 7700C and two PSWF1 envelopes in layer 7700B.

In quantum mechanics, a coherent state is a state of a quantum harmonic oscillator whose dynamics most closely resemble the oscillating behavior of a classical harmonic oscillator system. A squeezed coherent state is any state of the quantum mechanical Hilbert space, such that the uncertainty principle is saturated. That is, the product of the corresponding two operators takes on its minimum value. In embodiments of an MLO system, operators correspond to time and frequency domains wherein the time-bandwidth product of the signals is minimized. The squeezing property of the signals allows scaling in time and frequency domain simultaneously, without losing mutual orthogonality among the signals in each layer. This property enables flexible implementations of MLO systems in various communications systems.

Adaptive Processing PSWF

Figure 78:
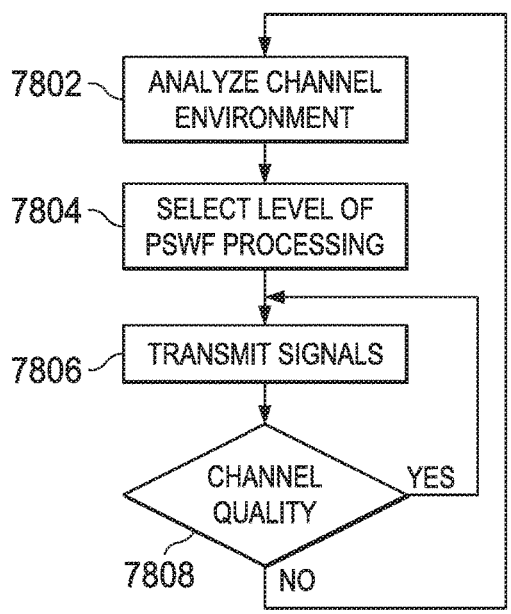
FIG. 78 is a flow diagram illustrating an adaptive PSWF process.

The processing of signals using PSWF (Prolate Spheroidal Wave Functions) may also be adaptively selected to combat channel impairments and interference. The process for adaptive PSWF is generally illustrated in FIG. 78. First at step 7802 an analysis of the channel environment is made to determine the present operating environment. The level of PSWF processing is selected at step 7804 based on the analysis and used to configure communications. Next, at step 7806, the signals are transmitted at the selected level of PSWF processing. Inquiry step 7808 determines if sufficient channel quality has been achieved. If so, the system continues to transmit and the selected PSWF processing level at step 7806. If not, control passes back to step 7802 to adjust the level of PSWF processing to achieve better channel performance.

Figure 79:
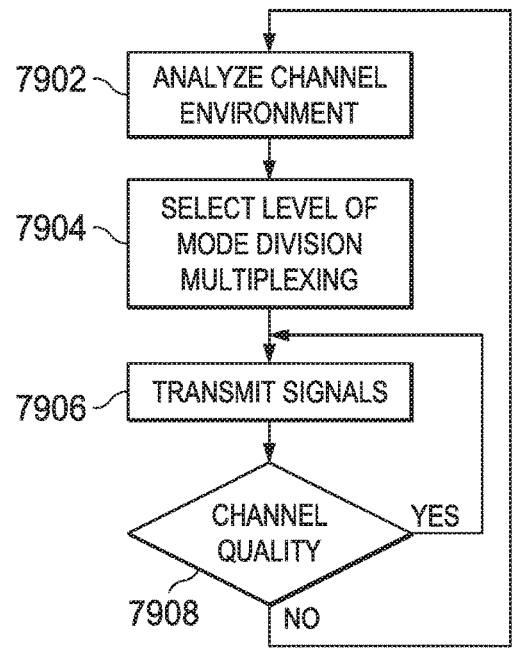
FIG. 79 is a flow diagram illustrating an adaptive MDM process.

The processing of signals using mode division multiplexing (MDM) may also be adaptively selected to combat channel impairments and interference and maximize spectral efficiency. The process for adaptive MDM is generally illustrated in FIG. 79. First at step 7902 an analysis of the channel environment is made to determine the present operating environment. The level of MDM processing is selected at step 7904 based on the analysis and used to configure communications. Next, at step 7906, the signals are transmitted at the selected level of MDM processing. Inquiry step 7908 determines if sufficient channel quality has been achieved. If so, the system continues to transmit and the selected MDM processing level at step 7906. If not, control passes back to step 7902 to adjust the level of MDM processing to achieve better channel performance.

Figure 80:
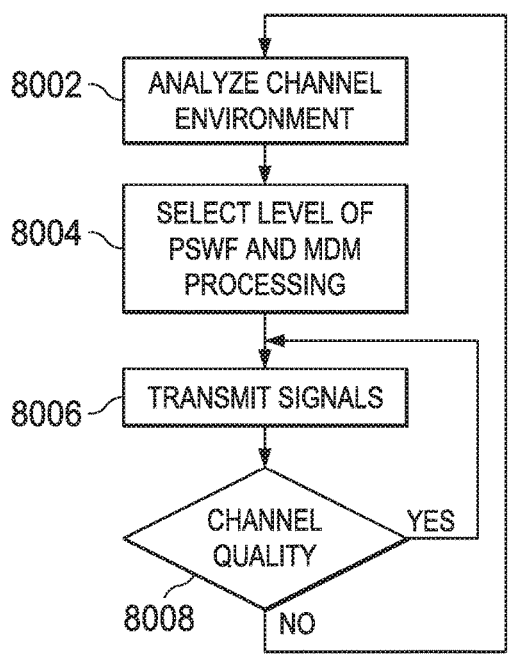
FIG. 80 is a flow diagram illustrating an adaptive PSWF and MDM process

The processing of signals using an optimal combination of PSWF and MDM may also be adaptively selected to combat channel impairments and interference and maximize spectral efficiency. The process for adaptive PSWF and MDM is generally illustrated in FIG. 80. First at step 8002 an analysis of the channel environment is made to determine the present operating environment. A selected combination of a level of PSWF process and a level of MDM processing are selected at step 8004 based on the analysis and used to configure communications. Next, at step 8006, the signals are transmitted at the selected level of PSWF and MDM processing. Inquiry step 8008 determines if sufficient channel quality has been achieved. If so, the system continues to transmit and the selected combination of PSWF and MDM processing levels at step 8006. If not, control passes back to step 8002 to adjust the levels of PSWF and MDM processing to achieve better channel performance. Adjustments through the steps continue until a most optimal combination of PSWF and MDM processing is achieved to maximize spectral efficiency using a 2-dimensional optimization.

Figure 81:
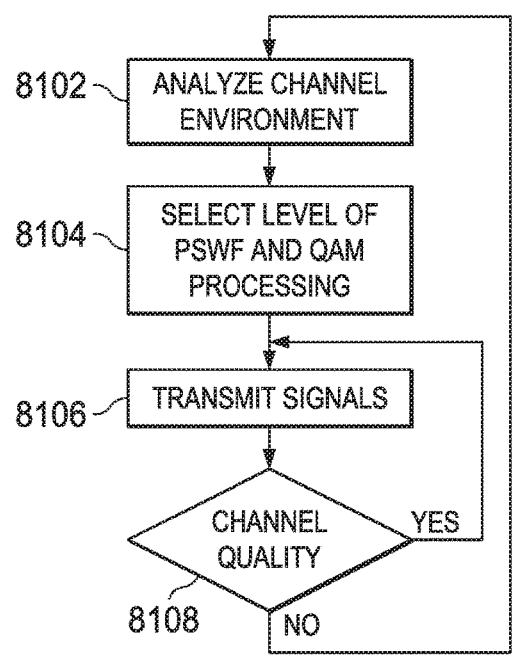
FIG. 81 is a flow diagram illustrating an adaptive PSWF and QAM process.

The processing of signals using an optimal combination of PSWF and QAM may also be adaptively selected to combat channel impairments and interference and maximize spectral efficiency. The process for adaptive PSWF and QAM is generally illustrated in FIG. 81. First at step 8102 an analysis of the channel environment is made to determine the present operating environment. A selected combination of a level of PSWF process and a level of QAM processing are selected at step 8104 based on the analysis and used to configure communications. Next, at step 8106, the signals are transmitted at the selected level of PSWF and QAM processing. Inquiry step 8108 determines if sufficient channel quality has been achieved. If so, the system continues to transmit and the selected combination of PSWF and QAM processing levels at step 8106. If not, control passes back to step 8102 to adjust the levels of PSWF and QAM processing to achieve better channel performance. Adjustments through the steps continue until a most optimal combination of PSWF and QAM processing is achieved to maximize spectral efficiency using a 2-dimensional optimization.

Figure 82:
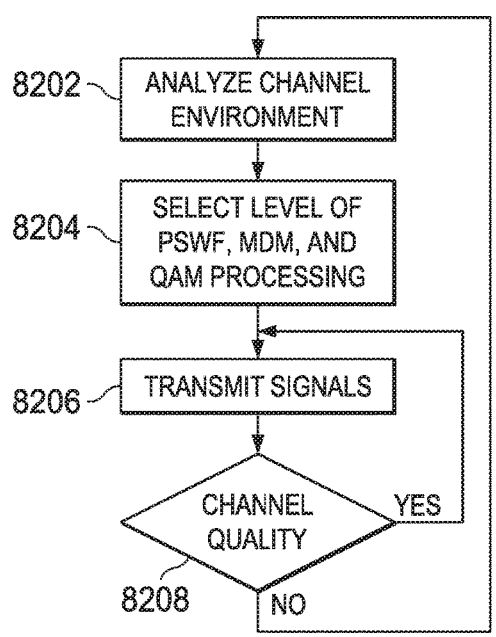
FIG. 82 is a flow diagram illustrating an adaptive PSWF, MDM and QAM process.

The processing of signals using an optimal combination of PSWF, MDM and QAM may also be adaptively selected to combat channel impairments and interference and maximize spectral efficiency. The process for adaptive PSWF, MDM and QAM is generally illustrated in FIG. 82. First at step 8202 an analysis of the channel environment is made to determine the present operating environment. A selected combination of a level of PSWF processing, a level of MDM processing and a level of QAM processing are selected at step 8204 based on the analysis and used to configure communications. Next, at step 8206, the signals are transmitted at the selected level of PSWF, MDM and QAM processing. Inquiry step 8208 determines if sufficient channel quality has been achieved. If so, the system continues to transmit and the selected combination of PSWF, MDM and QAM processing levels at step 8206. If not, control passes back to step 8202 to adjust the levels of PSWF, MDM and QAM processing to achieve better channel performance. Adjustments through the steps continue until a most optimal combination of PSWF, MDM and QAM processing is achieved to maximize spectral efficiency using a 3-dimensional optimization.

The adaptive approaches described herein above may be used with any combination of PSWF, MDM and QAM processing in order to achieve optimal channel efficiency. In another application distinct modal combinations may also be utilized.

Improvement of Pilot Signal Modulation

Figure 83:
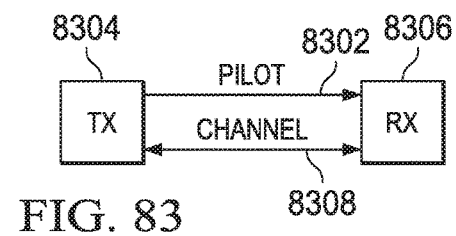
FIG. 83 illustrates the use of a pilot signal to improve channel impairments using; PSWF

The above described PSWF, MDM and QAM processing techniques may also be used to improve the manner in which a system deals with noise, fading and other channel impairments by the use of pilot signal modulation techniques. As illustrated in FIG. 83, a pilot signal 8302 is transmitted between a transmitter 8304 to a receiver 8306. The pilot signal includes an impulse signal that is received, detected and processed at the receiver 7106. Using the information received from the pilot impulse signal, the channel 8308 between the transmitter 8304 and receiver 8306 may be processed to remove noise, fading and other channel impairment issues from the channel 8308.

Figure 84:
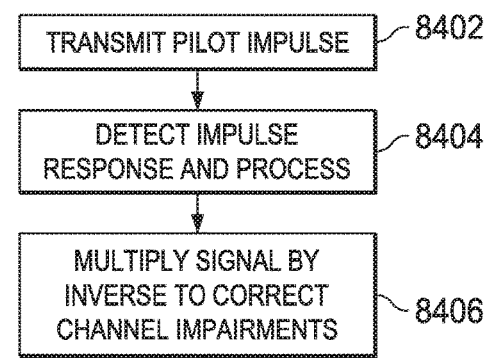
FIG. 84 is a flowchart illustrating the use of a pilot signal to improve channel impairment using PSWF.

This process is generally described with respect to the flowchart of FIG. 84. The pilot impulse signal is transmitted at 8402 over the transmission channel. The impulse response is detected at step 8404 and processed to determine the impulse response over the transmission channel. Effects of channel impairments such as noise and fading may be countered by multiplying signals transmitted over the transmission channel by the inverse of the impulse response at step 8406 in order to correct for the various channel impairments that may be up on the transmission channel. In this way the channel impairments are counteracted and improved signal quality and reception may be provided over the transmission channel.

Power Control

Figure 85:
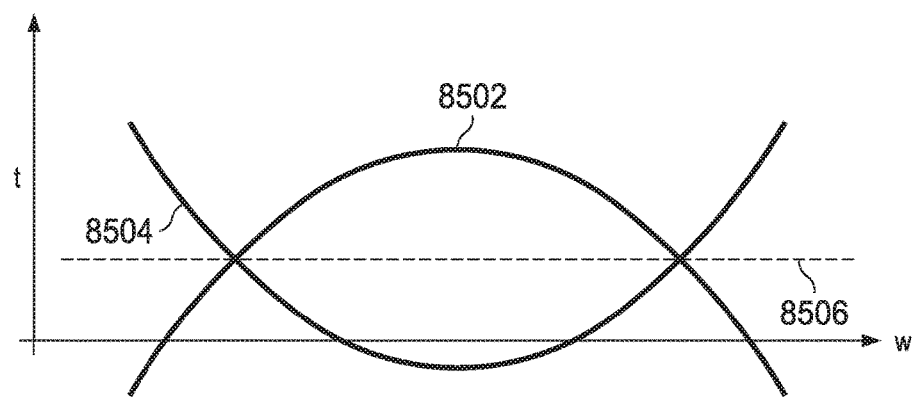
FIG. 85 illustrates a channel response and the effects of amplifier nonlinearities using PSWF.

Adaptive power control may be provided on systems utilizing PSWF, MDM and QAM processing to also improve channel transmission. Amplifier nonlinearities within the transmission circuitry and the receiver circuitry will cause impairments in the channel response as more particularly illustrated in FIG. 85. As can be seen the channel impairments and frequency response increase and decrease over frequency as illustrated generally at 8502. By adaptively controlling the power of a transmitting unit or a receiving unit and inverse frequency response such as that generated at 8504 may be generated. Thus, when the normal frequency response 8502 and the inverse frequency response 8504 are combined, a consistent response 7306 is provided by use of the adaptive power control.

Other Applications

Prolate Spheroidal Wave Functions may also be implemented within a number of other embodiments. They may be used to perform phase estimation and carrier recovery. PSWF may be used to perform symbol period estimation and clock recovery. They can be used to perform decision directed carrier recovery where decoded signal are compared with the closest constellation points. Adaptive variable symbol rates and adaptive equalization techniques may also be used with Prolate Spheroidal Wave Functions.

Both forward and backward channel estimation using preamble and post amble symbols may be used with Prolate Spheroidal Wave Functions. PSFW may also be used with Decision Feedback Equalizers (DFE) and Mean Least Square Error minimization. PSWF and MIMO (multiple input multiple output techniques may also be combined to improve system performance. The PSFW functions may also be combined with advanced signal processing techniques to combat channel impairments.

Finally, a combination of quantum level overlay techniques, mode division multiplexing using PSWF may be used in a variety of different operating environments including, but not limited to twisted pairs, coaxial cable, fiber, RF point-to-point and RF point-to-multipoint, RF point-to-point in backhaul, RF point-to-point in fronthaul (higher throughput CPRI interface for cloudification and virtualization of RAN and future cloudified HetNet), RF Satellite, RF Broadcast, Free-Space Optics, RF Internet of Things (IOT), RF WiFi (LAN), RF Bluetooth (LAN), RF personal device cable replacement, RF and FSO hybrid system, RF Radar and RF Electromagnet Tags.

It will be appreciated by those skilled in the art having the benefit of this disclosure that this system and method for communication using orbital angular momentum with multiple layer overlay modulation provides improved bandwidth and data transmission capability. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. A method for transmitting a plurality of input streams from a transmitter circuitry to a receiver, comprising:
   processing each of a plurality of input data streams to generate a plurality of parallel pairs of data streams including an in-phase stream (I) and a quadrature-phase stream (Q) for each of the plurality of input data streams;
   modulating each of the plurality of parallel pairs of data streams with a selected one of at least three prolate spheroidal wave functions, respectively, to generate a plurality of data signals, each of the plurality of data signals associated with one of the plurality of parallel pairs of data streams;
   generating a plurality of composite data streams by overlaying at least one data signal of the plurality of data signals in a first data layer with the at least one data signal of the plurality of data signals in a second data layer; and processing the plurality of composite data streams to associate with each of the plurality of composite data streams an orthogonal function to cause each of the plurality of composite data streams to be mutually orthogonal to each other on a link to enable transmission of each of the plurality of the composite data streams on the link at a same time.

2. The method of claim 1 further comprising the steps of:
receiving the plurality of composite data streams on the link;
separating each of the plurality of composite data streams having the orthogonal function from each other;
demodulating the orthogonal function from each of the plurality of composite data streams; and
demodulating the plurality of composite data streams into the plurality of input data streams using the at least three prolate spheroidal wave functions previously applied to the plurality of parallel pairs of data streams.

3. The method of claim 1 further comprising mapping each of the plurality of input data streams to a set of quadrature amplitude modulation (QAM) symbols to generate the plurality of parallel pairs of data streams.

4. The method of claim 1, wherein modulating each of the plurality of pairs of parallel data streams with the selected one of the at least three prolate spheroidal wave functions further comprises weighting the function based on a mapped symbol.

5. The method of claim 1, wherein the at least three prolate spheroidal wave functions are concentrated in a limited time interval and comprise normalized eigenfunctions.

6. The method of claim 1 further including:
(a) analyzing a channel environment of the link;
(b) selecting a level of at least one of prolate spheroidal waveform processing, mode division multiplexing processing, and quadrature amplitude modulation processing to improve channel impairments and interference;
(c) transmitting the plurality of composite date streams using the selected level of at least one of the prolate spheroidal waveform processing, the mode division multiplexing processing, and the quadrature amplitude modulation processing; and
(d) repeating steps (a)-(c) until a desired channel environment is achieved.

7. The method of claim 1, wherein the step of generating further comprises pegging a largest bandwidth signal of the plurality of composite data streams to an available physical bandwidth on the link.

8. The method of claim 1, wherein the step of generating further comprises shifting a center frequency of data signals in a layer to enable to place more data signals within the layer.

9. A system, comprising:
first signal processing circuitry for:
processing each of a plurality of input data streams to generate a plurality of parallel pairs of data streams including an in-phase stream (I) and a quadrature-phase stream (Q) for each of the plurality of input data streams,
modulating each of the plurality of parallel pairs of data streams with a selected one of at least three prolate spheroidal wave functions, respectively, to generate a plurality of data signals, each associated with one of the plurality of parallel pairs of data streams,
generating a plurality of composite data streams by overlaying at least one data signal of the plurality of data signals in a first data layer with at least one data signal of the plurality of data signals in a second data layer, second signal processing circuitry for processing the plurality of composite data streams to associate with each of the plurality of composite data streams an orthogonal function to cause each of the plurality of composite data streams to be mutually orthogonal to each other on a link to enable transmission of each of the plurality of the composite data streams on the link at a same time; and a transmitter for transmitting the plurality of composite data streams on the link at the same time.

10. The system of claim 9, further including:
a receiver for receiving the plurality of composite data streams on the link;
a signal separator for separating each of the plurality of composite data streams having the orthogonal function applied thereto by the second signal processing circuitry from each other;
third signal processing circuitry for removing the orthogonal function applied thereto by the second signal processing circuitry from each of the plurality of composite data streams; and
fourth signal processing circuitry for demodulating the plurality of composite data streams into the plurality of input data streams using the prolate spheroidal wave functions previously applied to the plurality of parallel pairs of data streams.

11. The system of claim 9, wherein the first signal processing circuitry further maps each of the plurality of input data streams to a set of quadrature amplitude modulation (QAM) symbols to generate the plurality of parallel pairs of data streams.

12. The system of claim 9, wherein the first signal processing circuitry further modulates each of the plurality of pairs of parallel data streams with the selected one of at least three prolate spheroidal wave functions further by weighting the function based on a mapped symbol.

13. The system of claim 9, wherein the prolate spheroidal wave functions are concentrated in a limited time interval and comprise normalized eigenfunctions.

14. The system of claim 9, wherein the first signal processing circuitry further:
(e) analyzes a channel environment of the link;
(f) selects a level of at least one of prolate spheroidal waveform processing, mode division multiplexing processing, and quadrature amplitude modulation processing to improve channel impairments and interference;
(g) transmits the plurality of composite date streams using the selected level of at least one of the prolate spheroidal waveform processing, the mode division multiplexing processing, and the quadrature amplitude modulation processing; and
(h) repeats (a)-(c) until a desired channel environment is achieved.

15. The system of claim 9, wherein the first signal processing circuitry generates the plurality of composite data streams by pegging a largest bandwidth signal of the plurality of composite data streams to an available physical bandwidth on the link.

16. The system of claim 9, wherein the first signal processing circuitry generates the plurality of composite data streams by shifting a center frequency of data signals in a layer to enable to place more data signals within the layer.

17. A method for transmitting a plurality of input streams from a transmitter to a receiver, comprising:

mapping each of a plurality of input data streams to a set of quadrature amplitude modulation (QAM) symbols to generate a plurality of parallel pairs of data streams including an in-phase stream (I) and a quadrature-phase stream (Q) for each of the plurality of input data streams;

modulating each of the plurality of parallel pairs of data streams with a selected one of at least three prolate spheroidal wave functions, respectively, to generate a plurality of data signals, each of the plurality of data signals associated with one of the plurality of parallel pairs of data streams, wherein the prolate spheroidal wave functions are concentrated in a limited time interval and comprise normalized eigenfunctions;

generating a plurality of composite data streams by overlaying at least one data signal of the plurality of data signals in a first data layer with the at least one data signal of the plurality of data signals in a second data layer;

processing the plurality of composite data streams to associate with each of the plurality of composite data streams an orthogonal function to cause each of the plurality of composite data streams to be mutually orthogonal to each other on a link to enable transmission of each of the plurality of the composite data streams on the link at a same time; and receiving the plurality of composite data streams on the link;

separating each of the plurality of composite data streams having the orthogonal function from each other;

demodulating the orthogonal function from each of the plurality of composite data streams; and demodulating the plurality of composite data streams into the plurality of input data streams using the prolate spheroidal wave functions previously applied to the plurality of parallel pairs of data streams.

18. The method of claim 17, wherein modulating each of the plurality of pairs of parallel data streams with the selected one of at least three prolate spheroidal wave functions further comprises weighting the function based on a mapped symbol.

19. The method of claim 17 further including:
(i) analyzing a channel environment of the link;
(j) selecting a level of at least one of prolate spheroidal waveform processing, mode division multiplexing processing, and quadrature amplitude modulation processing to improve channel impairments and interference;
(k) transmitting the plurality of composite date streams using the selected level of at least one of the prolate spheroidal waveform processing, the mode division multiplexing processing, and the quadrature amplitude modulation processing; and
(l) repeating steps (a)-(c) until a desired channel environment is achieved.

20. The method of claim 17, wherein the step of generating further comprises pegging a largest bandwidth signal of the plurality of composite data streams to an available physical bandwidth on the link.

21. The method of claim 17, wherein the step of generating further comprises shifting a center frequency of data signals in a layer to enable to place more data signals within the layer.

* * * * *